US010686971B1

(12) United States Patent
Yoo et al.

(10) Patent No.: US 10,686,971 B1
(45) Date of Patent: Jun. 16, 2020

(54) ELECTRONIC DEVICE INCLUDING A CAMERA CAPABLE OF BEING A FRONT CAMERA AND A REAR CAMERA AND AN OPERATING METHOD THEREOF

(71) Applicant: Samsung Electronics Co., Ltd, Suwon-si (KR)

(72) Inventors: Minwoo Yoo, Suwon-si (KR); Byounguk Yoon, Suwon-si (KR); Sanguk Lee, Suwon-si (KR); Cheolho Cheong, Suwon-si (KR); Jongchul Choi, Suwon-si (KR); Doohee Hong, Suwon-si (KR); Wooseung Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/296,143

(22) Filed: Mar. 7, 2019

(30) Foreign Application Priority Data

Nov. 29, 2018 (KR) .......................... 10-2018-0151451

(51) Int. Cl.
*H04N 5/225* (2006.01)
*H04M 1/02* (2006.01)

(52) U.S. Cl.
CPC ........ *H04N 5/2253* (2013.01); *H04M 1/0264* (2013.01); *H04N 5/2252* (2013.01); *H04N 5/2257* (2013.01); *H04N 5/22525* (2018.08)

(58) Field of Classification Search
CPC .... H04M 1/0264; H04M 1/02; H04N 5/2251; H04N 5/22525; H04N 5/225251; H04N 7/14
See application file for complete search history.

(56) References Cited

U.S. PATENT DOCUMENTS 6,637,896 B2 * 10/2003 Li .......................... G03B 21/10
                                                                353/119
6,751,473 B1 * 6/2004 Goyal ................. H04M 1/0247
                                                                348/E7.082

(Continued)

FOREIGN PATENT DOCUMENTS

CN          207926665 U      9/2018
CN          207968576 U      10/2018

(Continued)

OTHER PUBLICATIONS

European Search Report dated Oct. 29, 2019 in connection with European Patent Application No. 19 19 6416, 11 pages.

(Continued)

*Primary Examiner* — Ngoc Yen T Vu

(57) ABSTRACT

An electronic device includes housing, and a display, where at least part of the display is accommodated in the housing. The electronic device also includes a slide portion and a camera module unit. The slide portion includes an opening exposed to an outside and sliding with respect to the housing. The camera module unit is disposed at the opening and rotating with respect to the slide portion. The slide portion is configured to overlap with the display, in a first state, extend from the display by a first stroke, in a second state, and extend more than the first stroke by a second stroke, in a third state. The camera module unit is configured to face a first direction in the first state and the second state and to rotate toward a second direction different from the first direction, by the second stroke, when switching to the third state.

20 Claims, 41 Drawing Sheets

(56) References Cited

U.S. PATENT DOCUMENTS

| | | | |
|---|---|---|---|
| 7,386,331 B2 | 6/2008 | Hyun et al. | |
| 7,450,173 B2 * | 11/2008 | Im | H04M 1/0235 |
| | | | 348/333.01 |
| 7,450,841 B2 * | 11/2008 | Jung | G03B 17/04 |
| | | | 348/333.06 |
| 7,647,081 B2 * | 1/2010 | Maatta | H01F 7/0252 |
| | | | 455/575.1 |
| 9,344,672 B2 | 5/2016 | Lee | |
| 10,298,728 B2 * | 5/2019 | DiLaura | A45C 15/00 |
| 2016/0316046 A1 * | 10/2016 | Zheng | H04M 1/0264 |
| 2017/0034319 A1 * | 2/2017 | Chenn | H04N 5/2251 |
| 2017/0366652 A1 * | 12/2017 | Boerckel | H04M 1/72527 |
| 2019/0250667 A1 | 8/2019 | Fan et al. | |
| 2019/0253542 A1 | 8/2019 | Fan et al. | |

FOREIGN PATENT DOCUMENTS

| | | | | |
|---|---|---|---|---|
| EP | 1499094 A1 | | 1/2005 | |
| EP | 1551157 A1 * | | 7/2005 | H04M 1/02 |
| EP | 3525431 A1 | | 8/2019 | |
| KR | 20050022912 A * | | 3/2005 | H04M 1/0237 |
| KR | 20050073255 A * | | 7/2005 | H04M 1/0237 |
| KR | 20060010065 A * | | 2/2006 | H04M 1/02 |
| WO | 2019/153835 A1 | | 8/2019 | |

OTHER PUBLICATIONS

Office Action dated Aug. 5, 2019 in connection with Korean Patent Application No. 10-2018-0151451, 15 pages.

* cited by examiner

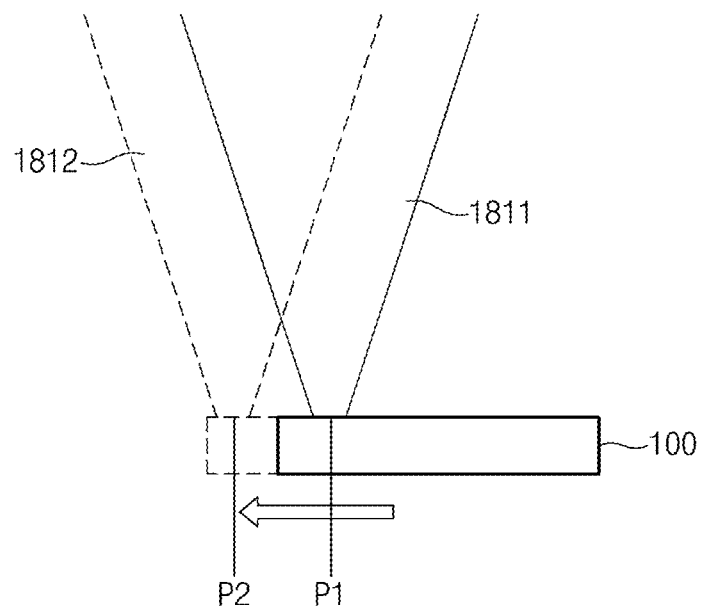
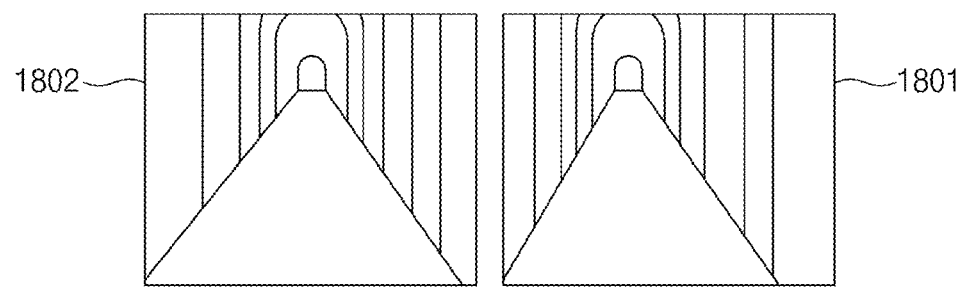
FIG. 18

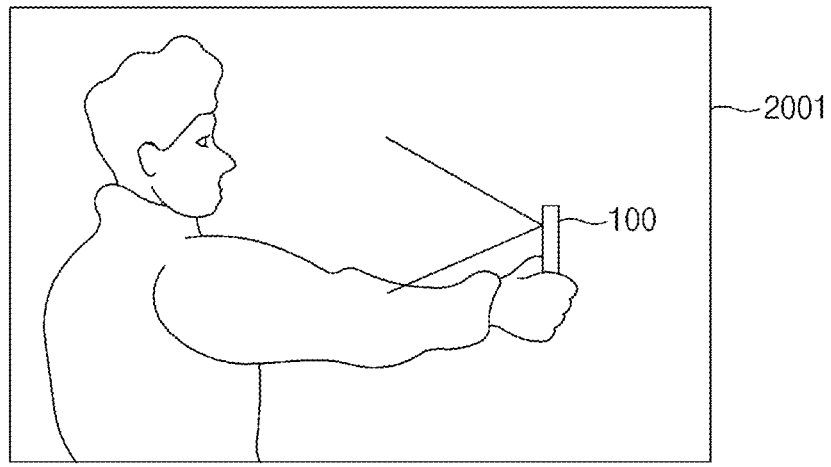
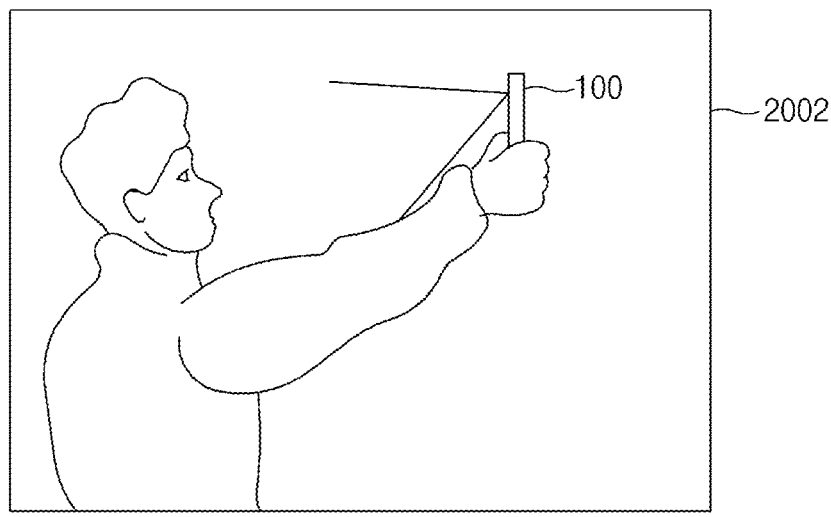
FIG. 20

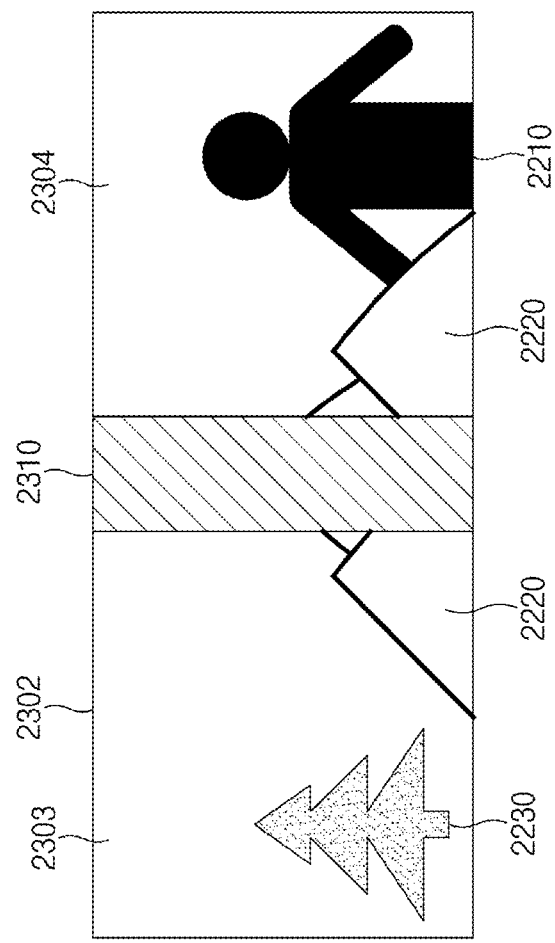
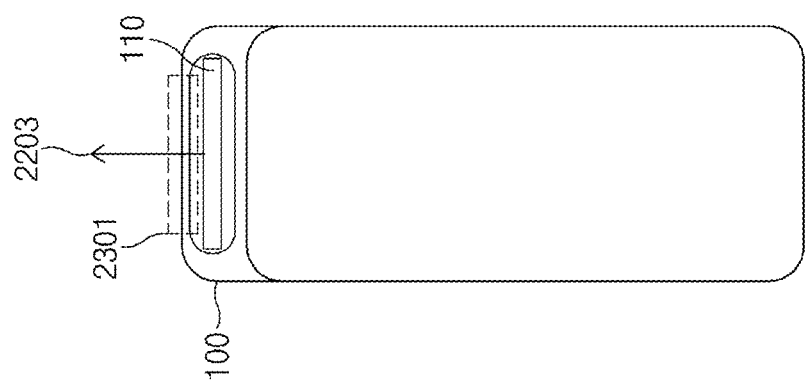
FIG. 23

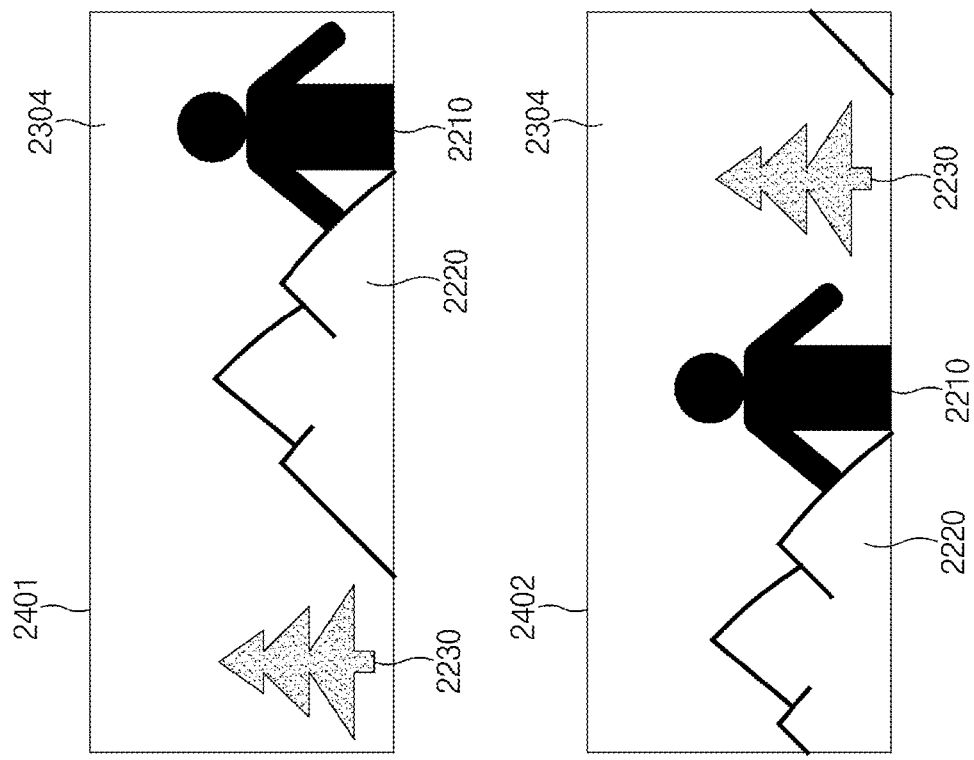
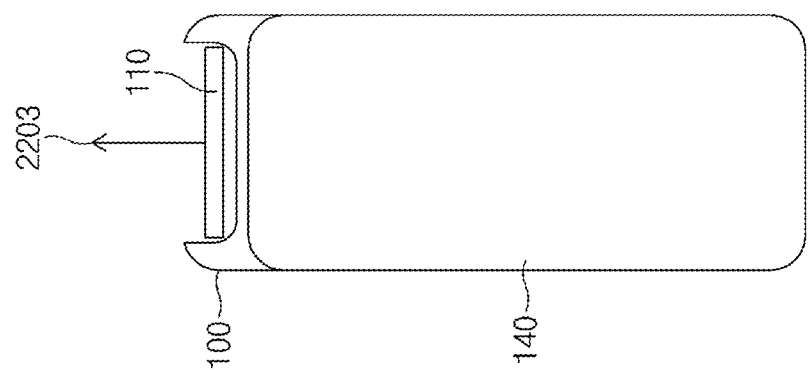
FIG. 25

ELECTRONIC DEVICE INCLUDING A CAMERA CAPABLE OF BEING A FRONT CAMERA AND A REAR CAMERA AND AN OPERATING METHOD THEREOF

CROSS-REFERENCE TO RELATED APPLICATION

This application is based on and claims priority under 35 U.S.C. § 119 to Korean Patent Application No. 10-2018-0151451 filed on Nov. 29, 2018 in the Korean Intellectual Property Office, the disclosure of which is incorporated by reference herein its entirety.

BACKGROUND

1. Field

The disclosure relates to a camera technology used in an electronic device.

2. Description of Related Art

In recent years, an electronic device including a camera such as a digital camera, a digital camcorder, a smartphone or the like has been widely distributed. The electronic device including a camera may provide a photographing function. For example, an electronic device may output a preview image obtained from a camera, to the display and may obtain a capture image from the camera while the shutter is in operation.

The above information is presented as background information only to assist with an understanding of the disclosure. No determination has been made, and no assertion is made, as to whether any of the above might be applicable as prior art with regard to the disclosure.

SUMMARY

The electronic device may include a plurality of cameras (e.g., at least one front camera and at least one rear camera). However, when the camera is disposed on the front surface of an electronic device, it is inconvenient for the display of the electronic device to use the entire region of the front surface of the electronic device.

Aspects of the disclosure are to address at least the above-mentioned problems and/or disadvantages and to provide at least the advantages described below. Accordingly, an aspect of the disclosure is to provide an electronic device capable of using one camera module unit as a front camera and a rear camera.

In accordance with an aspect of the disclosure, an electronic device may include a housing, a display, at least part of which is accommodated in the housing, a slide portion including an opening exposed to an outside and sliding with respect to the housing, and a camera module unit disposed at the opening and rotating with respect to the slide portion. The slide portion may be configured to be positioned to overlap with the display, in a first state, to extend from the display by a first stroke, in a second state, and to extend more than the first stroke by a second stroke, in a third state, and the camera module unit may be configured to face a first direction in the first state and the second state and to rotate toward a second direction different from the first direction, by the second stroke when switching to the third state.

In accordance with another aspect of the disclosure, an electronic device may include housing, a display disposed inside the housing and exposed through the first surface, a camera structure capable of sliding in the fourth direction between a first location and a second location, a driving mechanism disposed inside the housing and moving the camera structure in the fourth direction, a processor operatively connected to the display, the image sensor, and the driving mechanism, and a memory operatively connected to the processor. The housing may include a first surface facing a first direction and a second surface facing a second direction opposite to the first direction. The first surface substantially may have a first rectangular shape and may include a first side, which extends in a third direction and has a first length, and a second side, which extends in a fourth direction substantially perpendicular to the first side and has a second length, and the second surface may have a second rectangular shape, the area of which is smaller than the first rectangular shape and may include a third side, which is parallel to the first side and has the first length, and a fourth side, which is parallel to the second side and has a third length shorter than the second length. The camera structure may include, when viewed from above the second surface at the first location, a fifth side, which is substantially aligned or adjacent to the first side, and a sixth side, which is substantially in contact with or adjacent to the third side. The camera structure may include a third surface forming a surface substantially extending from the second surface and at least one image sensor rotating so as to face the second direction at the first location and to face the first direction at the second location, and when viewed from above the second surface at the second location, the first side may be interposed between the third side and the fifth side, and the sixth side may have a first distance from the third side. The memory may store instructions that, when executed, cause the processor to display a user interface of a camera application program on the display, to display a first image from the image sensor on the user interface at the second location, while the first image is displayed, to receive a user input to change a direction of the camera, and to display a second image from the image sensor, on the user interface in a state of moving the camera structure from the second location to the first location by a second distance less than the first distance such that the image sensor faces the second direction in response to the reception of the user input, by using the driving mechanism.

According to various embodiments of the disclosure, the display of the electronic device may be increased in size, using one camera module unit as a front camera and a rear camera.

According to various embodiments of the disclosure, it is possible to reduce the standby time during a video call or when the shoot mode is switched, by subdividing operations of the slide portion and a camera module unit.

According to various embodiments of the disclosure, it is possible to generate a three-dimensional image by using the straight movement of the camera module unit.

According to various embodiments of the disclosure, it is possible to provide various angles of views in the self-mode, using the rotational movement of the camera module unit.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18 illustrates a schematic diagram of a three-dimensional image capturing method, according to various embodiments of the disclosure;

FIG. 20 illustrates a schematic diagram of an image capturing method using a tilting operation of a camera module unit, according to various embodiments of the disclosure;

FIG. 23 illustrates a panorama image, according to various embodiments of the disclosure;

FIG. 25 illustrates a panorama images obtained by an electronic device, according to various embodiments of the disclosure;

DETAILED DESCRIPTION

FIGS. 1A through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to accompanying drawings. However, it should be understood that the disclosure is not intended to be limited to a specific embodiment, but intended to include various modifications, equivalents, and/or alternatives of the corresponding embodiment.

Figure 1A:
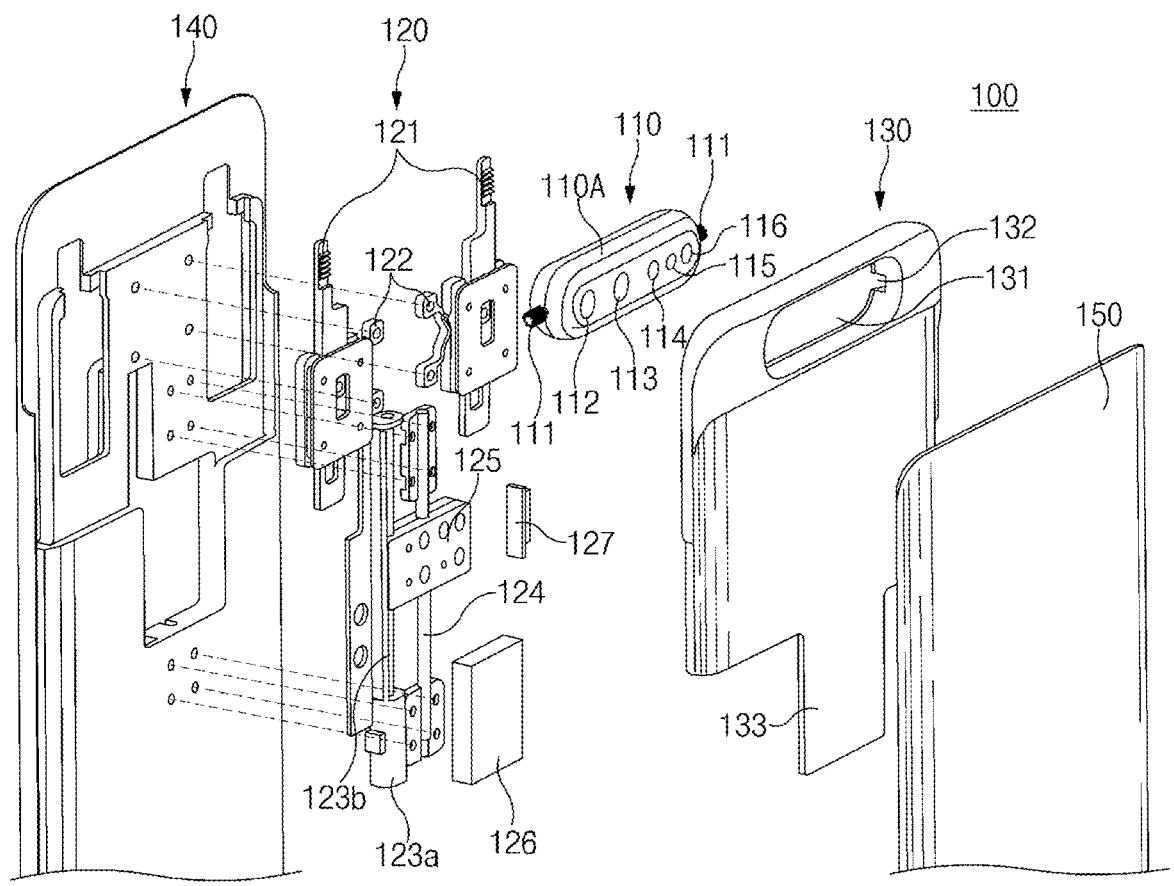
FIG. 1A illustrates an exploded perspective view of an electronic device when viewed from the one side surface, according to an embodiment of the disclosure.
Figure 1B:
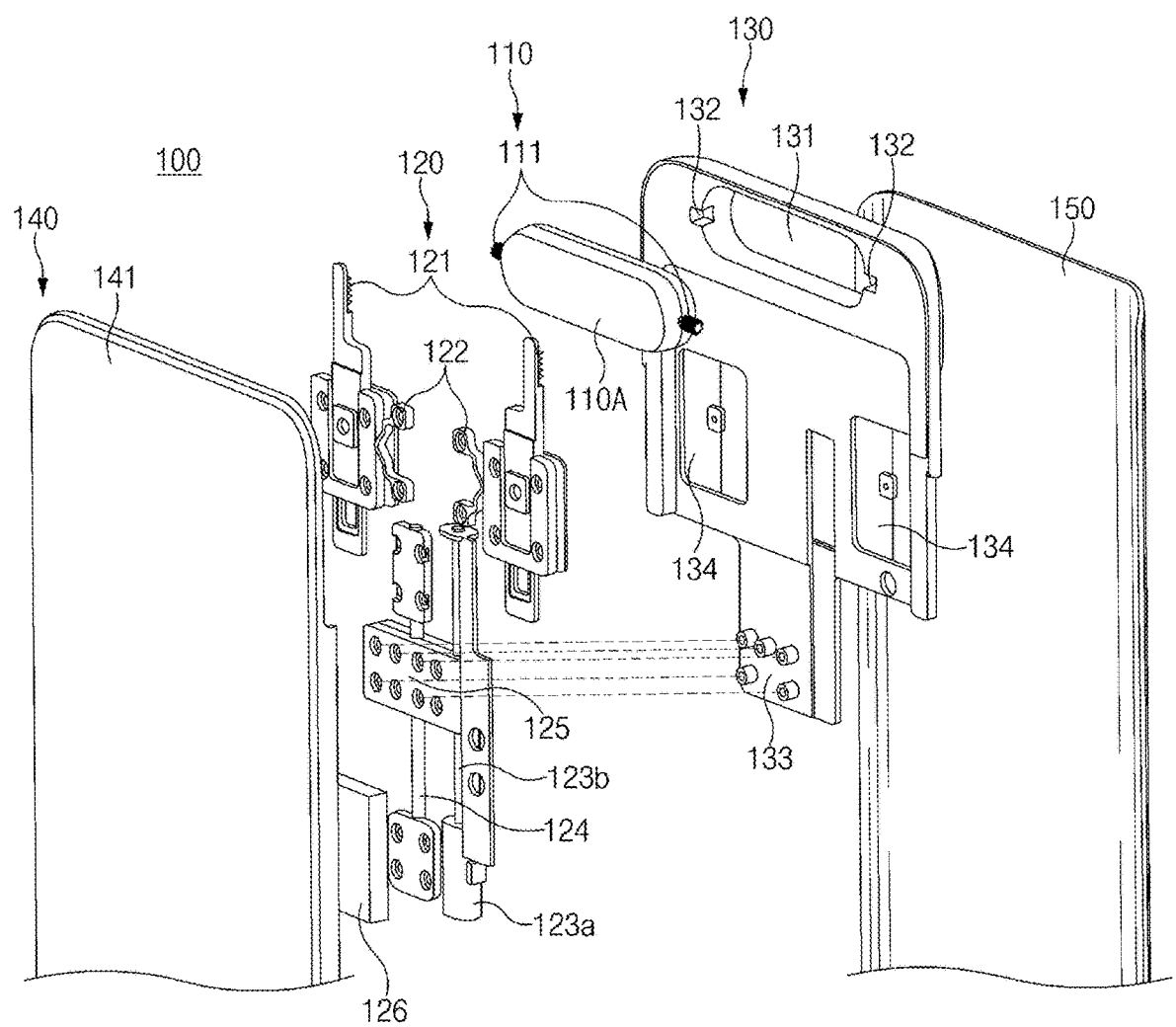
FIG. 1B illustrates an exploded perspective view of an electronic device when viewed from another side surface, according to an embodiment of the disclosure.

FIG. 1A illustrates an exploded perspective view of an electronic device when viewed from the one side surface, according to an embodiment of the disclosure. FIG. 1B illustrates an exploded perspective view of an electronic device when viewed from another side surface, according to an embodiment of the disclosure.

Referring to FIGS. 1A and 1B, an electronic device 100 may include a camera module unit 110, a slide operation control unit 120, a slide portion 130, a display unit 140, and a rear cover 150. In any embodiment, one or more other components may be added to the electronic device 100.

According to an embodiment, the electronic device 100 may include housing including the camera module unit 110, the slide operation control unit 120, the slide portion 130, the display unit 140, and the rear cover 150. According to various embodiments, the housing may be referred to as a "structure" that forms the exterior appearance of the electronic device 100. Alternatively, the housing may include internal structures of the electronic device 100.

According to an embodiment, the camera module unit 110 may include at least one camera device 112, 113, or 116, a flash 114, ora sensor module 115. The at least one camera device 112, 113, or 116 may include one or more lenses, an image sensor, and/or an image signal processor. The flash 114 may include, for example, a light emitting diode or a xenon lamp. The sensor module 115 may generate an electrical signal or a data value corresponding to an internal operation state of the electronic device 100 or corresponding to an external environment state. For example, the sensor module 115 may include a proximity sensor, an illuminance sensor, and an HRM sensor.

According to various embodiments, the electronic device 100 may further include a sensor module not illustrated, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or a fingerprint sensor.

According to an embodiment, the camera module unit 110 may include a camera housing 110A including the at least one camera device 112, 113, or 116, the flash 114, or the sensor module 115. The camera housing 110A may include a pinion gear 111 on at least one side surface. For example, the pinion gear 111 may be symmetrically disposed on both side surfaces of the camera housing 110A. According to various embodiments, the pinion gear 111 may be formed integrally with the camera housing 110A.

According to an embodiment, the slide operation control unit 120 may include a rack gear 121, a cleek 122, a motor 123a, a rotation unit 123b, a guide frame 124, a movement member 125, a control circuit 126, and a control button 127. For example, the control circuit 126 may control the motor 123a by a user input (e.g., front shoot switching input, front shoot default application execution, or click of the control button 127). The rotation unit 123b may rotate depending on the operation of the motor 123a, and the movement member 125 may slide up and down depending on the rotation of the rotation unit 123b. The movement member 125 may be coupled to a part of the slide portion 130 (e.g., a movement member coupling portion 133), and the slide portion 130 may move as the movement member 125 moves. According to various embodiments, the cleek 122, the motor 123a, and the guide frame 124 may be coupled to a portion of the housing (e.g., the rear surface of the display unit 140 or the rear surface of a display 141).

According to an embodiment, the rack gear 121 may move in response to the movement of the slide portion 130. For example, the rack gear 121 may be fixed by the cleek 122 after moving by the first specific distance. After the rack gear 121 is fixed by the cleek 122, the slide portion 130 can further move by the second specific distance.

According to an embodiment, the pinion gear 111 of the camera module unit 110 may be interlocked with the rack gear 121 of the slide operation control unit 120. For example, while moving by the first specific distance, the rack gear 121, the camera module unit 110, and the slide portion 130 may vertically move (e.g., up or down) together. After the rack gear 121 is fixed by the cleek 122, while moving by the second specific distance, the pinion gear 111 may rotate on the rack gear 121, and the camera module unit 110 may rotate within an opening 131.

According to various embodiments, the pinion gear 111 may rotate based on the length (or the number of gears) of the rack gear 121. For example, the angle at which the pinion gear 111 rotates may vary depending on the length (or the number of gears) of the rack gear 121. Accordingly, the camera module unit 110 coupled with the pinion gear 111 may rotate by a specified angle (e.g., 10 to 270 degrees about the rear surface of the electronic device), depending on the length (or the number of gears) of the rack gear 121. For example, the length (or the number of gears) of the rack gear 121 may be set such that the pinion gear 111 rotates by 180 degrees. According to various embodiments, the length (or the number of gears) of the rack gear 121 may be set such that the pinion gear 111 rotates by 180 degrees or less (0-180 degrees). Alternatively, the length (or the number of gears) of the rack gear 121 may be set such that the pinion gear 111 rotates by 180 degrees or more (180-300 degrees). When the pinion gear 111 rotates by 180 degrees or more, the camera module unit 110 may rotate at an angle more suitable for using a self-camera.

According to an embodiment, the slide portion 130 may include an opening 131, a gear groove 132, and the movement member coupling portion 133. For example, the opening 131 may be formed at a part (e.g., at the top end of the slide portion 130) of the slide portion 130. The opening 131 may be formed to correspond to the size of the camera module unit 110. The camera module unit 110 may be disposed in the opening 131. The camera module unit 110 may rotate inside the opening 131 about the pinion gear 111. The pinion gear 111 may be disposed in the gear groove 132. The pinion gear 111 may rotate inside the gear groove 132. The movement member coupling portion 133 may be coupled to the movement member 125. Accordingly, the slide portion 130 may move depending on the movement (e.g., upward and downward movement) of the movement member 125.

According to various embodiments, the slide portion 130 may include a gear guide home 134. For example, the rack gear 121 may be disposed to correspond to the gear guide home 134. The movement radius of the rack gear 121 may be determined by the gear guide home 134.

According to an embodiment, the display unit 140 may include the display 141. For example, the display 141 may be coupled to a touch sensing circuit, a pressure sensor which may measure the intensity (or pressure) of a touch, and/or a digitizer detecting a magnetic stylus pen or may be positioned adjacent thereto. In any embodiment, at least part of the sensor module (not shown), and/or at least part of the key input device (not illustrated) may be disposed in a part of the display 141. According to various embodiments, the camera may not be disposed in the display 141, and thus the size of the display 141 may be increased on the front surface of the electronic device 100.

According to an embodiment, the rear cover 150 may cover a part of the slide portion 130. For example, the opening 131 may be formed at a part of the slide portion 130 (e.g., at the top end of the slide portion 130) that is not covered by the rear cover 150. The slide portion 130 may slide up and down between the display unit 140 and the rear cover 150. For example, the rear cover 150 may be formed by coated or colored glass, ceramic, polymer, metal (e.g., aluminum, stainless steel (STS), or magnesium), or a combination of at least two of the materials.

According to an embodiment, the electronic device 100 may include an audio module (not illustrated). For example, the audio module may include a microphone hole and a speaker hole. A microphone for obtaining external sound may be positioned within the microphone hole. In any embodiment, a plurality of microphones may be positioned to make it possible to detect a direction of sound. The speaker hole may include an external speaker hole and a receiver hole for a call. In any embodiment, the speaker hole and the microphone hole may be implemented with one hole, or a speaker (e.g., a piezo speaker) may be included without the speaker hole.

According to an embodiment, the electronic device 100 may include a key input device (not illustrated). For example, the key input device may include a home key button positioned on the front surface of the electronic device 100, a touch pad positioned in the vicinity of the home key button, and/or a control button 127 positioned on the side surface of the electronic device 100. In another embodiment, the electronic device 100 may not include all or a part of the above-described key input devices, and the key input device not included may be implemented on the display 141 in the form of a soft key.

According to an embodiment, the electronic device 100 may include a connector hole (not illustrated). For example, the connector hole may include a first connector hole which may accommodate a connector (e.g., a USB connector) for transmitting/receiving a power and/or data to/from an external electronic device, and/or a second connector hole (e.g., an earphone jack) which may accommodate for transmitting/receiving an audio signal to/from the external electronic device.

According to an embodiment, the electronic device 100 may include a printed circuit board (not illustrated) between the display unit 140 and the rear cover 150. For example, the printed circuit board may be equipped with a processor (e.g., the control circuit 126), a memory, and/or an interface. For example, the processor may include one or more of a central processing unit, an application processor, a graphic processing device, an image signal processor, a sensor hub processor, or a communication processor.

Figure 2A:
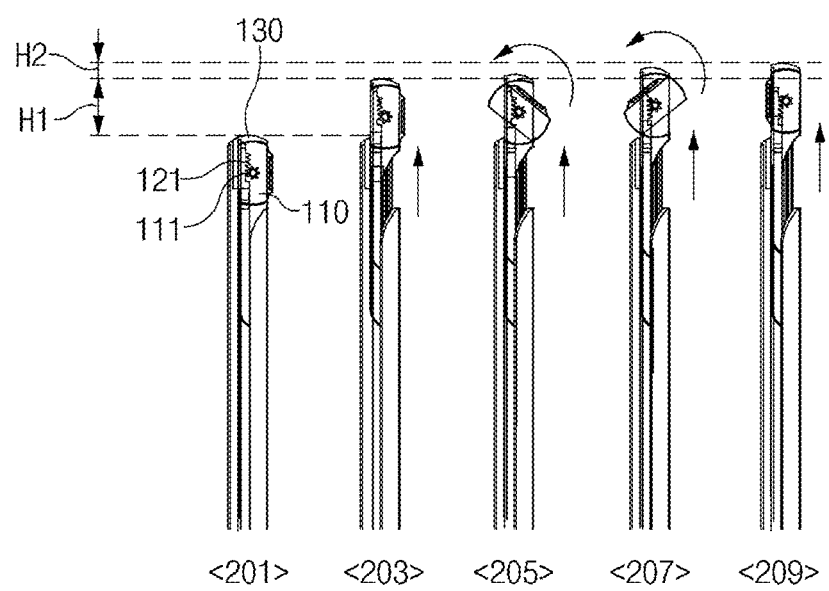
FIG. 2A illustrates a side view of an ascending operation of a camera module unit, according to an embodiment of the disclosure.

FIG. 2A illustrates a side view of an ascending operation of a camera module, according to an embodiment of the disclosure.

Referring to FIG. 2A, the camera module unit 110 may perform an ascending operation or a rotation operation, based on a user input (e.g., front shoot switching input or front shoot default application execution). As the camera module unit 110 rotates, at least one camera included in the camera module unit 110 may be used as a front camera (e.g., a self-camera).

According to an embodiment, in state 201, the camera included in the camera module unit 110 may face the rear surface of the electronic device 100. At this time, the camera included in the camera module unit 110 may be used as a rear camera.

According to an embodiment, in state 203, the camera module unit 110, the rack gear 121, and the slide portion 130 may perform upward movement based on a user input. For example, the camera module unit 110, the rack gear 121, and the slide portion 130 may move by a first movement distance H1. In state 203, the rack gear 121 may be fixed by a cleek (e.g., the cleek 122).

According to an embodiment, in state 205 to state 209, the camera module unit 110 may perform upward movement and rotational movement. For example, in state 205 to state 209, the rack gear 121 may be fixed by the cleek, and only the camera module unit 110 and the slide portion 130 may slide up. The camera module unit 110 and the slide portion 130 may slide up by a second movement distance H2. The pinion gear 111 may rotate while being interlocked with the rack gear 121. Accordingly, the camera module unit 110 may rotate. In state 209, the camera included in the camera module unit 110 may face the front surface of the electronic device 100. At this time, the camera included in the camera module unit 110 may be used as a front camera.

According to various embodiments, the pinion gear 111 may rotate based on the length (or the number of gears) of the rack gear 121. For example, the angle at which the pinion gear 111 rotates may vary depending on the length (or the number of gears) of the rack gear 121. Accordingly, the camera module unit 110 coupled with the pinion gear 111 may rotate by a specified angle (e.g., 10 to 270 degrees about the rear surface of the electronic device), depending on the length (or the number of gears) of the rack gear 121. For example, the length (or the number of gears) of the rack gear 121 may be set such that the pinion gear 111 rotates by 180 degrees. According to various embodiments, the length (or the number of gears) of the rack gear 121 may be set such that the pinion gear 111 rotates by 180 degrees or less (0-180 degrees). Alternatively, the length (or the number of gears) of the rack gear 121 may be set such that the pinion gear 111 rotates by 180 degrees or more (180-300 degrees). When the pinion gear 111 rotates by 180 degrees or more, the camera module unit 110 may rotate at an angle more suitable for using a self-camera.

Figure 2B:
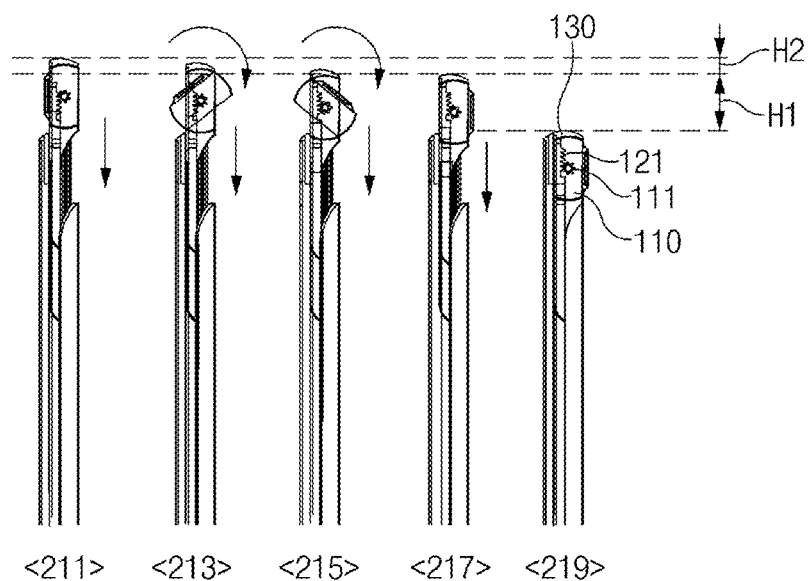
FIG. 2B illustrates a side view of a descending operation of a camera module unit, according to an embodiment of the disclosure.
Figure 3A:
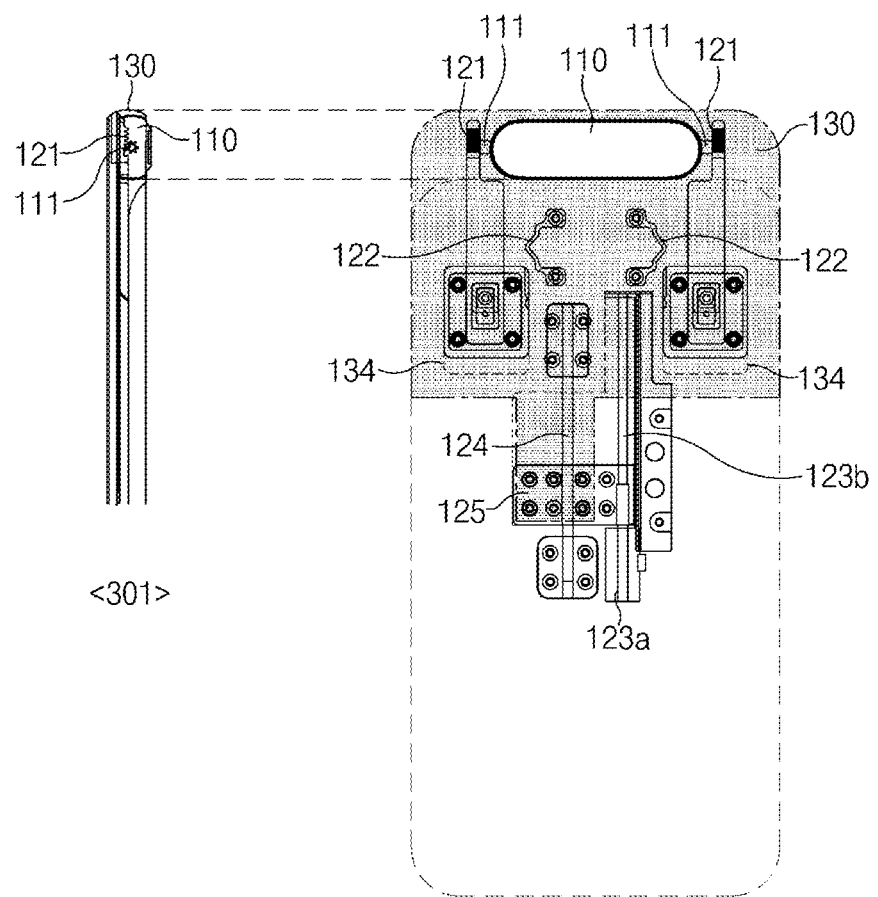
FIGS. 3A to 3E illustrate perspective views of an ascending operation of a camera module unit, according to an embodiment of the disclosure.
Figure 3B:
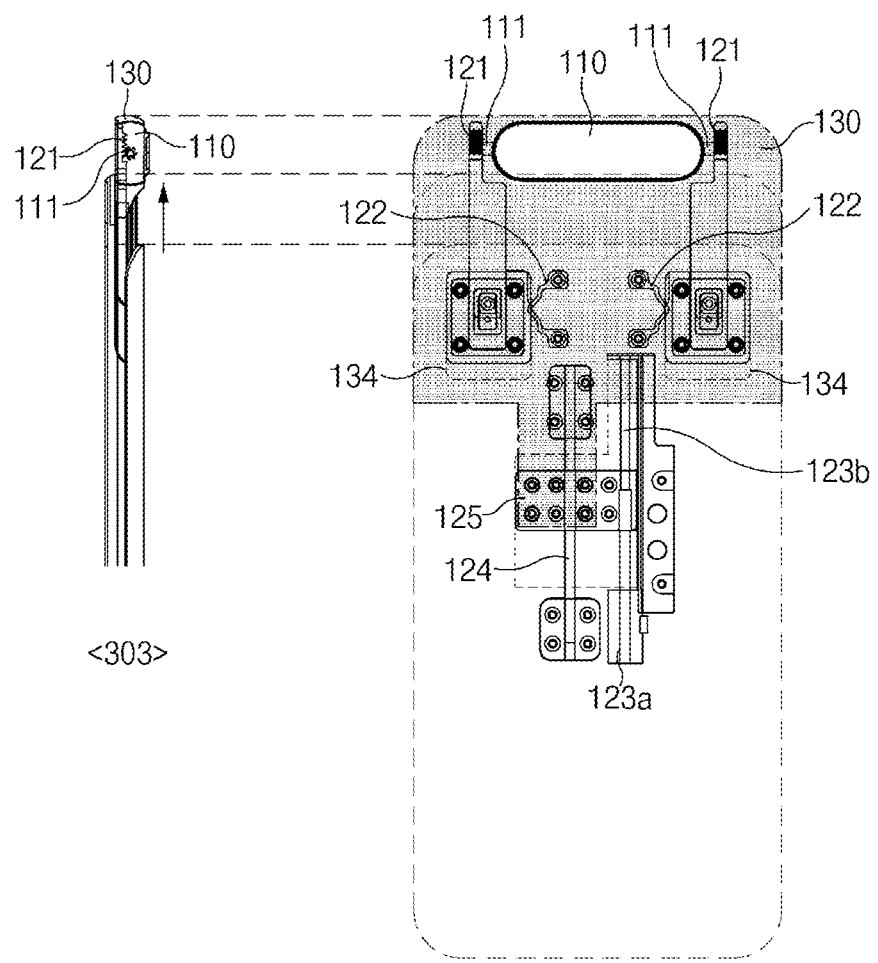
Figure 3C:
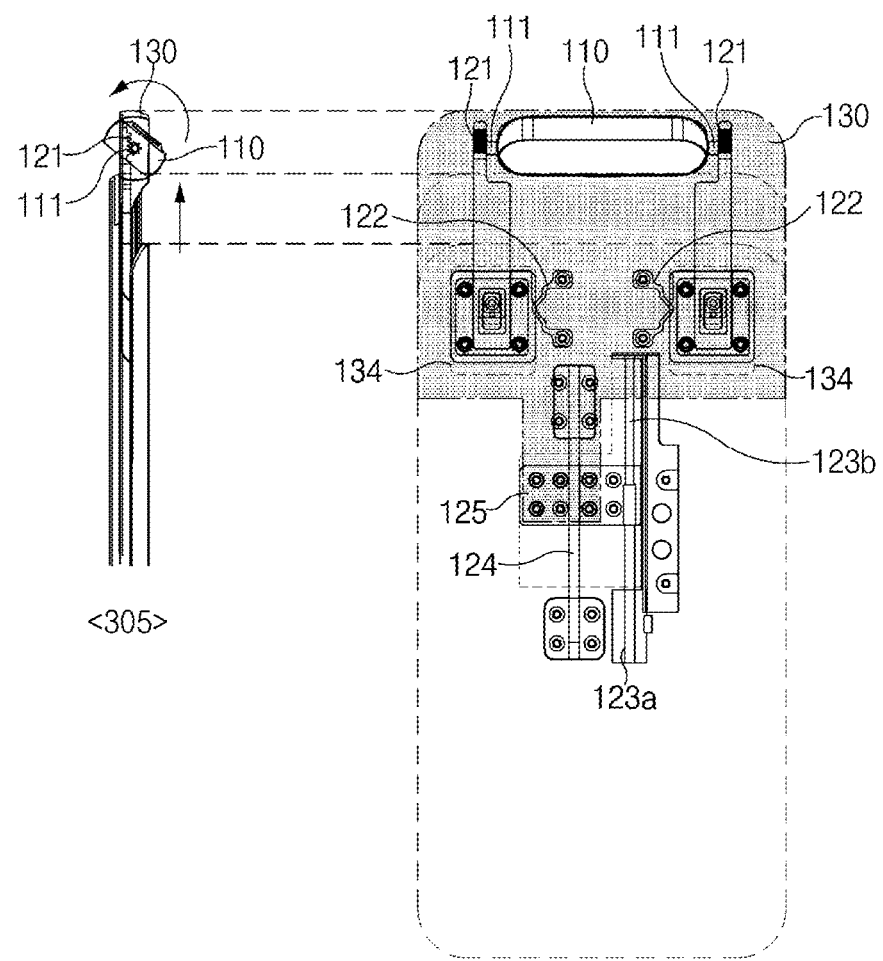
Figure 3D:
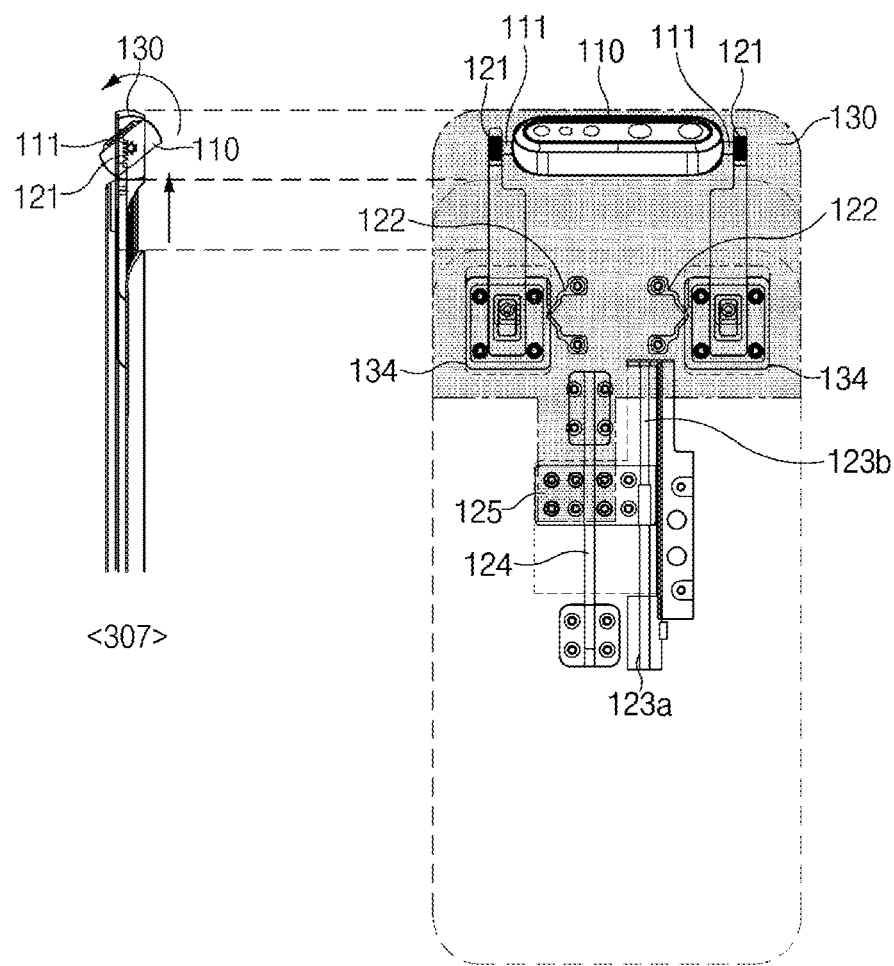
Figure 3E:
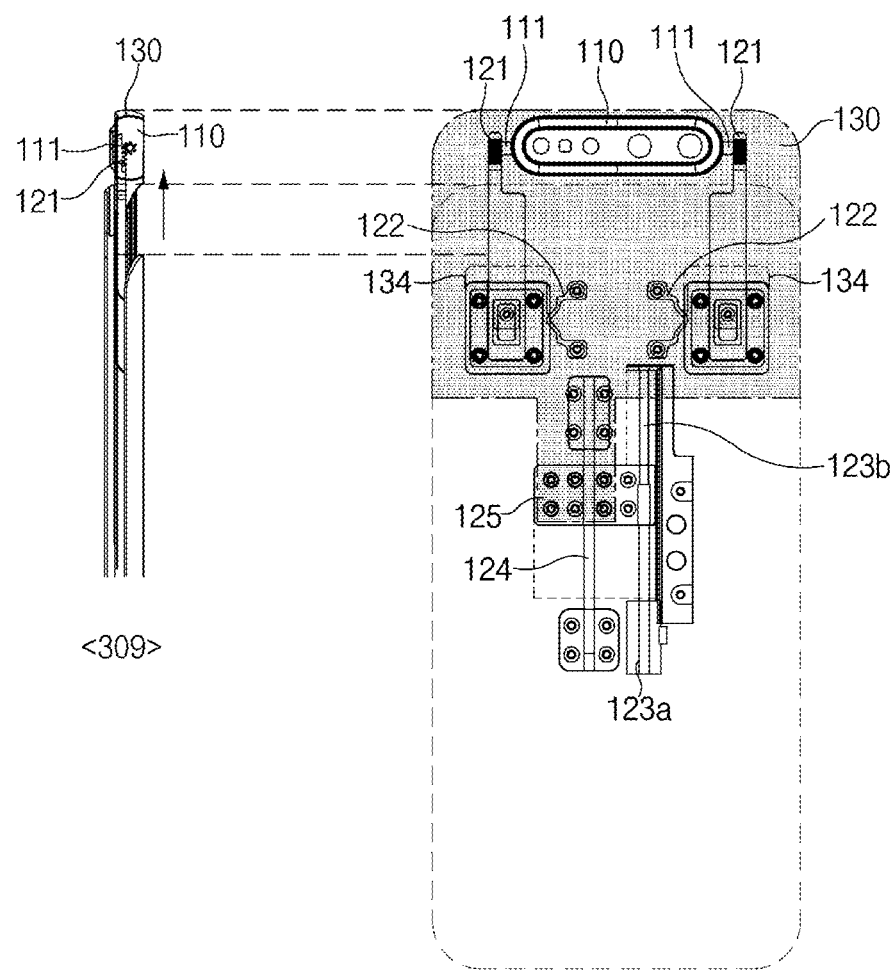
Figure 4A:
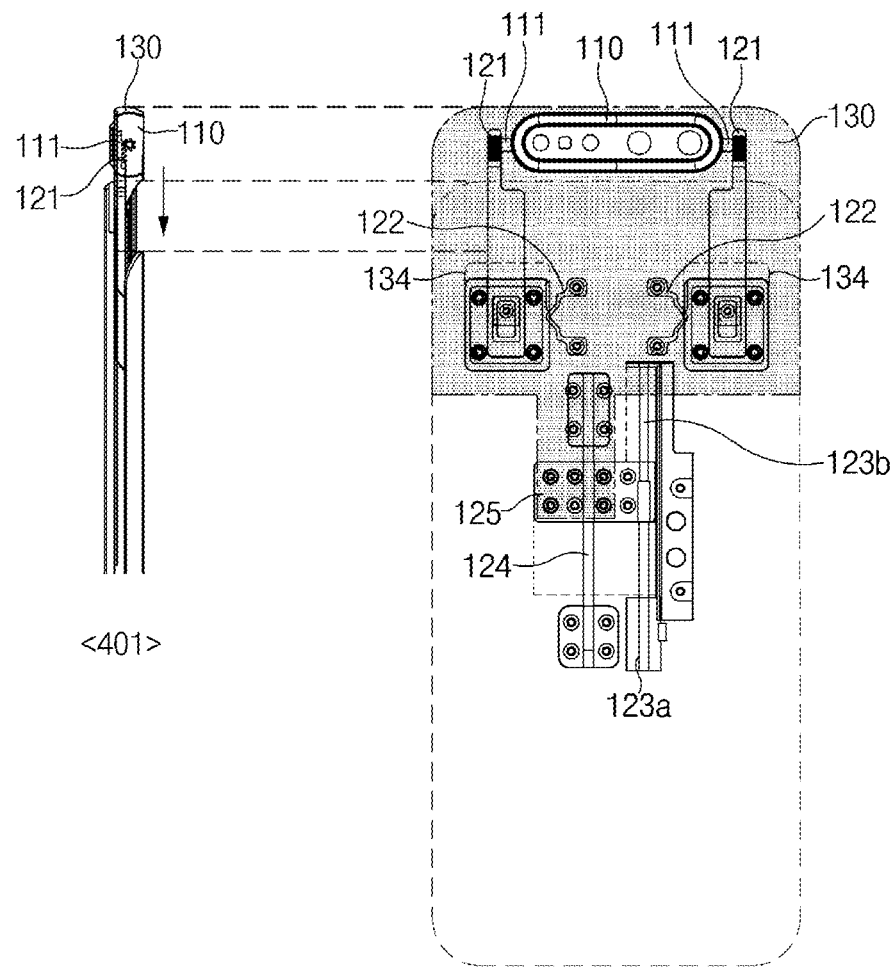
FIGS. 4A to 4E illustrate perspective views of a descending operation of a camera module, according to an embodiment of the disclosure.
Figure 4B:
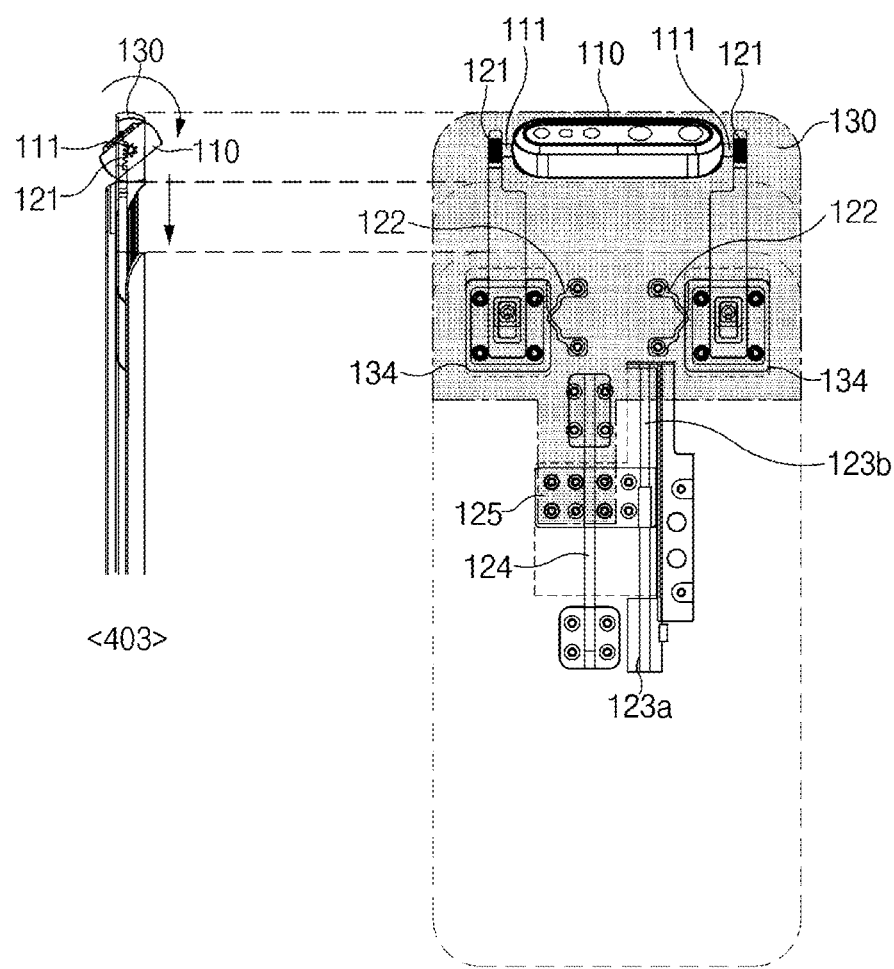
Figure 4C:
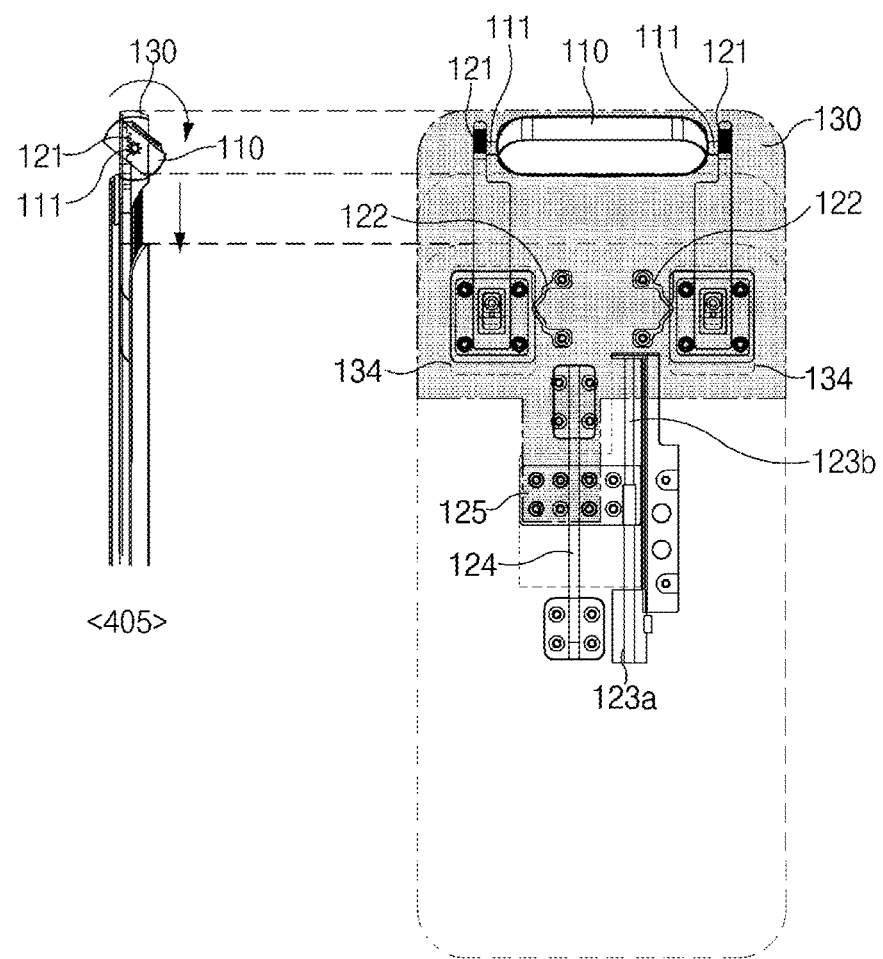
Figure 4D:
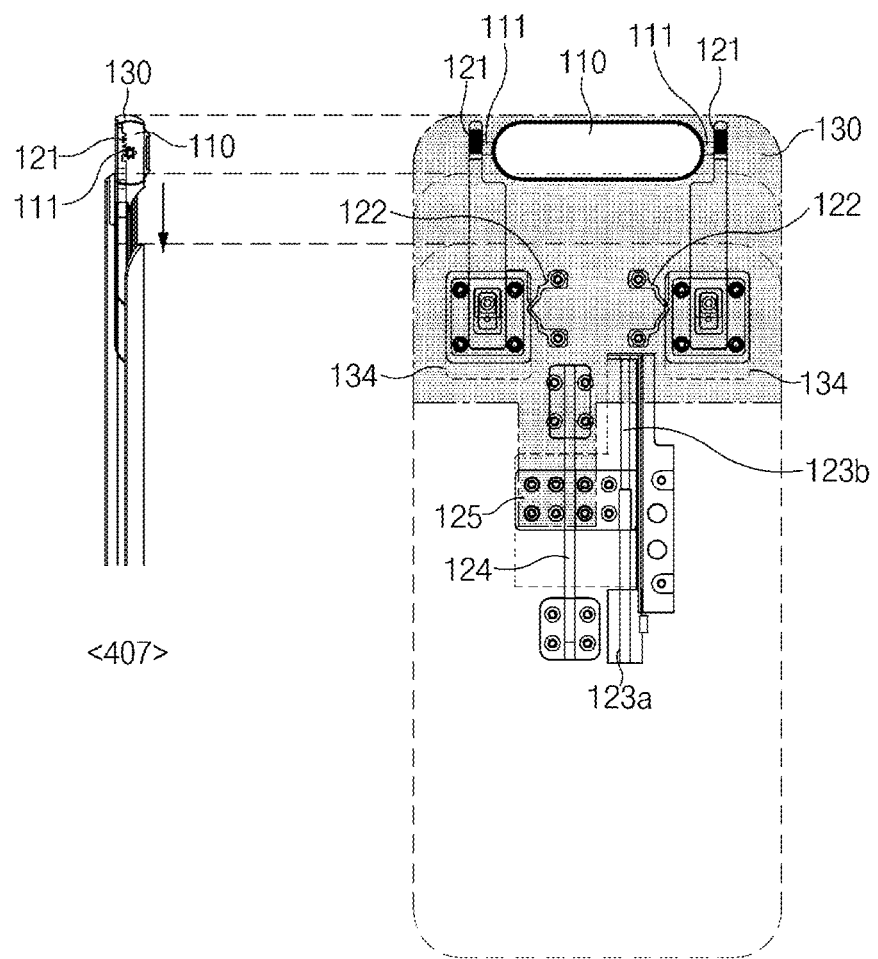
Figure 4E:
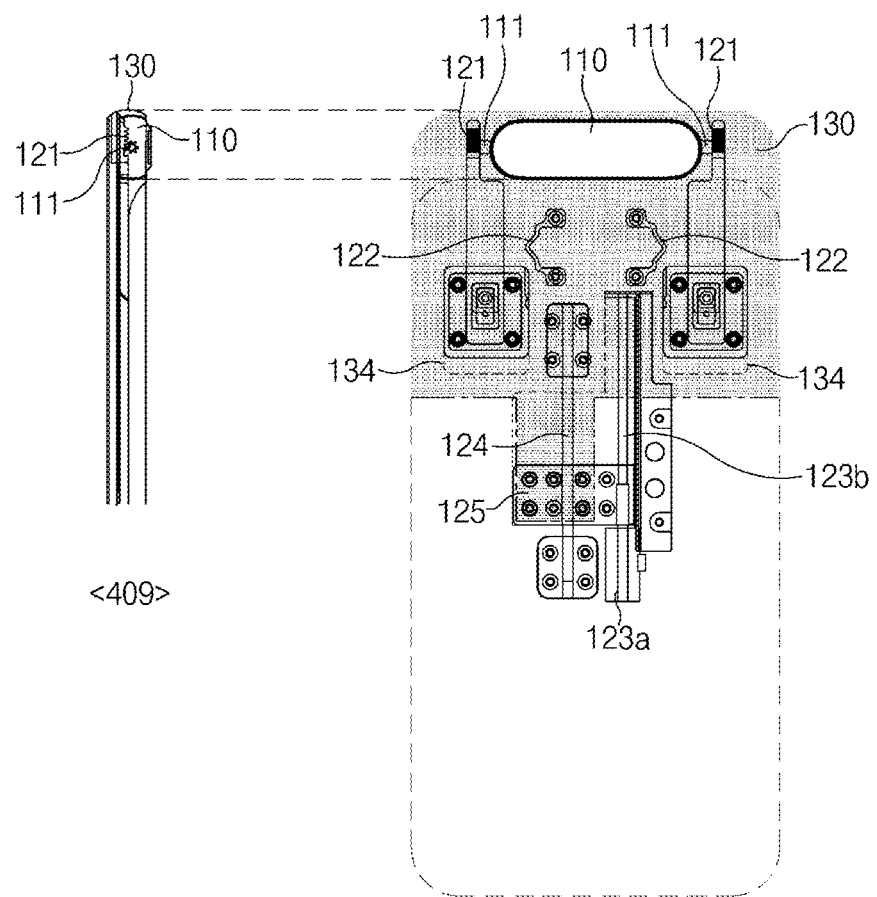

FIG. 2B illustrates a side view of a descending operation of a camera module, according to an embodiment of the disclosure.

Referring to FIG. 2B, the camera module unit 110 may perform a descending operation or a rotation operation, based on a user input (e.g., rear shooting switching input or shooting termination input). As the camera module unit 110 rotates, at least one camera included in the camera module unit 110 may be used as a rear camera.

According to an embodiment, in state 211, the camera included in the camera module unit 110 may face the front surface of the electronic device 100. For example, the camera included in the camera module unit 110 may face the front surface of the electronic device 100 by a previously entered user input (e.g., front shoot switching input or front shoot default application execution). In various embodiments, the camera module unit 110 may face the front surface of the electronic device 100 at a specific angle (e.g., 10 to 270 degrees with respect to the rear surface of the electronic device 100) depending on the gear ratio of the pinion gear 111 to the rack gear 121.

According to an embodiment, in state 211 to state 215, the camera module unit 110 may perform downward movement and rotational movement. For example, in state 211 to state 215, the rack gear 121 may be maintained to be fixed by the cleek, and only the camera module unit 110 and the slide portion 130 may slide down. The camera module unit 110 and the slide portion 130 may slide down by a second movement distance H2. The pinion gear 111 may rotate while being interlocked with the rack gear 121. Accordingly, the camera module unit 110 may rotate.

According to an embodiment, in state 217, the camera included in the camera module unit 110 may face the rear surface of the electronic device 100. For example, in state 217, the camera module unit 110, the rack gear 121, and the slide portion 130 may perform downward movement together. At this time, the rack gear 121 may be released from the cleek. The camera module unit 110, the rack gear 121, and the slide portion 130 may move by the first movement distance H1. In state 219, the camera module unit 110 may return to the original location (e.g., state 201).

FIGS. 3A to 3E illustrate perspective views of an ascending operation of a camera module unit, according to an embodiment of the disclosure.

Referring to FIGS. 3A to 3E, the camera module unit 110 may perform an ascending operation or a rotation operation, based on a user input (e.g., front shoot switching input or front shoot default application execution). As the camera module unit 110 rotates, at least one camera included in the camera module unit 110 may be used as a front camera (e.g., a self-camera).

According to an embodiment, in state 301, the camera included in the camera module unit 110 may face the rear surface of the electronic device 100. At this time, the camera included in the camera module unit 110 may be used as a rear camera. The movement member 125 may be located at a reference location (e.g., the bottom end of the guide frame 124).

According to an embodiment, in state 303, the camera module unit 110, the rack gear 121, and the slide portion 130 may perform upward movement based on a user input. For example, the motor 123a operates under control of a control circuit (e.g., the control circuit 126), and the rotation unit 123b may rotate in the first rotation direction by the motor 123a. The movement member 125 may slide up depending on the rotation of the rotation unit 123b. The slide portion 130 coupled to the movement member 125 moves upward and the rack gear 121 and the camera module unit 110, which are connected to the slide portion 130, may slide up together. The camera module unit 110, the rack gear 121, and the slide portion 130 may move by a first movement distance. In state 303, the rack gear 121 may be fixed by the cleek 122.

According to an embodiment, in state 305 to state 309, the camera module unit 110 may perform upward movement and rotational movement. For example, in state 305 to state 309, the rack gear 121 may be fixed by the cleek 122, and only the camera module unit 110 and the slide portion 130 may slide up. The camera module unit 110 and the slide portion 130 may slide up by a second movement distance. The pinion gear 111 may rotate while being interlocked with the rack gear 121. Accordingly, the camera module unit 110 may rotate.

According to an embodiment, in state 309, the camera included in the camera module unit 110 may face the front surface of the electronic device 100. For example, the movement member 125 may be located at the top end of the guide frame 124. At this time, the camera included in the camera module unit 110 may be used as a front camera.

According to various embodiments, the pinion gear 111 may rotate based on the length (or the number of gears) of the rack gear 121. For example, the angle at which the pinion gear 111 rotates may vary depending on the length (or the number of gears) of the rack gear 121. Accordingly, the camera module unit 110 coupled with the pinion gear 111 may rotate by a specified angle (e.g., 10 to 270 degrees about the rear surface of the electronic device), depending on the length (or the number of gears) of the rack gear 121. For example, the length (or the number of gears) of the rack gear 121 may be set such that the pinion gear 111 rotates by 180 degrees. According to various embodiments, the length (or the number of gears) of the rack gear 121 may be set such that the pinion gear 111 rotates by 180 degrees or less (0-180 degrees). Alternatively, the length (or the number of gears) of the rack gear 121 may be set such that the pinion gear 111 rotates by 180 degrees or more (180-300 degrees). When the pinion gear 111 rotates by 180 degrees or more, the camera module unit 110 may rotate at an angle more suitable for using a self-camera.

FIGS. 4A to 4E illustrate perspective views of a descending operation of a camera module unit, according to an embodiment of the disclosure.

Referring to FIGS. 4A to 4E, the camera module unit 110 may perform a descending operation or a rotation operation, based on a user input (e.g., rear shooting switching input or shooting termination input). As the camera module unit 110 rotates, at least one camera included in the camera module unit 110 may be used as a rear camera.

According to an embodiment, in state 401, the camera included in the camera module unit 110 may face the front surface of the electronic device 100. For example, the camera included in the camera module unit 110 may face the front surface of the electronic device 100 by a previously entered user input (e.g., front shoot switching input or front shoot default application execution). The motor 123a operates under control of a control circuit (e.g., the control circuit 126), and the rotation unit 123b may rotate by the motor 123a in the direction opposite to first rotation direction. The movement member 125 may slide down depending on the rotation of the rotation unit 123b. The slide portion 130 coupled to the movement member 125 moves downward and the camera module unit 110 connected to the slide portion 130 may slide down. The camera module unit 110 and the slide portion 130 may move by a second movement distance. At this time, the rack gear 121 may be fixed by the cleek 122, and thus the rack gear 121 may not slide down.

According to an embodiment, in state 403 to state 407, the camera module unit 110 may perform downward movement and rotational movement. For example, in state 403 to state 407, the rack gear 121 may be maintained to be fixed by the cleek, and only the camera module unit 110 and the slide portion 130 may slide down. The camera module unit 110 and the slide portion 130 may slide down by the second movement distance. The pinion gear 111 may rotate while being interlocked with the rack gear 121. Accordingly, the camera module unit 110 may rotate.

According to an embodiment, in state 407, the camera included in the camera module unit 110 may face the rear surface of the electronic device 100. For example, in state 407, the camera module unit 110, the rack gear 121, and the slide portion 130 may perform downward movement together. At this time, the rack gear 121 may be released from the cleek. The camera module unit 110, the rack gear 121, and the slide portion 130 may move by a first movement distance. In state 409, the camera module unit 110 may return to the original location (e.g., state 301). In state 409, the movement member 125 may be located at the bottom end of the guide frame 124.

Figure 5:
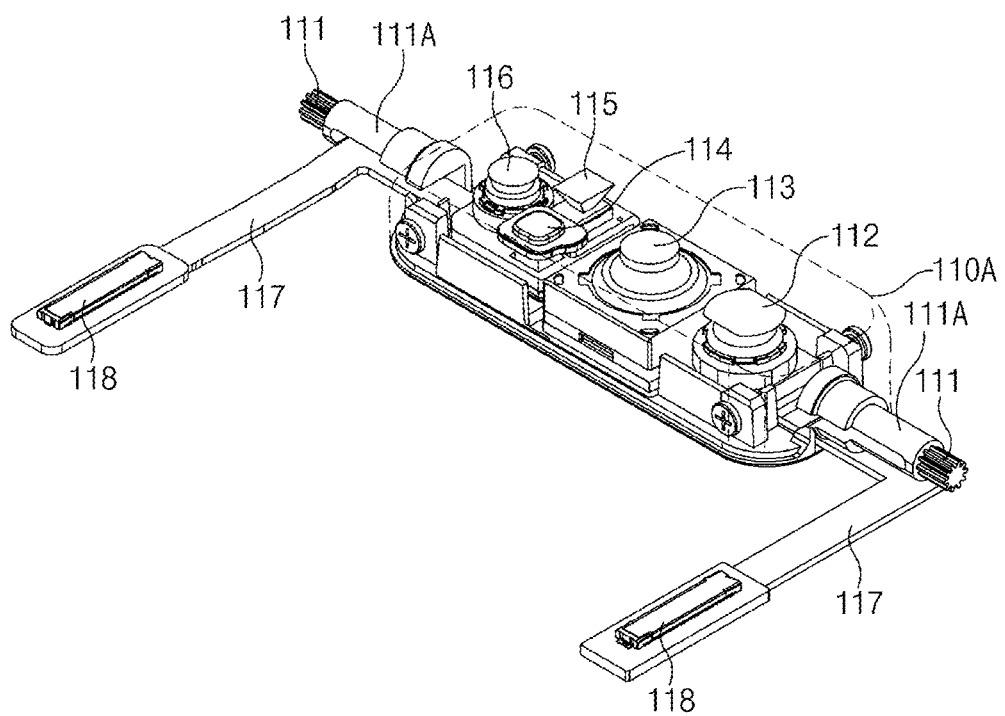
FIG. 5 illustrates a view of an example structure of a camera module unit, according to an embodiment of the disclosure.

FIG. 5 illustrates a view of an example structure of a camera module unit, according to an embodiment of the disclosure.

Referring to FIG. 5, the camera module unit 110 may include at least one camera device 112, 113, or 116, the flash 114, or the sensor module 115. The at least one camera device 112, 113, or 116 may include one or more lenses, an image sensor, and/or an image signal processor. The flash 114 may include, for example, a light emitting diode or a xenon lamp. The sensor module 115 may generate an electrical signal or a data value corresponding to an internal operation state of the electronic device 100 or corresponding to an external environment state. For example, the sensor module 115 may include a proximity sensor, an illuminance sensor, and an HRM sensor.

According to an embodiment, the camera module unit 110 may include a Flexible Printed Circuit Board (FPCB) 117 and a connection terminal 118. For example, the camera module unit 110 may be connected to a printed circuit board in an electronic device (e.g., the electronic device 100) via the FPCB 117. The connection terminal 118 may be connected to the corresponding terminal on a printed circuit board in the electronic device.

According to an embodiment, the FPCB 117 may be formed to have at least one bend. For example, the FPCB 117 may include a first portion extending from the camera module unit 110 in a first direction (e.g., an axial direction of the pinion gear 111) and a second portion extending in a second direction perpendicular to the first direction.

According to various embodiments, the FPCB 117 may be configured to be wound around an extension portion 111A of the rotation shaft of the pinion gear 111 depending on the rotation of the camera module unit 110. For example, a part of the FPCB 117 may be disposed to pass through the extension portion 111A of the rotation shaft of the pinion gear 111. For example, a part of the FPCB 117 may be disposed parallel with the extension portion 111A of the rotation shaft of the pinion gear 111. In various embodiments, the FPCB 117 may be interposed between the camera housing 110A and the pinion gear 111.

According to an embodiment, the camera module unit 110 may include the camera housing 110A including the at least one camera device 112, 113, or 116, the flash 114, or the sensor module 115. The camera housing 110A may include a pinion gear 111 on at least one side surface. According to various embodiments, the pinion gear 111 may be formed integrally with the camera housing 110A.

Figure 6A:
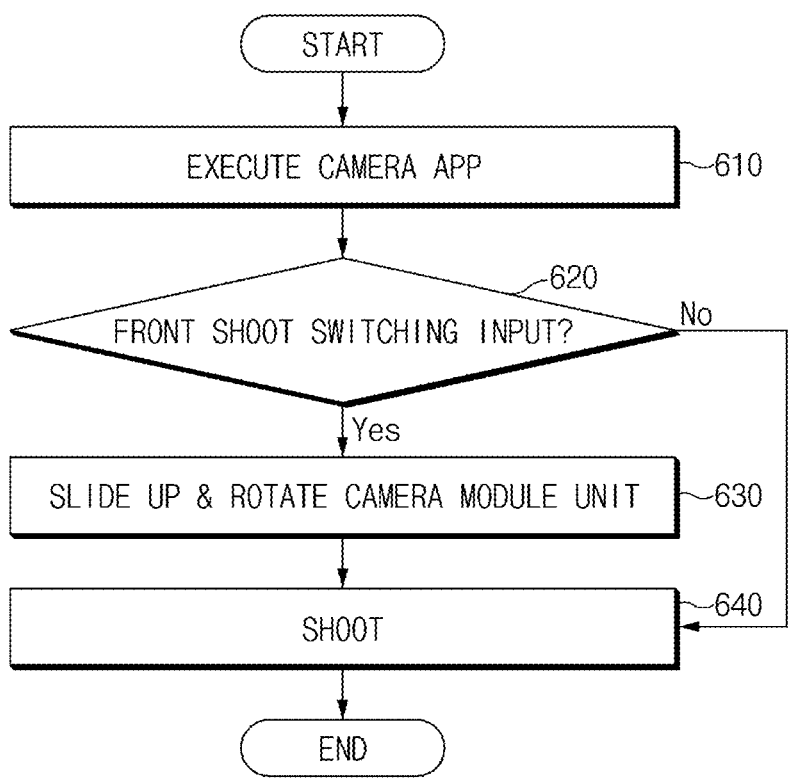
FIG. 6A illustrates a flowchart for operating a camera module unit, according to an embodiment of the disclosure.
Figure 6B:
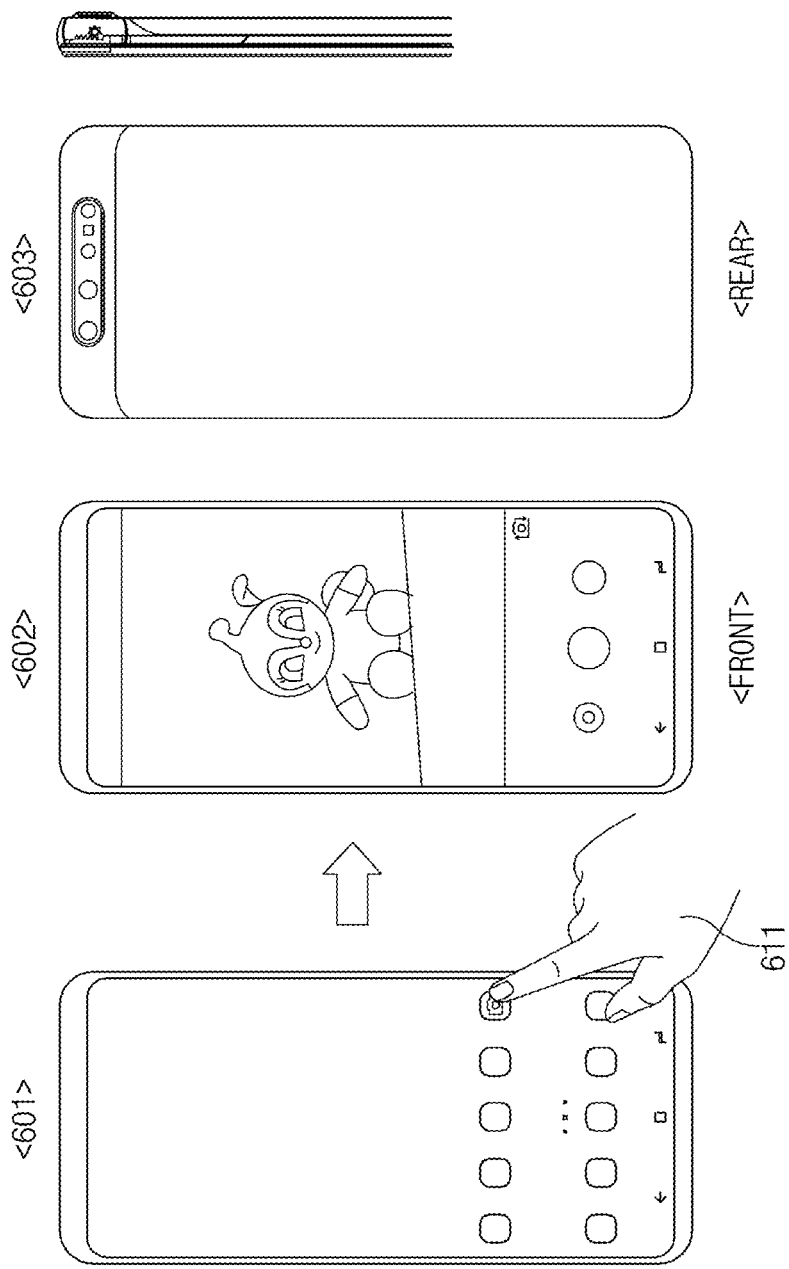
FIG. 6B illustrates a view of a default location of a camera module unit, according to an embodiment of the disclosure.
Figure 6C:
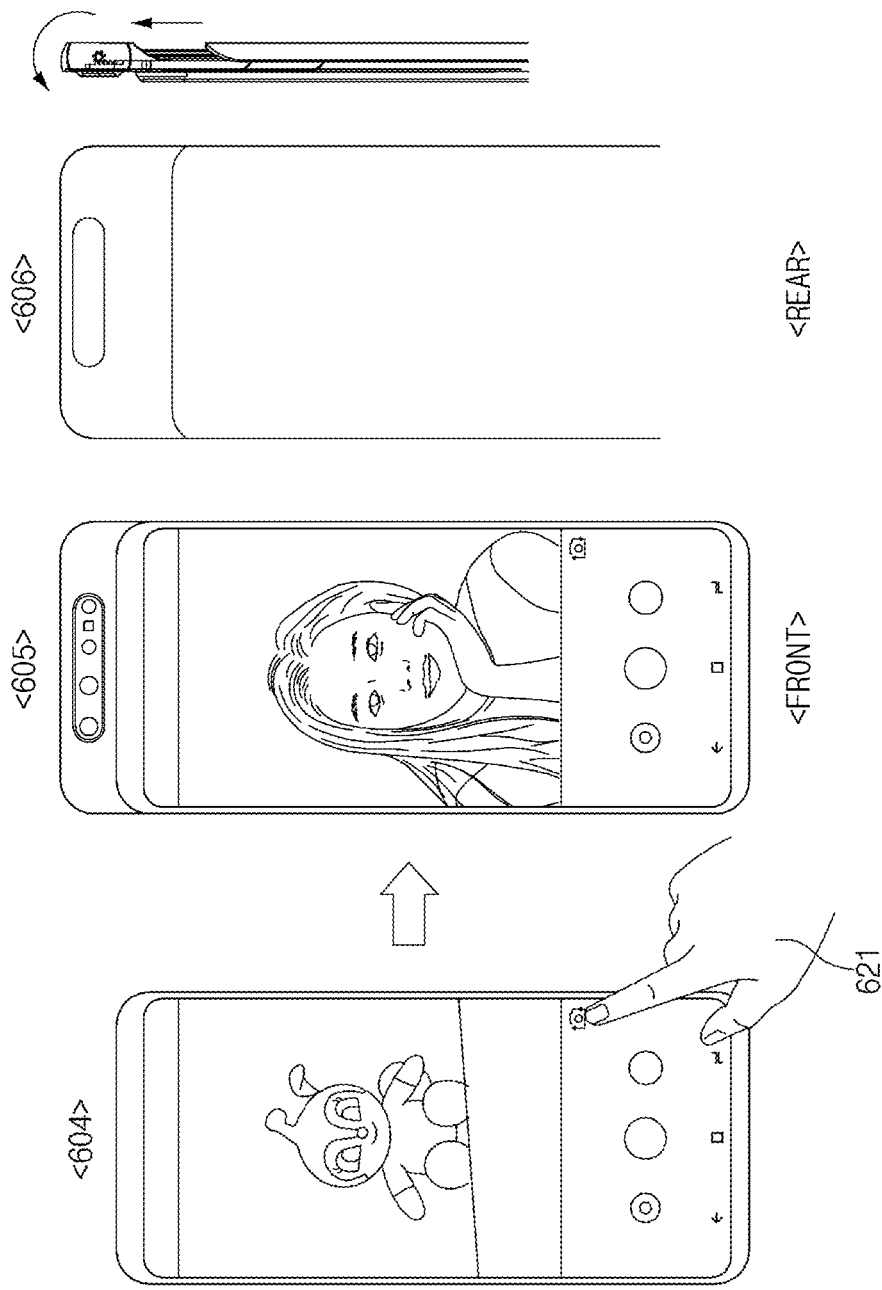
FIG. 6C illustrates a view of an operation of the camera module unit when the front shoot switching input is made, according to an embodiment of the disclosure.

FIG. 6A illustrates a flowchart for operating a camera module unit, according to an embodiment of the disclosure. FIG. 6B illustrates a view of a default location of a camera module unit, according to an embodiment of the disclosure. FIG. 6C illustrates a view of an operation of the camera module unit when the front shoot switching input is made, according to an embodiment of the disclosure.

According to an embodiment, in operation 610, an electronic device (e.g., the electronic device 100) may execute a camera app (or all apps associated with the execution of a camera). For example, referring to FIG. 6B, the electronic device may receive a user input 611 (e.g., touch of a camera app icon). In state 601, the electronic device may display a screen in which a camera app icon is displayed. In state 602, the electronic device may display a camera app screen depending on the user input 611. State 603 illustrates the rear surface of the electronic device in state 602. In state 602, when a camera app is executed, a camera module unit (e.g., the camera module unit 110) may face the rear surface of the electronic device basically.

According to an embodiment, in operation 620, the electronic device may determine whether a front shoot switching input is received. For example, when there is no front shoot switching input, the procedure may move to operation 640, and the electronic device may perform shooting depending on default settings (e.g., a rear camera). When the front shoot switching input is present, the electronic device may perform operation 630.

According to an embodiment, in operation 630, when the front shoot switching input is present, the electronic device may move upwardly and rotate the camera module unit. Referring to FIG. 6C, in state 604, the electronic device may receive a user input 621 (e.g., front shoot switching input). In state 605 and state 606, the electronic device may move upwardly and rotate the camera module unit. State 605 illustrates the front surface of an electronic device, and state 606 illustrates the rear surface of an electronic device. In state 605 and state 606, the electronic device may convert the camera included in the camera module unit to the front camera.

According to an embodiment, in operation 640, the electronic device may perform shooting depending on the current settings. For example, when the camera module unit faces the rear surface of the electronic device, the camera included in the camera module unit may operates as a rear camera. When the camera module unit faces the front surface of the electronic device, the camera included in the camera module unit may operates as a front camera.

Figure 7A:
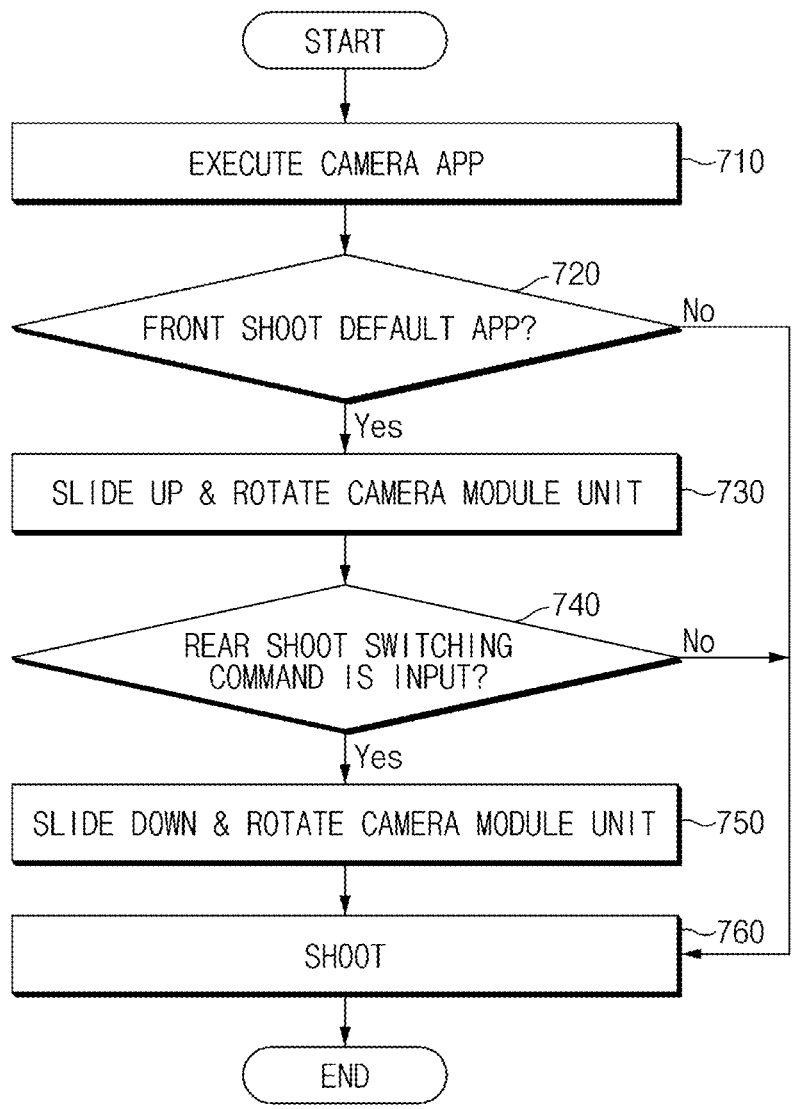
FIG. 7A illustrates a flowchart for operating a camera module unit, according to various embodiments of the disclosure.
Figure 7B:
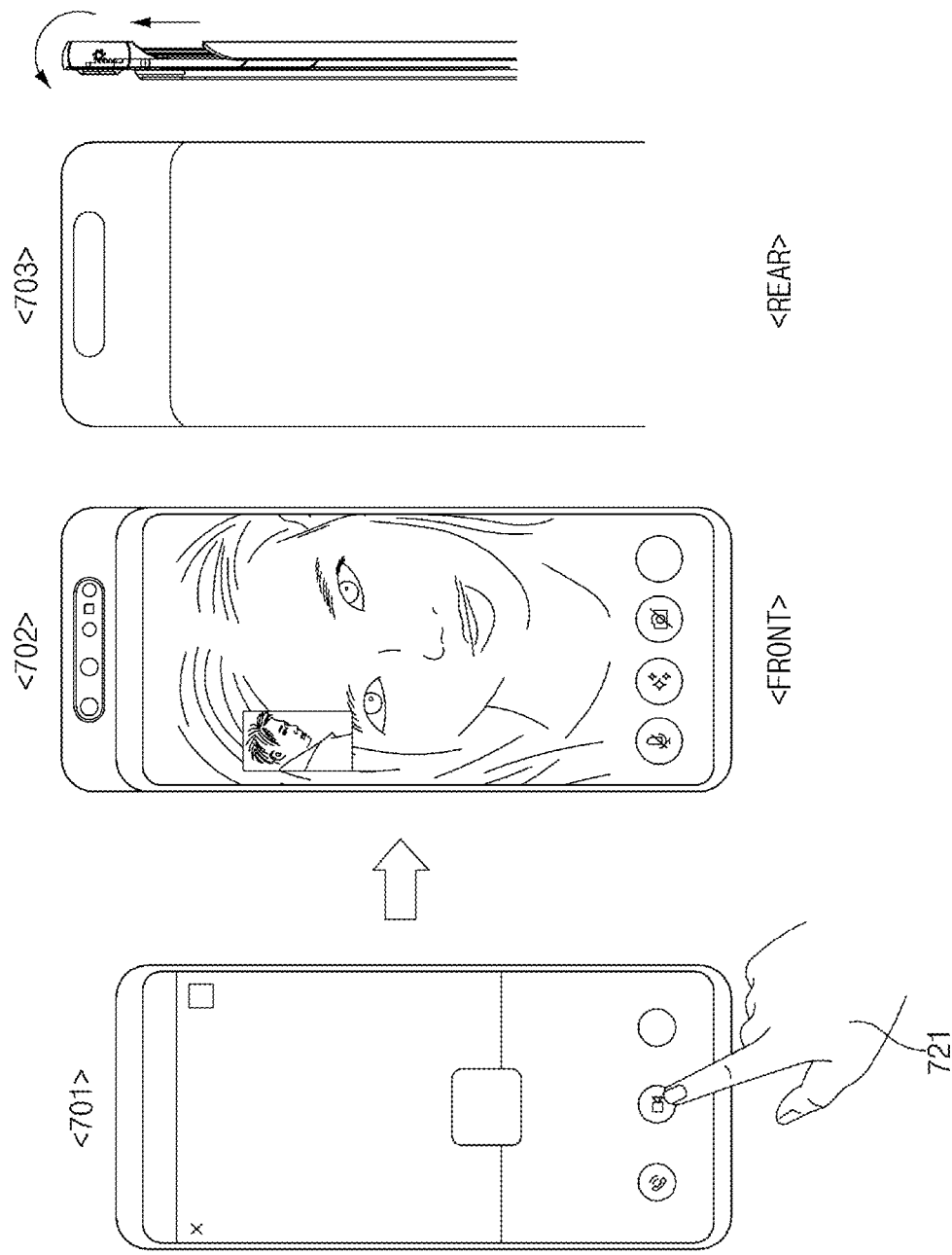
FIG. 7B illustrates a view of an operation of the camera module unit when a front shoot default app is executed, according to various embodiments of the disclosure.

FIG. 7A illustrates a flowchart for operating a camera module unit, according to various embodiments of the disclosure. FIG. 7B illustrates a view of an operation of the camera module unit when a front shoot default app is executed, according to various embodiments of the disclosure.

According to an embodiment, in operation 710, an electronic device (e.g., the electronic device 100) may execute a camera app. As seen in FIG. 6B, the electronic device may display the camera app screen depending on the user input 611 (e.g., touching a camera app icon).

According to an embodiment, in operation 720, the electronic device may determine whether the executed camera app is a front shoot default app. For example, when the executed camera app is not the front shoot default app, the procedure may move to operation 760, and the electronic device may perform shooting by using a rear camera. When the executed camera app is the front shoot default app, the electronic device may perform operation 730.

According to an embodiment, in operation 730, the electronic device may move upwardly and rotate the camera module unit (e.g., the camera module unit 110). For example, referring to FIG. 7B, in state 701, the electronic device may receive a user input 721 to the front shoot default app (e.g., a video call app). In state 702 and state 703, the electronic device may execute an app and may move upwardly and rotate the camera module unit, at the same time. State 702 illustrates the front surface of an electronic device, and state 703 illustrates the rear surface of an electronic device.

According to an embodiment, in operation 740, the electronic device may determine whether a rear shoot switching command is input. For example, when the rear shoot switching command is not input, the procedure may move to operation 760, and the electronic device may maintain a front camera and capture an image. When the rear shoot switching command is input, the electronic device may perform operation 750.

According to an embodiment, in operation 750, the electronic device may move downwardly and rotate a camera module unit, depending on the input rear shoot switching command. The camera module unit may face the rear surface of the electronic device.

According to an embodiment, in operation 760, the electronic device may perform shooting depending on the current settings. For example, when the camera module unit faces the rear surface of the electronic device, the camera included in the camera module unit may operates as a rear camera. When the camera module unit faces the front surface of the electronic device, the camera included in the camera module unit may operates as a front camera.

Figure 8A:
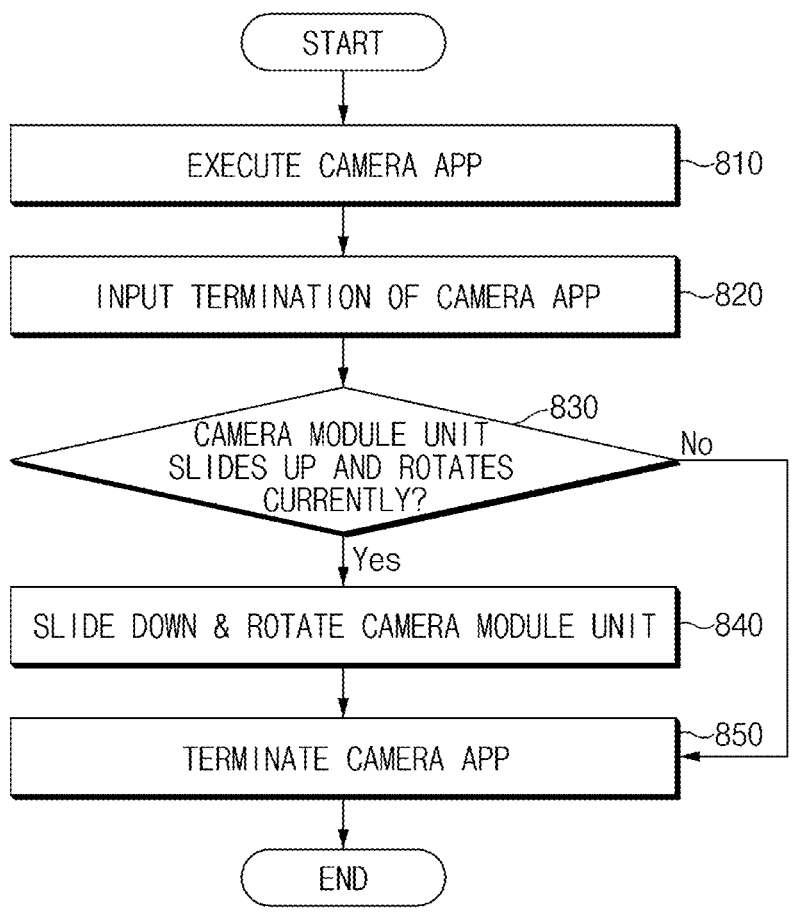
FIG. 8A illustrates a flowchart for operating a camera module unit, according to various embodiments of the disclosure.
Figure 8B:
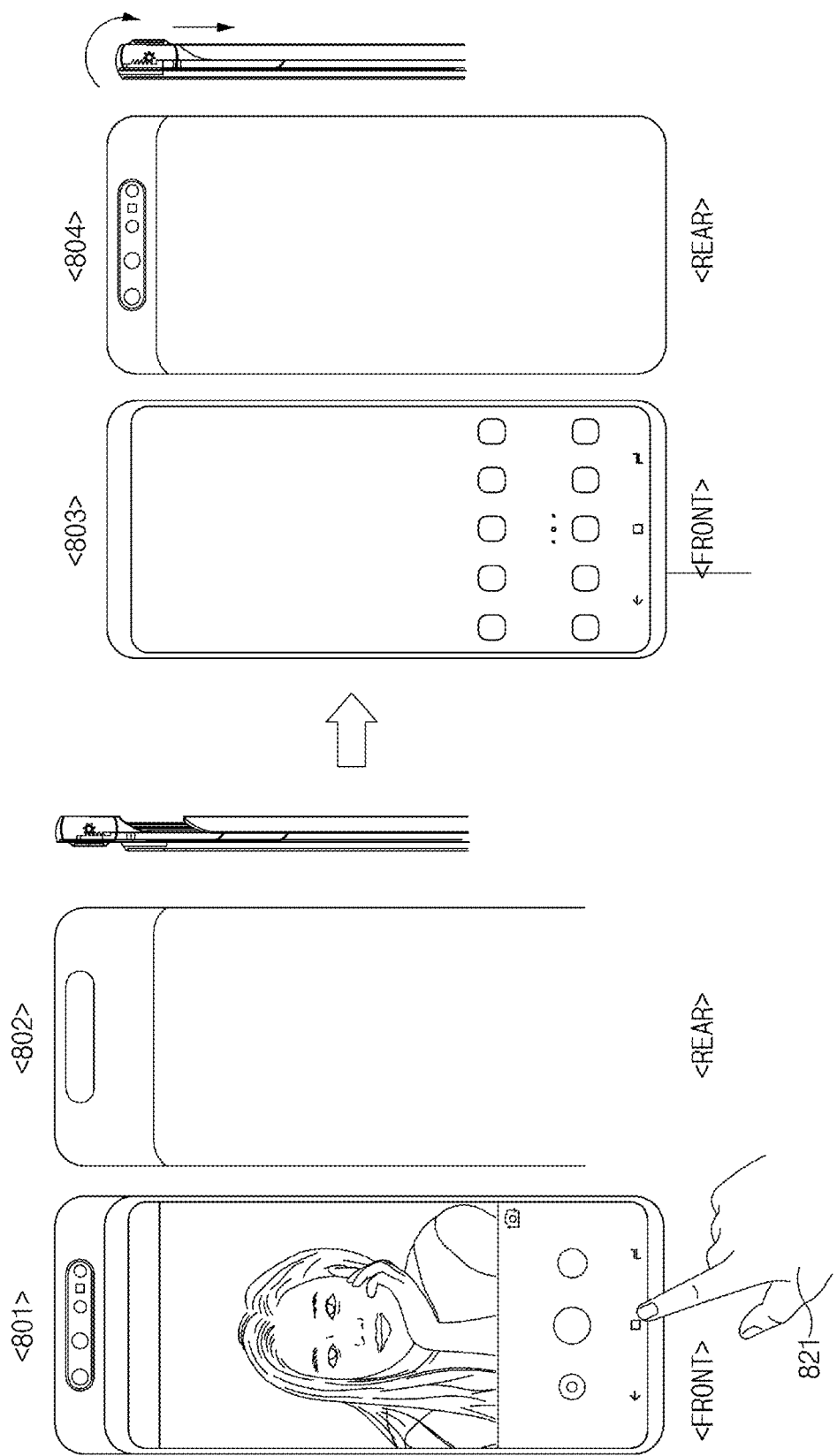
FIG. 8B illustrates a view of an operation of the camera module unit when camera execution termination is input, according to various embodiments of the disclosure.

FIG. 8A illustrates a flowchart for operating a camera module unit, according to various embodiments of the disclosure. FIG. 8B illustrates a view of an operation of the camera module unit when camera execution termination is input, according to various embodiments of the disclosure.

According to an embodiment, in operation 810, an electronic device (e.g., the electronic device 100) may execute a camera app. For example, the electronic device may use a camera module unit as a front camera state or a rear camera state depending on a user input.

According to an embodiment, in operation 820, the electronic device may receive a user input to terminate camera execution.

According to an embodiment, in operation 830, the electronic device may verify the current state of the camera module unit. For example, when the location of the camera module unit is a default location (e.g., a rear camera location), the procedure may move to operation 850, and the electronic device may immediately terminate the camera app. When the location of the camera module unit is not the default location (e.g., a front camera location), the electronic device may perform operation 840.

According to an embodiment, when the location of the camera module unit is not the default location, in operation 840, the electronic device may move downwardly and rotate the camera module unit. For example, referring to FIG. 8B, in state 801 and state 802, the camera module unit may slide up to operate as the front camera. State 801 illustrates the front surface of an electronic device, and state 802 illustrates the rear surface of an electronic device. In state 801 and state 802, the electronic device may receive a user input 821 to terminate camera execution. When receiving the user input 821 to terminate camera execution, the electronic device may move downwardly and rotate the camera module unit to change to the default location (e.g., the rear camera location).

According to an embodiment, in operation 850, since the location of the camera module unit is the default location, the electronic device may terminate the camera app.

According to various embodiments of the disclosure, an electronic device may include housing, a display, at least part of which is accommodated in the housing, an opening exposed to an outside, a slide portion sliding with respect to the housing, and a camera module unit disposed at the opening and rotating with respect to the slide portion. When the slide portion slides in the first location with respect to the housing, the camera module unit may be configured to rotate toward the first direction, when the slide portion slides in the second location with respect to the housing, the camera module unit may be configured to rotate toward the second direction different from the first direction.

According to various embodiments, the display may be disposed in the second direction.

According to various embodiments, the upper end of the slide portion is aligned with the upper end of the display at the first location side by side, and the slide portion may protrude more than the upper portion of the housing at the second location.

According to various embodiments, the camera module unit may operate as the rear camera at the first location and may operate as the front camera at the second location.

According to various embodiments, the camera module unit may straightly move in some sections and may perform both straight movement and rotational movement in the remaining sections, between the first location and the second location.

According to various embodiments, the electronic device may further include a guide frame fixed to the housing and a movement member moving along the guide frame. A part of the slide may be coupled to the movement member.

According to various embodiments, the electronic device may further include a motor and a rotation unit rotating by the motor. The movement member may perform a linear reciprocating movement along the guide frame by rotation of the rotation unit.

According to various embodiments, the electronic device may further include a rack gear disposed parallel with the rear surface of the display. The camera module unit may include a pinion gear corresponding to the rack gear on one side surface, and the camera module unit may rotate depending on the relative movement of the rack gear and the pinion gear.

According to various embodiments, during the first section, which is a part between the first location and the second location, the rack gear, the camera module unit, and the slide portion may straightly move together.

According to various embodiments, during the first section and the second section, the rack gear may be fixed by a cleek fixed to the housing, the slide portion may move straightly, and the camera module unit may perform both straight movement and rotational movement.

According to various embodiments, the rotation angle of the camera module unit may be determined, and during the second section, the rack gear may be fixed to the cleek fixed to the rear surface of the display, based on the length of the rack gear or the gear ratio between the rack gear and the pinion gear.

According to various embodiments, the electronic device may further include a control button disposed at a part of the housing. When receiving an input to the control button, the slide portion may slide from the first location to the second location, and the camera module unit may rotate from the first direction to the second direction.

According to various embodiments, when the slide portion is placed at the second location and receives an input to the control button, the slide portion may slide from the second location to the first location, and the camera module unit may rotate from the second direction to the first direction.

According to various embodiments, the camera module unit may be connected to a printed circuit board located inside the housing via the FPCB, and the FPCB may include a first portion parallel to the rotation axis of the camera module unit and a second portion perpendicular to the rotation axis.

According to various embodiments, the second portion of the FPCB may be disposed to be wound on the rotation axis of the camera module unit as the camera module unit rotates.

According to various embodiments of the disclosure, an electronic device may include housing including a first surface of a first direction and a second surface of the second direction opposite to the first direction, a display, at least part of which is accommodated on the second surface of the housing, a slide portion including an opening, disposed on the first surface of the housing, and sliding with respect to the first surface, and a camera module unit disposed at the opening. the camera module unit may be configured to be seated in the slide portion and to maintain a state of facing the first direction while the slide portion moves from the initial location to the first location of the housing and may be configured to rotate from the first direction toward the second direction while the slide portion moves from the first location to the second location with respect to the housing.

According to various embodiments, the upper end of the slide portion and the upper end of the housing are arranged in alignment at the initial location and the upper end of the slide portion may be disposed to protrude further upwardly than the upper end of the housing along the movement.

According to various embodiments, the electronic device may further include an input unit receiving a user input associated with the movement of the slide portion and a control unit controlling the movement of the slide portion in response to the user input.

According to various embodiments, when a user input indicating the termination of camera execution is received in a state where the camera module unit faces the second direction, the control unit may allow the slide portion to slide from the second location to the initial location and may allow the camera module unit to face from the first direction to the second direction.

According to various embodiments, when the selfie shooting function is executed, the control unit may allow the slide portion to slide from the initial location to the second location and may allow the camera module unit from the first direction to the second direction.

Figure 9:
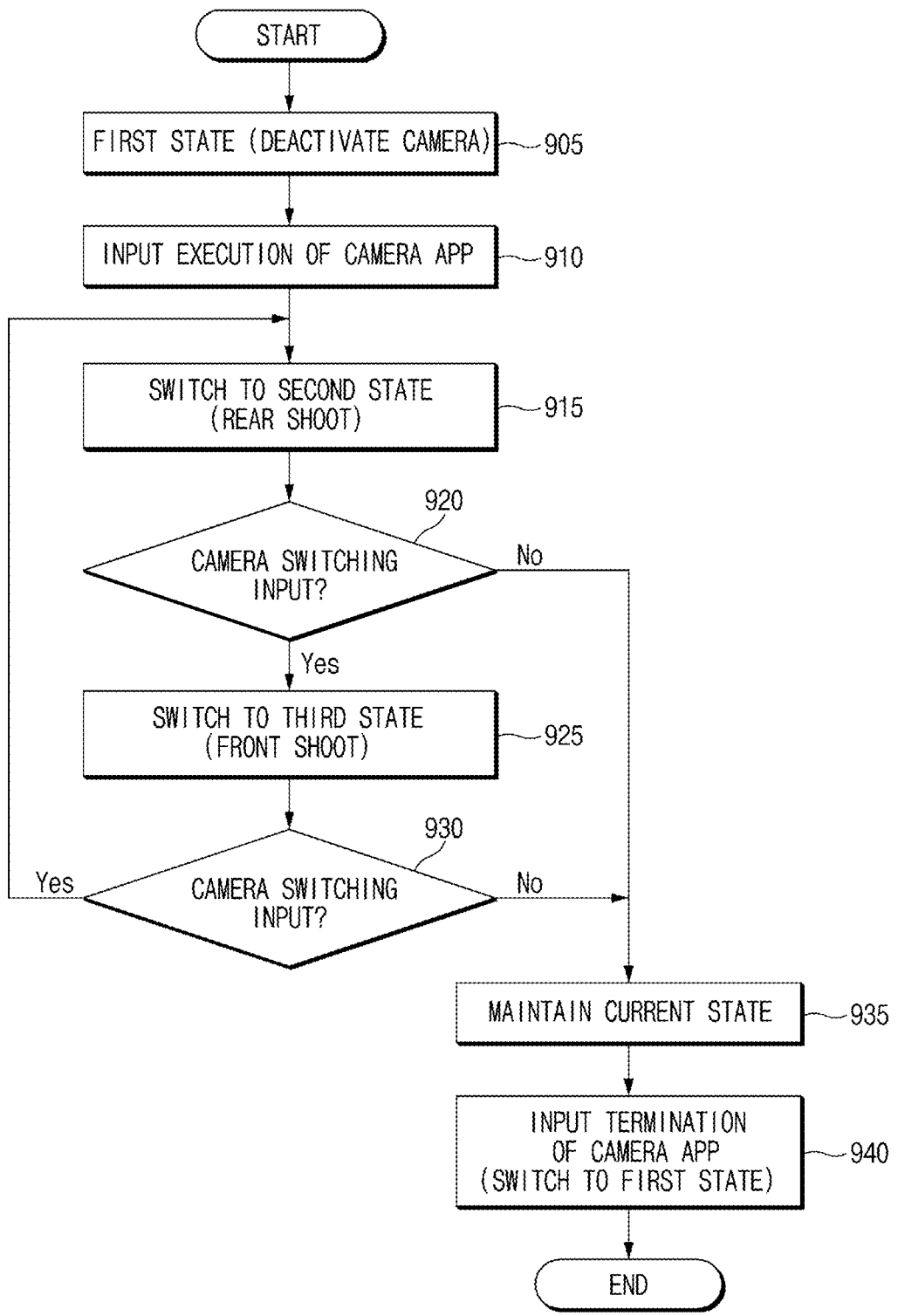
FIG. 9 illustrates a flowchart for operating an electronic device during camera shoot, according to an embodiment of the disclosure.
Figure 10:
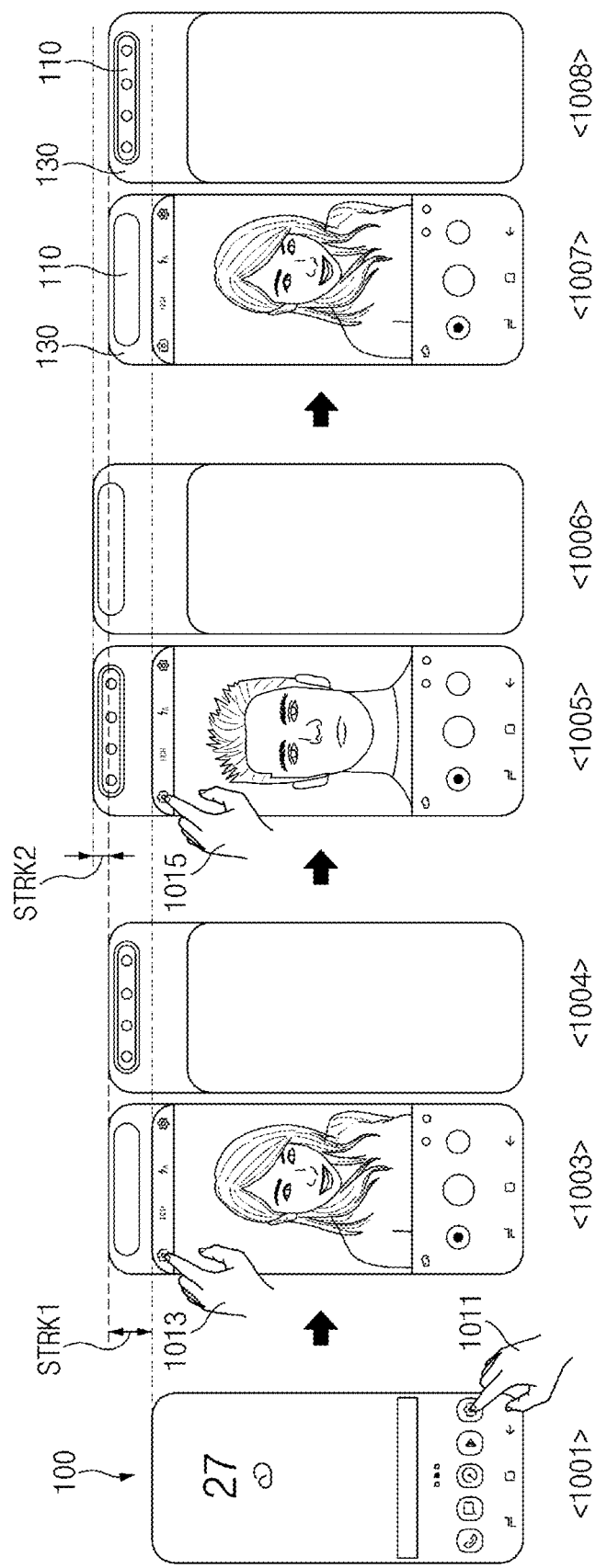
FIG. 10 illustrates operating an electronic device during camera shoot, according to an embodiment of the disclosure.

FIG. 9 illustrates a flowchart for operating an electronic device during camera shoot, according to an embodiment of the disclosure. FIG. 10 illustrates operating an electronic device during camera shoot, according to an embodiment of the disclosure.

Referring to FIGS. 9 and 10, according to an embodiment, in operation 905, the electronic device 100 may have a first state. For example, in the first state, the slide portion 130 may be in the location at which the slide portion 130 overlaps with a display, the camera module unit 110 may face a rear surface, and a camera may be deactivated. The first state (e.g., state 1001 of FIG. 10) is a default state; in the first state, the slide portion 130 may overlap with a display (e.g., the display 141 of FIG. 1B). In the first state, the camera module unit 110 may face the rear surface. In the first state, a camera (e.g., the camera device 112, 113, or 116 of FIG. 1A) may be activated or deactivated.

According to an embodiment, in operation 910, the electronic device 100 may receive an execution input of a camera app (or all apps associated with the execution of the camera). For example, in state 1001 of FIG. 10, the electronic device 100 may receive a user input 1011 (e.g., the touch of a camera app icon).

According to an embodiment, in operation 915, when a camera app execution input is received, the state of the electronic device 100 may be switched to the second state. For example, in state 1003 and state 1004 of FIG. 10, the state of the slide portion 130 may be switched to the second state through a first stroke STRK1. In the second state (e.g., state 1003, state 1004, state 1007, or state 1008 of FIG. 10), the slide portion 130 may perform the first stroke STRK1 (e.g., the first movement distance H1 of FIG. 2A) and then may stop. In the second state, the camera module unit 110 may face the rear surface. In the second state, the camera may be activated or deactivated. At this time, the camera module unit 110 may face the rear surface, and the camera may be activated (e.g., a rear shoot mode). In FIG. 10, state 1003 illustrates the front surface of the electronic device 100, and state 1004 illustrates the rear surface of the electronic device 100.

According to an embodiment, in operation 920, the electronic device 100 may determine whether a camera switching input is received. For example, when there is no camera switching input, the electronic device 100 may maintain the current state (e.g., the second state) depending on operation 935. When a camera switching input (e.g., the user input 1013 of FIG. 10 or camera app switching icon touch) is present, the electronic device 100 may perform operation 925.

According to an embodiment, in operation 925, the state of the electronic device 100 may be switched from the second state to the third state. In the third state (e.g., state 1005 or state 1006 of FIG. 10), the slide portion 130 may perform the second stroke STRK2 (e.g., the second movement distance H2 of FIG. 2A) and then may stop. The camera module unit 110 may rotate through the second stroke STRK2; and in the third state, the camera module unit 110 may face the front surface. In the third state, the camera may be activated or deactivated. For example, in state 1005 and state 1006 of FIG. 10, the state of the slide portion 130 may be switched to the third state through the second stroke STRK2. At this time, the camera module unit 110 may face the front surface, and the camera may be activated (e.g., a front shoot mode). In FIG. 10, state 1005 illustrates the front surface of the electronic device 100, and state 1006 illustrates the rear surface of the electronic device 100.

According to an embodiment, in operation 930, the electronic device 100 may determine whether a camera switching input is received. For example, when there is no camera switching input, the electronic device 100 may maintain the current state (e.g., the third state) depending on operation 935. When a camera switching input (e.g., the user input 1015 of FIG. 10 or camera app switching icon touch) is present, the state of the electronic device 100 may be switched to the second state depending on operation 915. Afterward, when the camera switching input is repeated, the state of the slide portion 130 may be repeatedly switched to the second state or the third state through the second stroke STRK2.

According to an embodiment, when there is no camera switching input, in operation 935, the electronic device 100 may maintain the current state (e.g., the second state or the third state).

According to an embodiment, in operation 940, the electronic device 100 may receive a camera app termination input (e.g., camera app termination icon touch). For example, when the camera app termination input is received, the state of the slide portion 130 may be switched to the first state regardless of the current state (e.g., the second state or the third state). At this time, the camera module unit 110 may face the rear surface, and the camera may be deactivated.

According to an embodiment, in FIG. 10, state 1003, state 1005, and state 1007 illustrate the front surface of the electronic device 100, and state 1004, state 1006, and state 1008 illustrate the rear surface of the electronic device 100.

According to an embodiment, the state of the slide portion 130 may be switched to the first to third states at a time under control of the electronic device 100. For example, the state of the slide portion 130 may be switched from the first state to the second state or the third state. The state of the slide portion 130 may be switched from the third state to the second state or the first state. The state of the slide portion 130 may be switched from the second state to the first state or the third state.

According to an embodiment, the state of the slide portion 130 may be switched through the first stroke STRK1 or the second stroke STRK2. For example, the state of the slide portion 130 may be switched from the first state to the second state or may be switched from the second state to the first state, through the first stroke STRK1. The state of the slide portion 130 may be switched from the second state to the third state or may be switched from the third state to the second state, through the second stroke STRK2. The state of the slide portion 130 may be switched from the first state to the third state or may be switched from the third state to the first state, through the first stroke STRK1 and the second stroke STRK2.

As described above, the electronic device 100 according to an embodiment of the disclosure may switch the state of the slide portion 130 to the second state, when the camera app is executed. Since the state of the slide portion 130 is already switched to the second state when the camera app is executed, the standby time in rear shoot may be reduced more than the case of switching from the first state to the third state.

Figure 11:
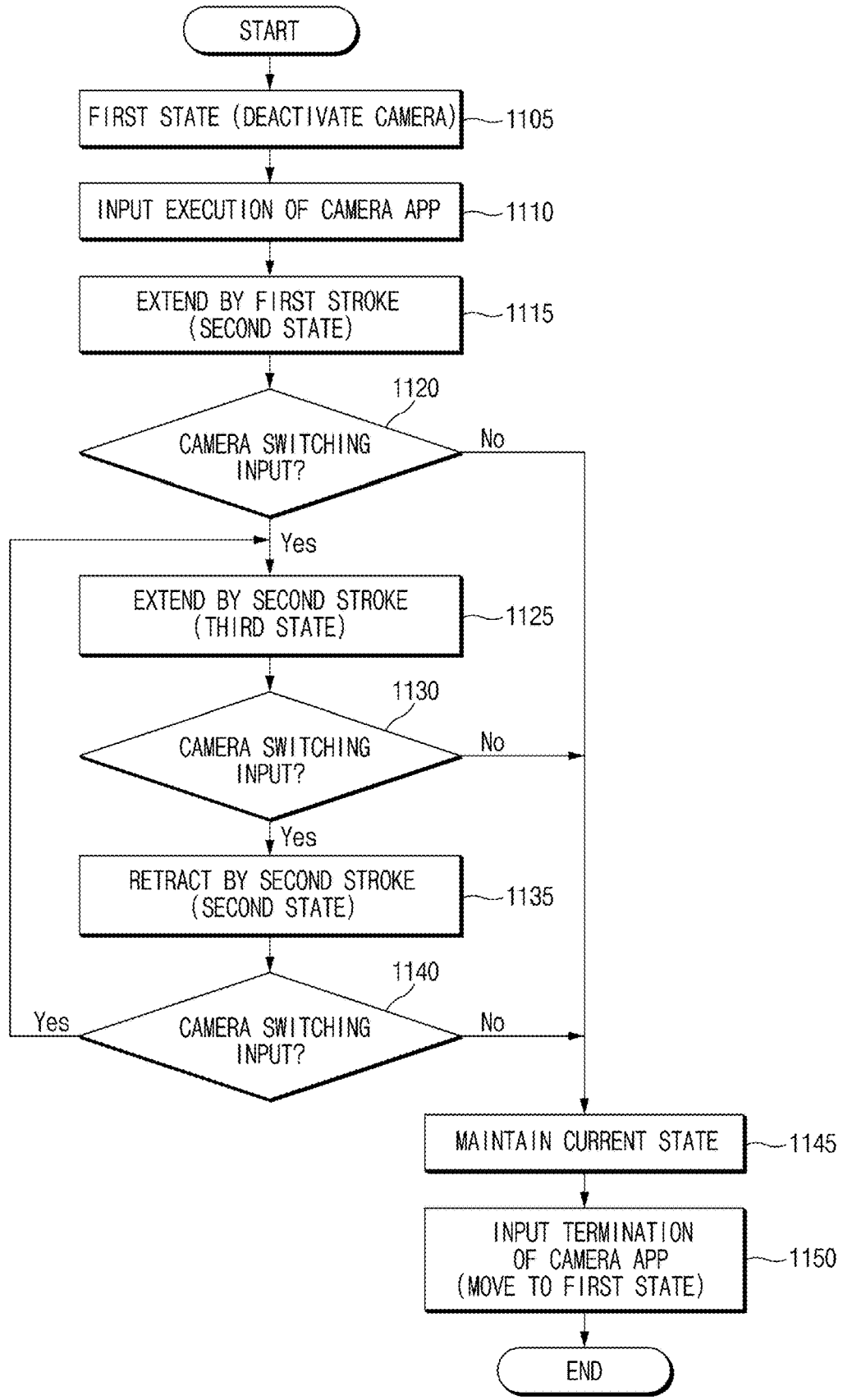
FIG. 11 illustrates a flowchart for operating an electronic device during camera shoot, according to various embodiments of the disclosure.

FIG. 11 illustrates a flowchart for operating an electronic device during camera shoot, according to various embodiments of the disclosure. Referring to FIGS. 10 and 11, the state of the slide portion 130 may be switched through the first stroke STRK1 or the second stroke STRK2.

According to an embodiment, in operation 1105, the electronic device 100 may have a first state (e.g., state 1001 of FIG. 10). For example, in the first state, the slide portion 130 may be in the location at which the slide portion 130 overlaps with a display, the camera module unit 110 may face a rear surface, and a camera may be deactivated.

According to an embodiment, in operation 1110, the electronic device 100 may receive an execution input of a camera app. For example, in state 1001 of FIG. 10, the electronic device 100 may receive the user input 1011 (e.g., the touch of a camera app icon).

According to an embodiment, in operation 1115, when the camera app execution input is received, the slide portion 130 may extend in the direction of the top end of a display, by the first stroke STRK1. For example, in state 1003 and state 1004 of FIG. 10, the state of the slide portion 130 may be switched to the second state (e.g., state 1003, state 1004, state 1007, and state 1008 of FIG. 10) through the first stroke STRK1. At this time, the camera module unit 110 may face the rear surface, and the camera may be activated (e.g., a rear shoot mode).

According to an embodiment, in operation 1120, the electronic device 100 may determine whether a camera switching input is received. For example, when there is no camera switching input, the electronic device 100 may maintain the current state (e.g., the second state) depending on operation 1145. When a camera switching input (e.g., the user input 1013 of FIG. 10 or camera app switching icon touch) is present, the electronic device 100 may perform operation 1125.

According to an embodiment, in operation 1125, the slide portion 130 may further extend in the direction of the top end of a display, by the second stroke STRK2. For example, in state 1005 and state 1006 of FIG. 10, the state of the slide portion 130 may be switched to the third state (e.g., state 1005 or state 1006 of FIG. 10) through the second stroke STRK2. At this time, the camera module unit 110 may face the front surface, and the camera may be activated (e.g., a front shoot mode).

According to an embodiment, in operation 1130, the electronic device 100 may determine whether a camera switching input is received. For example, when there is no camera switching input, the electronic device 100 may maintain the current state (e.g., the third state) depending on operation 935. When a camera switching input (e.g., the user input 1015 of FIG. 10 or camera app switching icon touch) is present, the electronic device 100 may perform operation 1135.

According to an embodiment, in operation 1135, the slide portion 130 may be retracted by the second stroke STRK2. For example, the state of the slide portion 130 may be switched to the second state through the second stroke STRK2.

According to an embodiment, in operation 1130, the electronic device 100 may determine whether a camera switching input is received. For example, when there is no camera switching input, the electronic device 100 may maintain the current state (e.g., the third state) depending on operation 935. When a camera switching input (e.g., the user input 1015 of FIG. 10 or camera app switching icon touch) is present, the state of the electronic device 100 may be switched to the third state depending on operation 1125. Afterward, when the camera switching input is repeated, the state of the slide portion 130 may be repeatedly switched to the second state or the third state through the second stroke STRK2.

According to an embodiment, when there is no camera switching input, in operation 1145, the electronic device 100 may maintain the current state (e.g., the second state or the third state).

According to an embodiment, in operation 1150, the electronic device 100 may receive a camera app termination input (e.g., camera app termination icon touch). For example, when the camera app termination input is received, the state of the slide portion 130 may be switched to the first state regardless of the current state (e.g., the second state or the third state). At this time, the camera module unit 110 may face the rear surface, and the camera may be deactivated.

Figure 12:
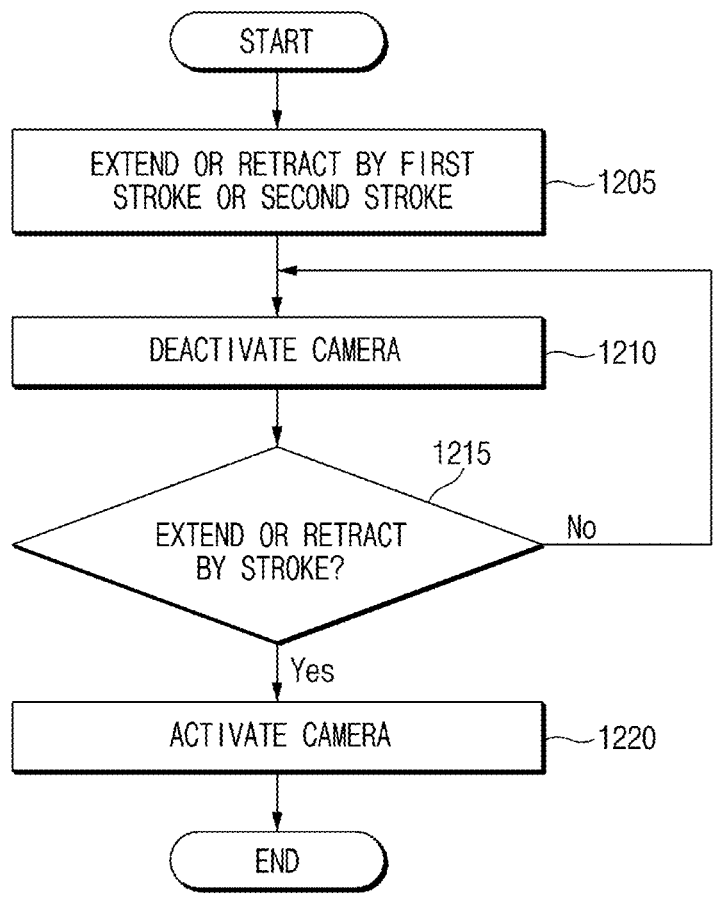
FIG. 12 illustrates a flowchart for determining whether a camera is activated when a slide portion moves, according to various embodiments of the disclosure.

FIG. 12 illustrates a flowchart for determining whether a camera is activated when a slide portion moves, according to various embodiments of the disclosure. Referring to FIGS. 10 and 12, a camera included in the camera module unit 110 may be deactivated in the progression of the first stroke STRK1 or the second stroke STRK2.

According to an embodiment, in operation 1205, the slide portion 130 may extend (e.g., extending upward from the rear surface of the display) or retract (e.g., extending and then returning to the original state), from at least part of the housing surrounding a display by the first stroke STRK1 or the second stroke STRK2. For example, the state of the slide portion 130 may be switched from the first state to the second state or may be switched from the second state to the first state, through the first stroke STRK1. The state of the slide portion 130 may be switched from the second state to the third state or may be switched from the third state to the second state, through the second stroke STRK2. The state of the slide portion 130 may be switched from the first state to the third state or may be switched from the third state to the first state, through the first stroke STRK1 and the second stroke STRK2.

According to an embodiment, in operation 1210, the camera may be deactivated when the slide portion 130 moves. According to various embodiments, the camera may be deactivated when the slide portion 130 is moved, and the display may display a specific image (e.g., an image captured before the slide portion 130 moves or an image corresponding to shoot mode switching).

The electronic device 100 may prevent unnecessary image display and may save power consumption, through operation 1210. In addition, the fatigue of the user's eyes may be reduced through operation 1210.

According to an embodiment, in operation 1215, the electronic device 100 may determine whether the slide portion 130 is extended or retracted by the first stroke STRK1 or the second stroke STRK2. For example, when the extension or retraction of the slide portion 130 is not completed, the camera may maintain the deactivation state depending on operation 1210. When the extension or retraction of the slide portion 130 is completed, the electronic device 100 may perform operation 1220.

According to an embodiment, when the extension or retraction of the slide portion 130 is completed (e.g., the second state or the third state), in operation 1220, the camera may be activated. When the extension is completed, the camera may have an activation state while being disposed to face the first direction (e.g., the direction of the front surface on which the display is disposed). When the retraction is completed, the camera may have an activation state while being disposed to face the second direction (e.g., the direction of the rear surface opposite to a direction in which the display is disposed). According to various embodiments, the camera may be activated immediately before the extension or retraction of the slide portion 130 is completed.

Figure 13:
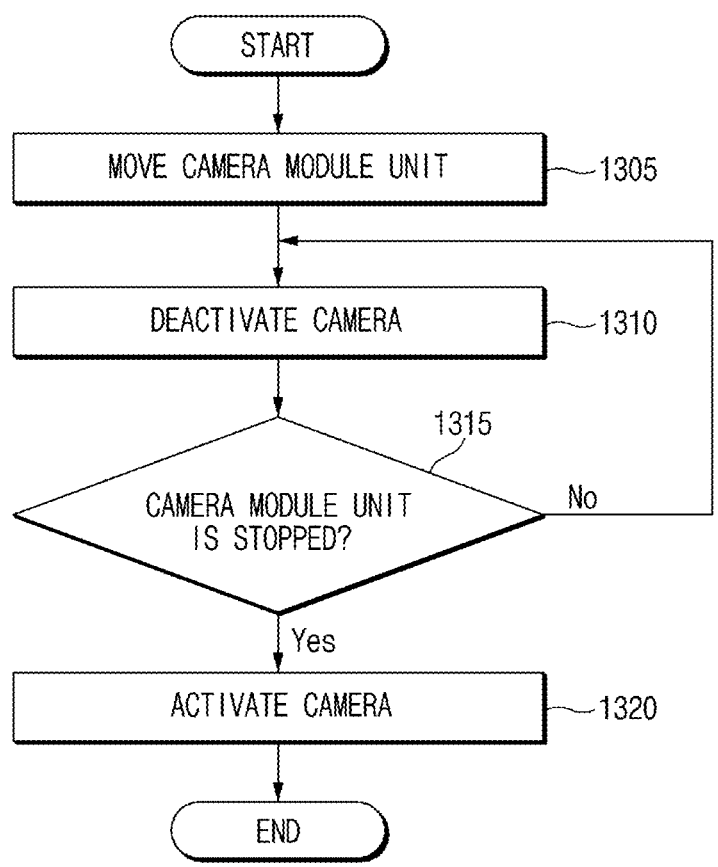
FIG. 13 illustrates a flowchart for determining whether a camera is activated when a camera module unit moves, according to various embodiments of the disclosure.

FIG. 13 illustrates a flowchart for determining whether a camera is activated when a camera module unit moves, according to various embodiments of the disclosure. Referring to FIGS. 10 and 13, the camera included in the camera module unit 110 may be activated or deactivated, depending on the movement of the camera module unit 110.

According to an embodiment, in operation 1305, the camera module unit 110 may move by the first stroke STRK1 or the second stroke STRK2 together with the slide portion 130. For example, the camera module unit 110 may perform straight movement by the first stroke STRK1. The camera module unit 110 may perform straight movement and rotational movement by the second stroke STRK2. At least one of the first stroke STRK1 or the second stroke STRK2 may be performed by the touch of a user or may be performed automatically by the above-described motor operation.

According to an embodiment, in operation 1310, the camera may be deactivated when the camera module unit 110 moves. According to various embodiments, the camera may be deactivated when the camera module unit 110 moves, and the display may display a specific image (e.g., an image captured before the camera module unit 110 moves or an image corresponding to shoot mode switching). The electronic device 100 may prevent unnecessary image display and may save power consumption, through operation 1310.

According to an embodiment, in operation 1315, the electronic device 100 may determine whether the camera module unit 110 is stopped. For example, when the camera module unit 110 moves, the camera may maintain the deactivation state depending on operation 1310. When the camera module unit 110 is stopped, the electronic device 100 may perform operation 1320.

According to an embodiment, when the camera module unit 110 is stopped (e.g., the second state or the third state), in operation 1320, the camera may be activated. For example, the camera may be activated after the movement of the camera module unit 110 is stopped. According to various embodiments, the camera may be activated immediately before the movement of the camera module unit 110 is stopped.

Figure 14:
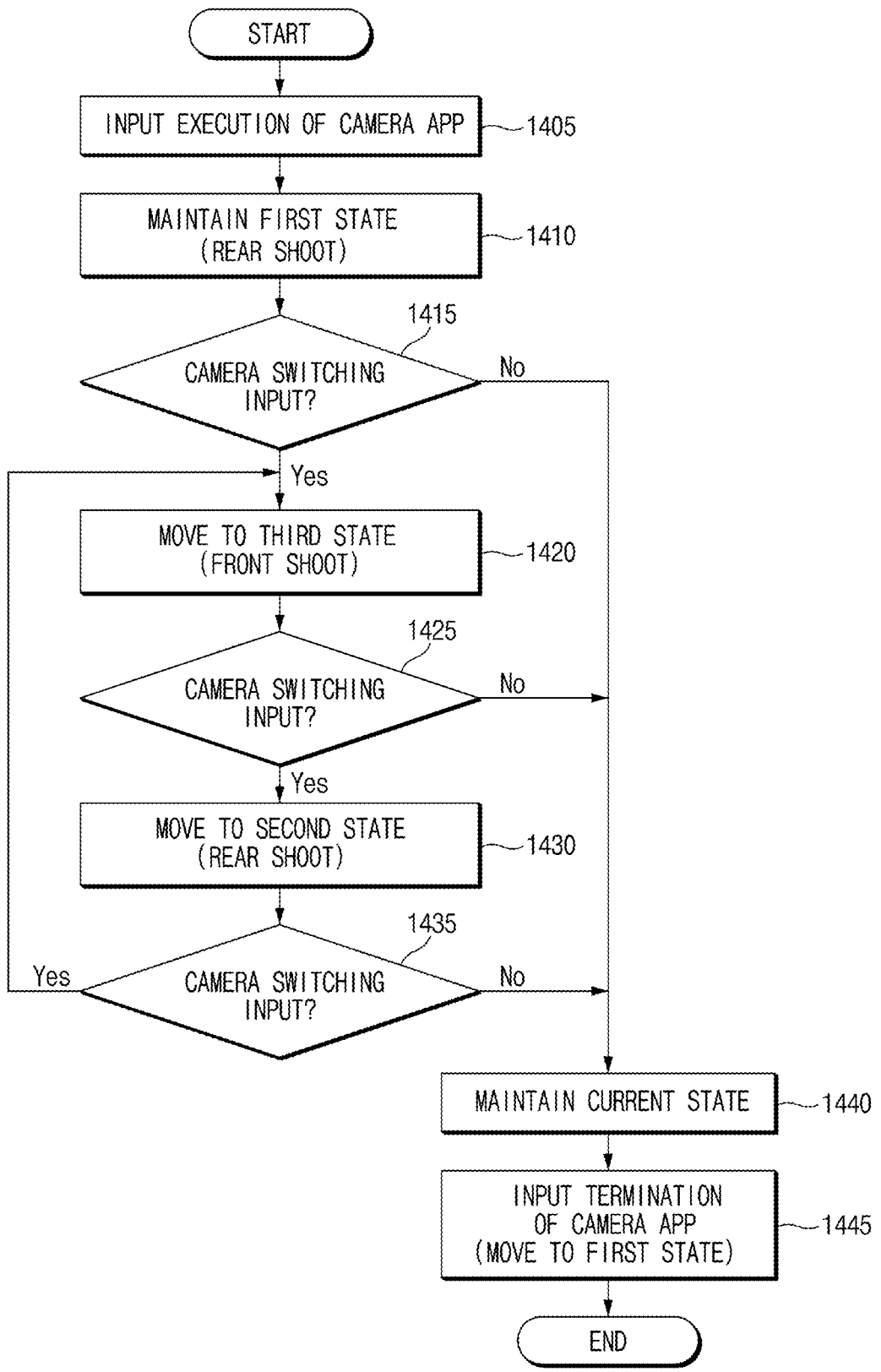
FIG. 14 illustrates a flowchart for operating an electronic device during camera shoot, according to various embodiments of the disclosure.
Figure 15:
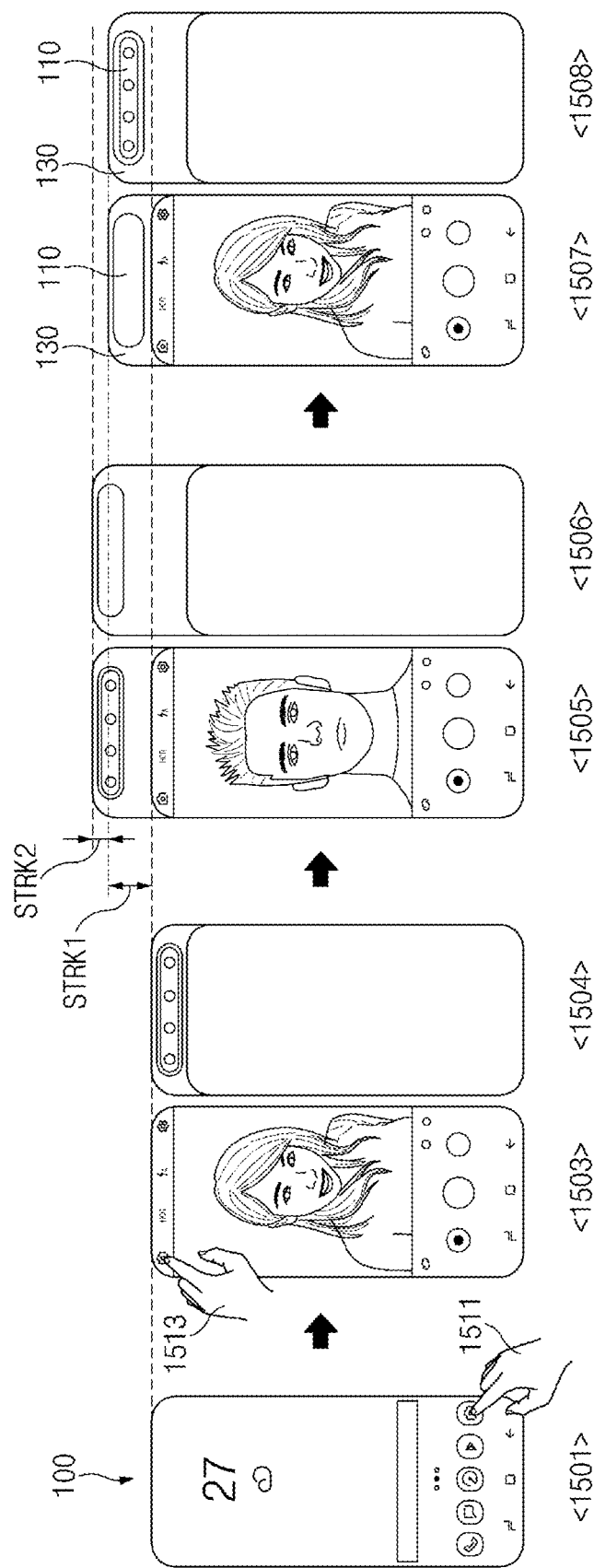
FIG. 15 illustrates operating an electronic device during camera shoot, according to various embodiments of the disclosure.

FIG. 14 illustrates a flowchart for operating an electronic device during camera shoot, according to various embodiments of the disclosure. FIG. 15 illustrates operating an electronic device during camera shoot, according to various embodiments of the disclosure.

Referring to FIGS. 14 and 15, according to an embodiment, in operation 1405, the electronic device 100 may receive an execution input of a camera app. For example, in state 1501 of FIG. 15, the electronic device 100 may receive a user input 1511 (e.g., the touch of a camera app icon).

According to an embodiment, in operation 1410, the electronic device 100 may maintain the first state. For example, in the first state, the slide portion 130 may be in the location at which the slide portion 130 overlaps with a display, the camera module unit 110 may face a rear surface, and a camera may be activated. The first state (e.g., state 1501, state 1503, and state 1504 of FIG. 15) is a default state; in the first state, the slide portion 130 may overlap with a display (e.g., the display 141 of FIG. 1B). In the first state, the camera module unit 110 may face the rear surface. In the first state, a camera (e.g., the camera device 112, 113, or 116 of FIG. 1A) may be activated or deactivated.

According to an embodiment, in operation 1415, the electronic device 100 may determine whether a camera switching input is received. For example, when there is no camera switching input, the electronic device 100 may maintain the current state (e.g., the first state and rear shoot) depending on operation 1440. When a camera switching input (e.g., a user input 1513 of FIG. 15 or camera app switching icon touch) is present, the electronic device 100 may perform operation 1420.

According to an embodiment, when the camera switching input is received, in operation 1420, the state of the electronic device 100 may be immediately switched from the first state to the third state. For example, in state 1505 and state 1506 of FIG. 15, the state of the slide portion 130 may be switched from the first state to the third state through the first stroke STRK1 and the second stroke STRK2. At this time, the camera module unit 110 may face the front surface, and the camera may be activated (e.g., a front shoot mode).

According to an embodiment, in operation 1425, the electronic device 100 may determine whether a camera switching input is received. For example, when there is no camera switching input, the electronic device 100 may maintain the current state (e.g., the third state) depending on operation 1440. When a camera switching input (e.g., camera app switching icon touch) is present, the electronic device 100 may perform operation 1430.

According to an embodiment, in operation 1430, when the camera switching input is received, the state of the electronic device 100 may be switched from the third state to the second state. For example, in state 1507 and state 1508 of FIG. 15, the state of the slide portion 130 may be switched from the third state to the second state through the second stroke STRK2. At this time, the camera module unit 110 may face the rear surface, and the camera may be activated (e.g., a rear shoot mode).

According to an embodiment, in operation 1435, the electronic device 100 may determine whether a camera switching input is received. For example, when there is no camera switching input, the electronic device 100 may maintain the current state (e.g., the second state) depending on operation 1440. When a camera switching input (e.g., camera app switching icon touch) is present, the state of the electronic device 100 may be switched to the third state depending on operation 1420. Afterward, when the camera switching input is repeated, the state of the slide portion 130 may be repeatedly switched to the second state or the third state through the second stroke STRK2.

According to an embodiment, when there is no camera switching input, in operation 1440, the electronic device 100 may maintain the current state (e.g., the first state, the second state, or the third state).

According to an embodiment, in operation 1445, the electronic device 100 may receive a camera app termination input (e.g., camera app termination icon touch). For example, when the camera app termination input is received, the state of the slide portion 130 may be switched to the first state regardless of the current state (e.g., the first state, the second state, or the third state). At this time, the camera module unit 110 may face the rear surface, and the camera may be deactivated.

As described above, the electronic device 100 according to an embodiment of the disclosure may enter a rear shoot mode at once without the movement of the slide portion 130, when the camera app is executed. Accordingly, in the case of a rear shoot, the electronic device 100 may immediately perform shooting without standby time. In the meantime, the state of the electronic device 100 may be immediately switched from the first state to the third state at the first time when the camera switching input is performed. Afterward, when the camera switching input is performed, the state of the electronic device 100 may not be switched to the first state and may be repeatedly switched to the second state or the third state. Accordingly, the time used to switch between the front shoot mode and the rear shoot mode may be reduced compared with the case of returning to the first state again in rear shoot.

According to an embodiment, state 1503, state 1505, and state 1507 of FIG. 15 illustrate the front surface of the electronic device 100, and state 1504, state 1506, and state 1508 illustrate the rear surface of the electronic device 100.

As described above, the state of the slide portion 130 may be switched to the first to third states under control of the electronic device 100. For example, the state of the slide portion 130 may be switched from the first state to the second state or the third state. The state of the slide portion 130 may be switched from the third state to the second state or the first state. The state of the slide portion 130 may be switched from the second state to the first state or the third state.

According to an embodiment, the state of the slide portion 130 may be switched through the first stroke STRK1 or the second stroke STRK2, which is illustrated in FIG. 15. For example, the state of the slide portion 130 may be switched from the first state to the second state or may be switched from the second state to the first state, through the first stroke STRK1. The state of the slide portion 130 may be switched from the second state to the third state or may be switched from the third state to the second state, through the second stroke STRK2. The state of the slide portion 130 may be switched from the first state to the third state or may be switched from the third state to the first state, through the first stroke STRK1 and the second stroke STRK2.

Figure 16:
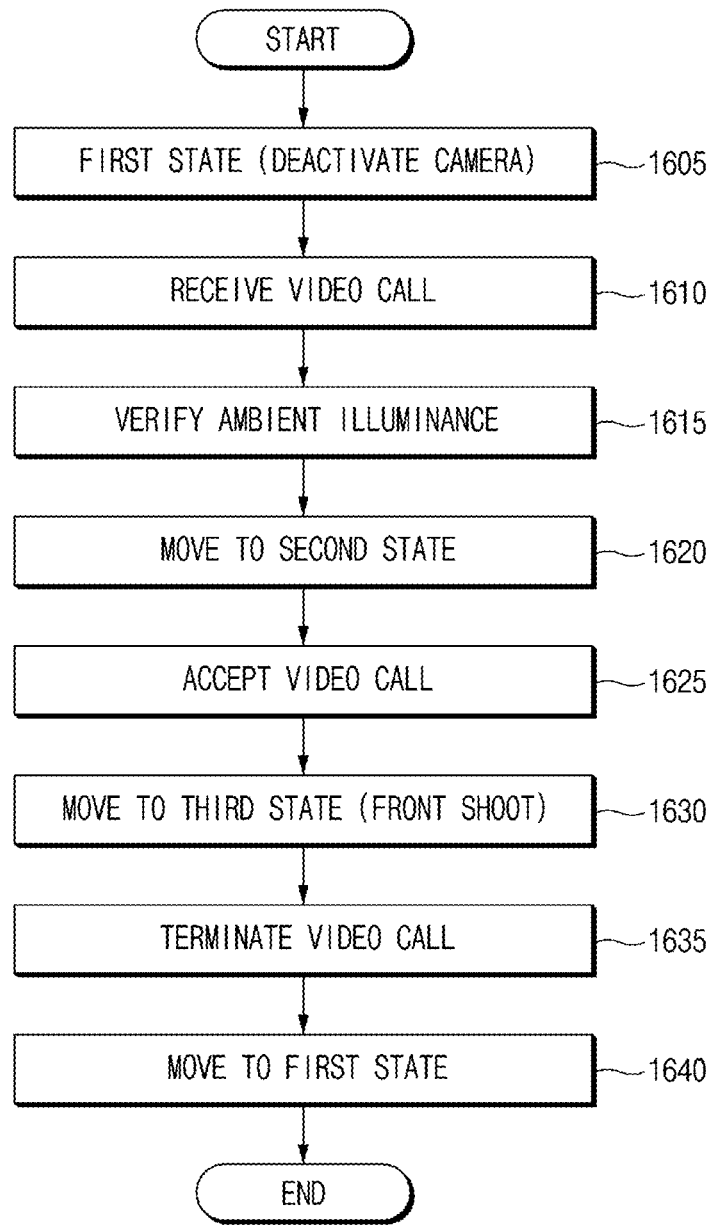
FIG. 16 illustrates a flowchart for operating an electronic device during a video call, according to an embodiment of the disclosure.
Figure 17:
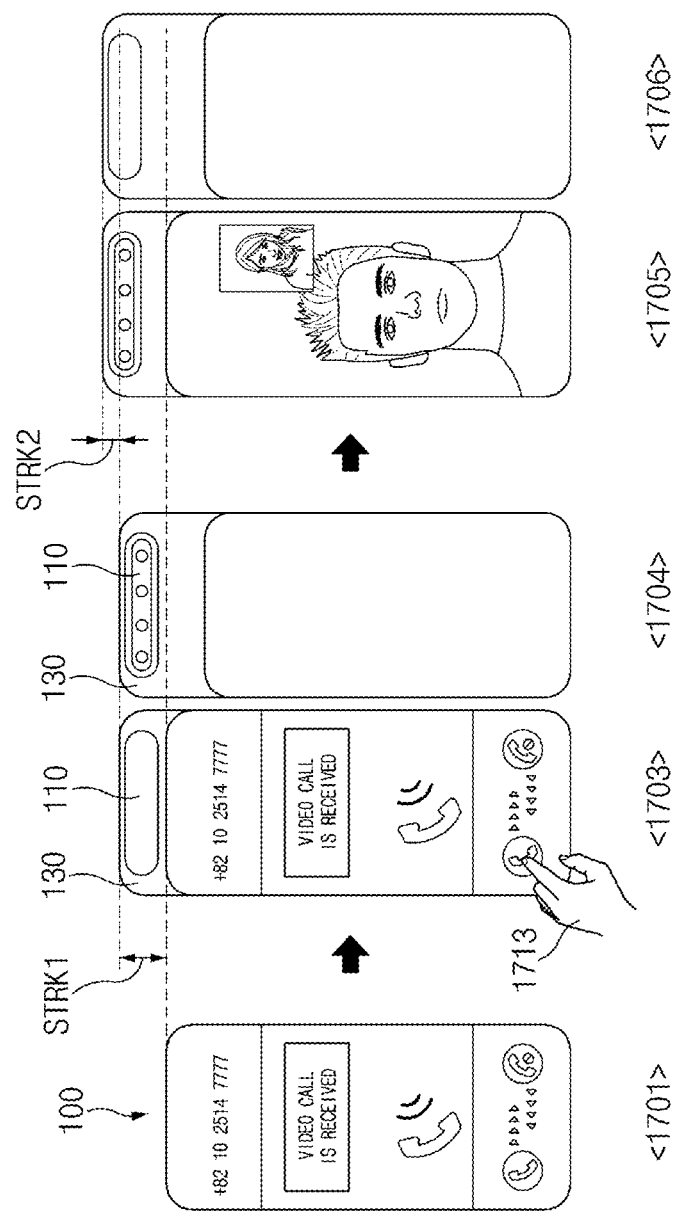
FIG. 17 illustrates operating an electronic device during a video call, according to an embodiment of the disclosure.

FIG. 16 illustrates a flowchart for operating an electronic device during a video call, according to an embodiment of the disclosure. FIG. 17 illustrates operating an electronic device during a video call, according to an embodiment of the disclosure.

Referring to FIGS. 16 and 17, according to various embodiments, in operation 1605, the electronic device 100 may be in a first state. For example, in the first state, the camera of the electronic device 100 may be deactivated. The electronic device 100 may have first to third states. The descriptions about the first to third states are the same as the descriptions given with reference to FIGS. 9 and 10. According to an embodiment, in FIG. 17, state 1701, state 1703, and state 1705 illustrate the front surface of the electronic device 100, and state 1704 and state 1006 illustrate the rear surface of the electronic device 100.

According to various embodiments, in operation 1610, the electronic device 100 may receive a video call. For example, in state 1701 of FIG. 17, the electronic device 100 may provide a notification corresponding to receiving a video call. For example, the notification may include at least one of bell sound, vibration, and/or a video call notification message.

According to various embodiments, in operation 1615, the electronic device 100 may verify the ambient illuminance of the electronic device. For example, the electronic device 100 may activate the camera of the camera module unit 110 and may verify the ambient illuminance of the electronic device by using the camera. In another example, the electronic device 100 may verify illuminance by using a sensor other than a camera (e.g., an illuminance sensor). When the ambient illuminance is not less than the specified illuminance, the electronic device 100 may perform operation 1620. For example, when the illuminance is greater than the specified illuminance while the reception of the video call is maintained, the electronic device 100 may perform operation 1620. Accordingly, the electronic device 100 may prevent the slide portion 130 from extending in the pants pocket or bag of the user.

Operation 1615 is exemplary for description, and the disclosure is not limited thereto. For example, operation 1615 may be an operation to determine whether the electronic device 100 is capable of being extended. According to an embodiment, the electronic device 100 may determine whether to perform operation 1620, using a proximity sensor in addition to ambient illuminance. For example, the electronic device 100 may verify a nearby external object, using a proximity sensor; when an external object is not sensed within a specified distance, the electronic device 100 may determine the execution of operation 1620 based on illuminance. According to an embodiment, the electronic device 100 may perform operation 1620 independently of the ambient illuminance. For example, in this case, operation 1615 may be skipped.

According to various embodiments, in operation 1620, the electronic device 100 may move to the second state. For example, in state 1703 of FIG. 17, the electronic device 100 may extend the slide portion 130 by the first stroke STRK1 to move to the second state. As illustrated in state 1704 of FIG. 17, the camera module unit 110 of the electronic device 100 may maintain a state in which the camera module unit 110 faces the rear surface of the electronic device 100. For example, the electronic device 100 may reduce the time used to switch between to the third state in response to the acceptance of a video call, by operating in the second state before the acceptance of the video call. For example, in operation 1620, the state of the electronic device 100 may be referred to as a standby state for accepting a video call.

According to various embodiments, in operation 1625, the electronic device 100 may receive an input to accept a video call. For example, the electronic device 100 may accept a video call based on a user input 1713 of FIG. 17. For another example, the electronic device 100 may accept a video call based on the user's voice input or a response signal from an external electronic device (e.g., headset) connected to the electronic device 100.

According to various embodiments, in operation 1630, the electronic device 100 may move from the second state to the third state in response to the acceptance of a video call. For example, the electronic device 100 may further extend the slide portion 130 by a second stroke STRK2, and the electronic device 100 may allow the camera of the camera module unit 110 to rotate so as to face the front surface of the electronic device 100. As illustrated in state 1705 and state 1706 of FIG. 17, the electronic device 100 may capture an image of a front surface of the electronic device 100 through a camera in a third state and may display the at least part of the captured image on at least part of the display unit 140 of the electronic device 100.

According to various embodiments, in operation 1635, the electronic device 100 may terminate a video call. For example, the electronic device 100 may terminate a video call in response to the call termination of the counterpart of the received video call or the call termination of the user of the electronic device 100.

According to various embodiments, in operation 1640, the electronic device 100 may move to the first state in response to the termination of a video call. Unlike the case of incoming a video call, the electronic device 100 may reduce the time used for the slide portion 130 of the electronic device 100 to be fully retracted, by moving from the third state to the first state.

In FIGS. 16 and 17, the standby state of the electronic device 100 (e.g., a state of standing by in a second state to reduce the time used to switch to the third state) is described with reference to a video call, but the embodiments of the disclosure are not limited thereto. For example, the electronic device 100 may apply a standby state to various applications using front image shooting. For example, the electronic device 100 may switch from the first state to the second state when the payment application is executed; and the electronic device 100 may switch from the second state to the third state when the iris recognition is selected as the user authentication method. In this case, the electronic device 100 may obtain the user's iris information, using a camera in a third state; the electronic device 100 may switch from the third state to the first state when authentication based on the obtained iris is successful.

FIG. 18 illustrates a schematic diagram of a three-dimensional image capturing method, according to various embodiments of the disclosure.

According to various embodiments, the electronic device 100 may capture a three-dimensional image based on binocular parallax. Generally, for the purpose of capturing the three-dimensional image, a conventional electronic device may capture the three-dimensional image by obtaining a plurality of images corresponding to binocular parallax using a plurality of lenses disposed at regular intervals. According to an embodiment of the disclosure, the electronic device 100 may obtain a plurality of images corresponding to binocular parallax using the movement of the camera module unit (e.g., the camera module unit 110 of FIG. 1).

Referring to FIG. 18, according to an embodiment, the electronic device 100 may obtain a right eye image 1801 corresponding to a first angle of view 1811 at the location P1, using the camera module unit 110; the electronic device 100 may obtain a left eye image 1802 corresponding to a second angle of view 1812 at the location P2, using the camera module unit 110. For example, the electronic device 100 may obtain the three-dimensional image using the right eye image 1801 and the left eye image 1802. According to an embodiment, the electronic device 100 may move the camera module unit 110 from the location P1 to the location P2 by extending (e.g., the first stroke STRK1) the slide portion 130 without rotating the camera module unit 110. For example, when the location of the camera module unit 110 is P1, the state of the electronic device 100 may correspond to state 201 (e.g., the first state) of FIG. 2. When the location of the camera module unit 110 is P2, the state of the electronic device 100 may correspond to state 203 (e.g., the second state) of FIG. 2.

According to an embodiment, the electronic device 100 may obtain the three-dimensional image using a plurality of lenses disposed at the left side and the right side of the camera module unit 110. For example, a plurality of lenses may be disposed spaced apart at regular intervals on the long axis of the camera module unit 110. In this case, in the case of the three-dimensional image obtained by the electronic device 100, the long axis of the camera module unit 110 may correspond to the width of the image, and the axis perpendicular to the long axis may correspond to the height of the image. Thus, the three-dimensional image obtained by the electronic device 100 using a plurality of lenses disposed on the left side and the right side may have a shape the height of which is greater than the width.

For example, a user would like to capture the three-dimensional image for watching an image using a display device (e.g., TV) of which the width is relatively greater than the height. In this case, as described with reference to FIG. 18, the user may obtain the three-dimensional image by obtaining a plurality of images while moving the camera module unit 110 in a state (state where the long axis of the electronic device 100 corresponds to the width of the image) where the electronic device 100 is laid down. In this case, in the case of the obtained three-dimensional image, the long axis of the camera module unit 110 may correspond to the height of the image, and the axis perpendicular to the long axis may correspond to the width of the image. Accordingly, the obtained image may have a shape of which the width is greater than the height.

According to various embodiments, the electronic device 100 may perform different three-dimensional image obtaining methods based on the orientation of the electronic device 100. For example, the electronic device 100 may determine whether the electronic device 100 is standing (e.g., the gravity direction is substantially parallel with the longitudinal direction (e.g., the long axis direction of the display of the electronic device 100) of the electronic device 100) or is laid down (e.g., the gravity direction is substantially parallel with the transverse direction (e.g., the short axis direction of the display of the electronic device 100) of the electronic device 100). According to an embodiment, when an input to obtain the three-dimensional image is received in a state where the electronic device 100 is standing, the electronic device 100 may obtain the three-dimensional image, the height of which is relatively longer, using a plurality of lenses of the camera module unit 110. According to an embodiment, when an input to obtain the three-dimensional image is received in a state where the electronic device 100 is laid down, the electronic device 100 may obtain the three-dimensional image, the length of which is relatively longer, by obtaining a plurality of images using at least one lens of the camera module unit 110 while moving the slide portion 130.

In an embodiment of the disclosure, the electronic device 100 may obtain the three-dimensional image, the width of which is longer than the height by extending the slide portion 130 of the electronic device 100, instead of positioning a plurality of lenses on the short axis (e.g., vertical axis) of the camera module unit 110. Accordingly, the size of the camera module unit 110 may be reduced. Also, since the user does not move the electronic device 100 but moves only the slide portion 130, the distortion of the three-dimensional image due to the user's hand shaking or the like may be reduced.

Figure 19:
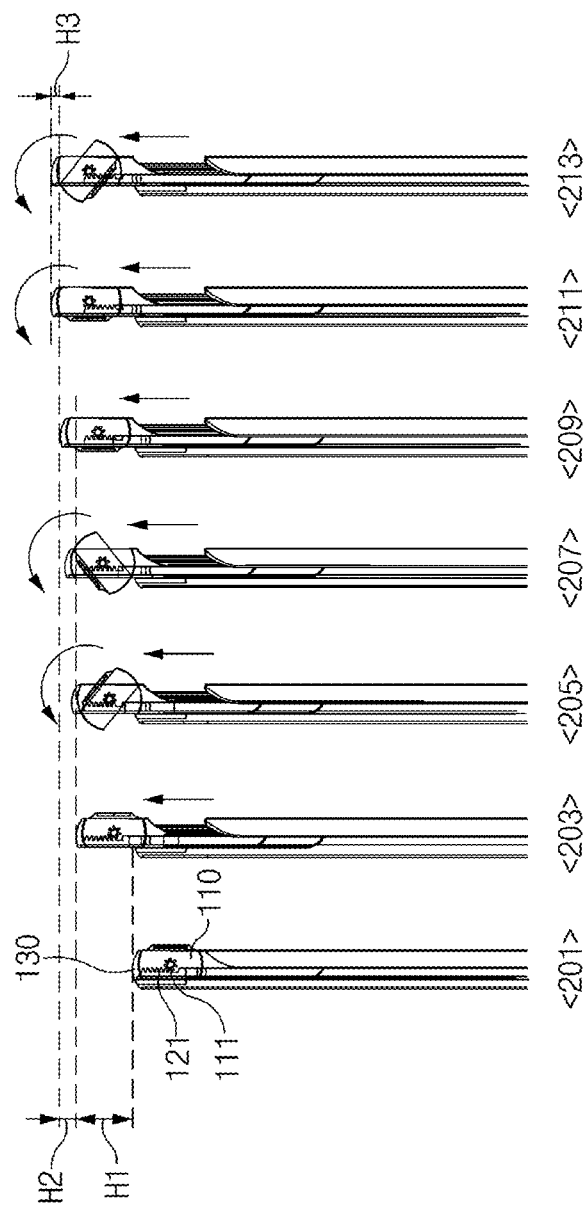
FIG. 19 illustrates a tilting operation of a camera module unit, according to various embodiments of the disclosure.

FIG. 19 illustrates a tilting operation of a camera module unit, according to various embodiments of the disclosure.

In an embodiment of FIG. 19, the descriptions about state 201 to state 209 are the same as the descriptions given with reference to FIG. 2. For convenience of description, the redundant description will be omitted.

According to various embodiments, when the camera of the camera module unit 110 is used as a front camera, the electronic device 100 may adjust the angle of view of a camera by tilting the camera module unit 110. For example, in state 211, the electronic device 100 may further move the slide portion 130 from state 209 by a third movement distance H3. For example, as illustrated in state 213, the camera module unit 110 may be tilted depending on the movement of the slide portion 130.

According to various embodiments, the camera module unit 110 may be tilted due to the mutual operation between the pinion gear 111 and the rack gear 121 depending on the movement of the slide portion 130. In this case, the length of the rack gear 121 may be set to a length capable of supporting the tilting of the camera module unit 110. For example, the camera module unit 110 coupled with the pinion gear 111 may rotate by a specified angle (e.g., 10 to 270 degrees about the rear surface of the electronic device), depending on the length (or the number of gears) of the rack gear 121.

The tilting method illustrated in FIG. 19 is exemplary for description, and the disclosure is not limited thereto. According to various embodiments, the electronic device 100 may perform at least part of the tilting of the camera module unit 110 independently of the movement of the slide portion 130. For example, in state 209, the electronic device 100 may further include a separate driving unit for rotating (e.g., tilting) the camera module unit 110 independently of the slide portion 130. In this case, the electronic device 100 may rotate the camera module unit 110 without moving the slide portion 130 in state 209.

FIG. 20 illustrates a schematic diagram of an image capturing method using a tilting operation of a camera module unit, according to various embodiments of the disclosure.

Referring to reference numeral 2001, a user may capture a selfie, using the camera of the camera module unit 110 of the electronic device 100. For example, the electronic device 100 may be in a state corresponding to state 209 of FIG. 19. In this case, the electronic device 100 may obtain an image corresponding to an image in front of the electronic device 100, using the camera of the camera module unit 110 as the front camera.

Referring to reference numeral 2002, a user may capture a selfie at a specific angle. For example, the electronic device 100 may be in a state corresponding to state 211 of FIG. 19. In this case, since the camera module unit 110 is tilted, the user may allow the camera of the camera module unit 110 to face the user without tilting the electronic device 100 toward the user. Since the user is capable of tilting the camera module unit 110 to face the user without tilting the electronic device 100 toward the user, the distance between the user's face and the camera may increase as compared with the case where the electronic device 100 is tilted. Accordingly, the electronic device 100 may obtain an image including more backgrounds using the increased distance between the user and the camera of the electronic device 100. Also, since the user stares at the camera rotating depending on the tilting without staring at the front camera mounted on the plane of the electronic device 100, the user may intuitively adjust the angle between the camera lens and the user's line of sight.

Figure 21:
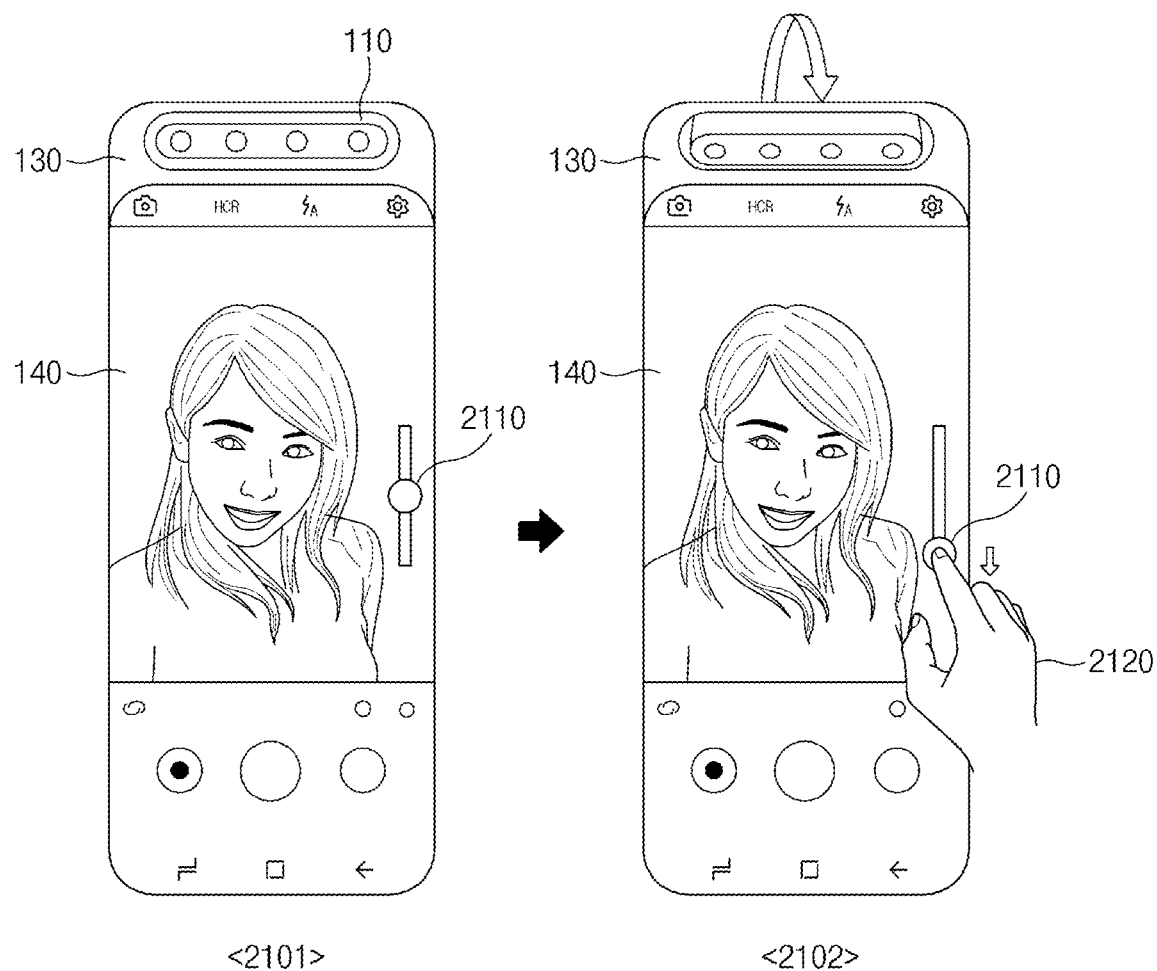
FIG. 21 illustrates a user interface (UI) for controlling the camera module unit, according to various embodiments of the disclosure.

FIG. 21 illustrates a UI 2110 for controlling the camera module unit 110, according to various embodiments of the disclosure.

According to various embodiments, the electronic device 100 may rotate (e.g., tilt) the camera module unit 110 based on a user input. According to an embodiment, the electronic device 100 may rotate the camera module unit 110 by moving the slide portion 130 based on a user input. For example, the electronic device 100 may further extend the slide portion 130 above the electronic device 100 to tilt the camera module unit 110 downward. For example, the electronic device 100 may further retract the slide portion 130 under the electronic device 100 to tilt the camera module unit 110 upward.

Referring to reference numeral 2101, according to various embodiments, the electronic device 100 may display a UI 2110 for controlling the tilting of the camera module unit 110, on the display unit 140. For example, the electronic device 100 may display the UI 2110 together with preview when the camera application is executed. For example, the UI 2110 may be in the form of a slide bar.

Referring to reference numeral 2102, according to various embodiments, the electronic device 100 may rotate (e.g., tilt) the camera module unit 110 based on an input 2120 to the UI 2110. For example, when the input 2120 to move downwardly is received in the UI 2110, the electronic device 100 may tilt the camera module unit 110 such that the camera of the camera module unit 110 faces downwardly.

The shape of the UI 2110 illustrated in FIG. 21 is exemplary for description, and the disclosure is not limited thereto. For example, the electronic device 100 may receive an input to control the rotation of the camera module unit 110, using various types of UIs.

According to an embodiment, the tilting of the camera module unit 110 may be controlled by a user input to physically move the slide portion 130. In this case, the user may tilt the camera module unit 110 by pushing the slide portion 130 up.

According to an embodiment, the electronic device 100 may control the tilting of the camera module unit 110 based on various pieces of information sensed by the electronic device 100. For example, the electronic device 100 may control the tilting of the camera module unit 110, using the orientation of the electronic device 100. For another example, the electronic device 100 may recognize a face using the camera and may tilt the camera module unit 110 to face the recognized face. In this case, the electronic device 100 may track the user's face through the tilting of the camera module unit 110. For still another example, the electronic device 100 may sense a voice command and may tilt the camera module unit 110 depending on the sensed voice command.

Figure 22:
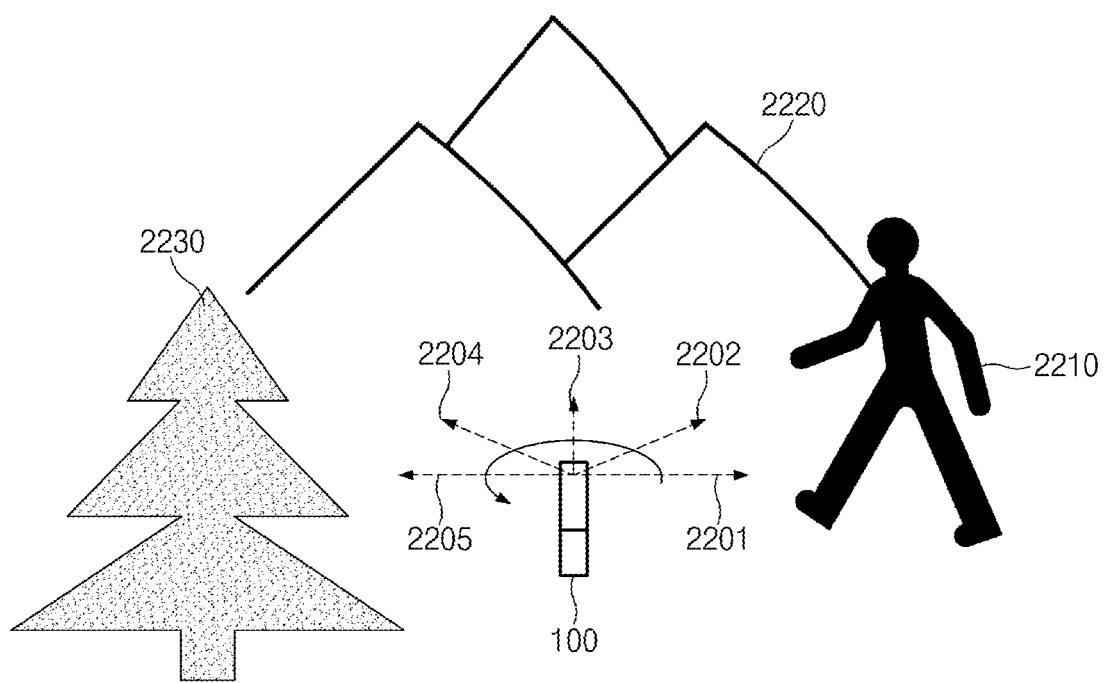
FIG. 22 illustrates a view of a panorama image capture environment, according to various embodiments of the disclosure.

FIG. 22 illustrates a view of a panorama image capture environment, according to various embodiments of the disclosure.

According to various embodiments, the electronic device 100 may obtain a panorama image by rotating the camera of the camera module unit 110. For example, the electronic device 100 may obtain an image (e.g., an image with an angle of view greater than 180 degrees) having an angle of view greater than the default angle of view of the camera, by obtaining an image while rotating the camera module unit 110. For another example, the electronic device 100 may obtain a plurality of images while rotating the camera module unit 110, and then may obtain a panorama image through performing post-processing (e.g., stitching) on the obtained plurality of images. In this case, instead of moving the electronic device 100 by the user, while the user does not move the electronic device 100 and the camera module unit 110 is rotating, the electronic device 100 may obtain an image by using the camera of the camera module unit 110. Therefore, the distortion caused by movement of the electronic device 100 by the user may be reduced.

In the exemplification of FIG. 22, for example, the camera module unit 110 may obtain an image while rotating from the first direction 2201 in the order of the second direction 2202, the third direction 2203, the fourth direction 2204, and the fifth direction 2205. For example, the electronic device 100 may obtain an image corresponding to the first direction 2201 by using the camera of the camera module unit 110 in the state 201 of FIG. 2. For example, the electronic device 100 may obtain an image corresponding to the fifth direction 2205 by using the camera of the camera module unit 110 in the state 209 of FIG. 2. For example, the first direction 2201 is the direction in which the rear surface of the electronic device 100 faces; the fifth direction 2205 is the direction in which the front surface (e.g., the surface on which the display unit 140 is positioned) of the electronic device 100 faces.

Figure 24:
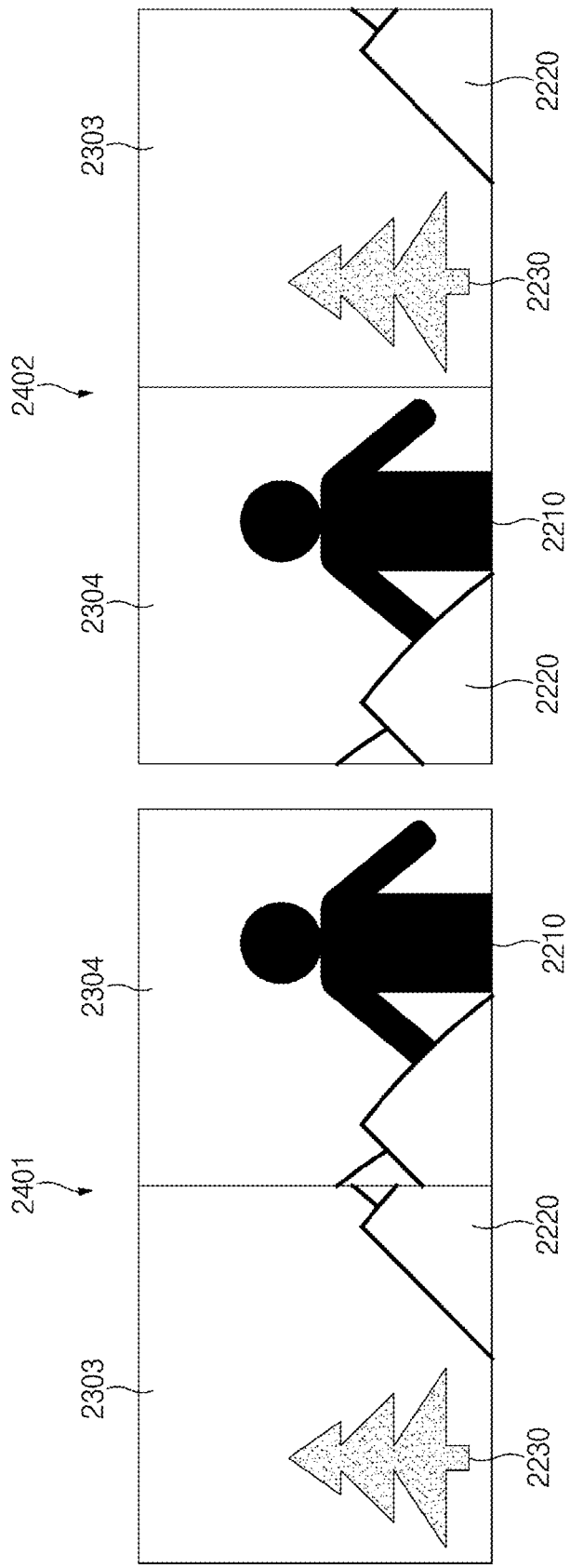
FIG. 24 illustrates a corrected panorama images, according to various embodiments of the disclosure.

In the exemplification of FIG. 22, it is assumed that a person 2210 is present in the first direction 2201, mountains 2220 are present in the third direction 2203, and a tree 2230 is present in the fifth direction 2205. For example, the electronic device 100 may obtain an image by using the camera of the camera module unit 110 while rotating the camera module unit 110 from the first direction 2201 to the fifth direction 2205. In this case, the electronic device 100 may obtain images in the order of the person 2210, mountains 2220, and the tree 2230. The panorama image capture environment of FIG. 22 is exemplary for description, and the disclosure is not limited thereto. Hereinafter, a method of generating a panorama image will be described with reference to FIGS. 23, 24, and 25. In FIGS. 23, 24, and 25, it is assumed that the electronic device 100 obtains an image in the panorama image capture environment described with reference to FIG. 22.

FIG. 23 illustrates a panorama image, according to various embodiments of the disclosure.

Referring to FIG. 23, a part of the angle of view of the camera of the camera module unit 110 may be blocked at a specific angle due to an upper bezel portion 2301 of the electronic device 100. For example, when the camera of the camera module unit 110 faces the third direction 2203, the center portion of the angle of view of the camera may be blocked due to the upper bezel portion 2301. In this case, the panorama image 2302 obtained using the camera of the camera module unit 110 while the electronic device 100 rotates the camera module unit 110 may include a blocking portion 2310 in the center portion. For example, the panorama image 2302 may include a left image 2303 and a right image 2304 with respect to the blocking portion 2310.

FIG. 24 illustrates a corrected panorama images, according to various embodiments of the disclosure.

According to various embodiments, the electronic device 100 may correct the obtained panorama image 2302 to provide the user with the corrected panorama image. According to an embodiment, the electronic device 100 may remove the blocking portion 2310 from the obtained panorama image 2302 and then may generate a corrected first panorama image 2401 by joining (e.g., stitching) the right boundary of the left image 2303 and the left boundary of the right image 2304 to each other. According to an embodiment, the electronic device 100 may remove the blocking portion 2310 and then may generate a corrected second panorama image 2402 by joining (e.g., stitching) the left boundary of the left image 2303 and the right boundary of the right image 2304 to each other.

FIG. 25 illustrates a panorama images obtained by an electronic device, according to various embodiments of the disclosure.

According to various embodiments, the electronic device 100 may not include an upper bezel portion on the upper side of the camera module unit 110. For example, a recess may be formed on the upper portion of the electronic device 100, and the camera module unit 110 may be positioned in the recess. In this case, unlike the exemplification of FIG. 23, the electronic device 100 may obtain a panorama image without the occurrence of a blocking portion.

For example, the electronic device 100 may obtain an image while rotating the camera module unit 110 to obtain the first panorama image 2401. The electronic device 100 may generate the second panorama image 2402 by splitting and joining (e.g., stitching) the first panorama image 2401. For example, the electronic device 100 may split the first panorama image 2401 into a plurality of images and then may join the plurality of images depending on the specified order to generate a second panorama image 2402.

With regard to the first panorama image 2401 and the second panorama image 2402 of FIGS. 24 and 25, the electronic device 100 may display and/or store the first panorama image 2401 and/or the second panorama image 2402.

According to an embodiment, the electronic device 100 may display the first panorama image 2401 and/or the second panorama image 2402 on the display of the electronic device 100. For example, the electronic device 100 may display a UI for selecting one of the first panorama image 2401 and the second panorama image 2402 on a display and may store the selected panorama image based on a user input. For another example, the electronic device 100 may store the first panorama image 2401 and/or the second panorama image 2402 depending on the setting of the panorama image (e.g., storing the first panorama image 2401 and/or storing the second panorama image 2402).

According to an embodiment, the electronic device 100 may display the first panorama image 2401 or the second panorama image 2402 on the display of the electronic device 100 based on image recognition. According to an embodiment, when a specified object is recognized from a panorama image, the electronic device 100 may select the first panorama image 2401 or the second panorama image 2402 such that the specified object is positioned in the center portion; and then the electronic device 100 may display the selected panorama image on the display. For example, the electronic device 100 may recognize the person 2210 from the panorama image and may select the second panorama image 2402 such that the person 2210 is positioned in the center portion of the image. For another example, the electronic device 100 may recognize the face of the person 2210 from the panorama image and may select the second panorama image 2402 such that the face is positioned in the center portion of the image. According to an embodiment, the electronic device 100 may store the panorama image displayed on the display. For example, the electronic device 100 may store the displayed panorama image in response to a user input.

Figure 26:
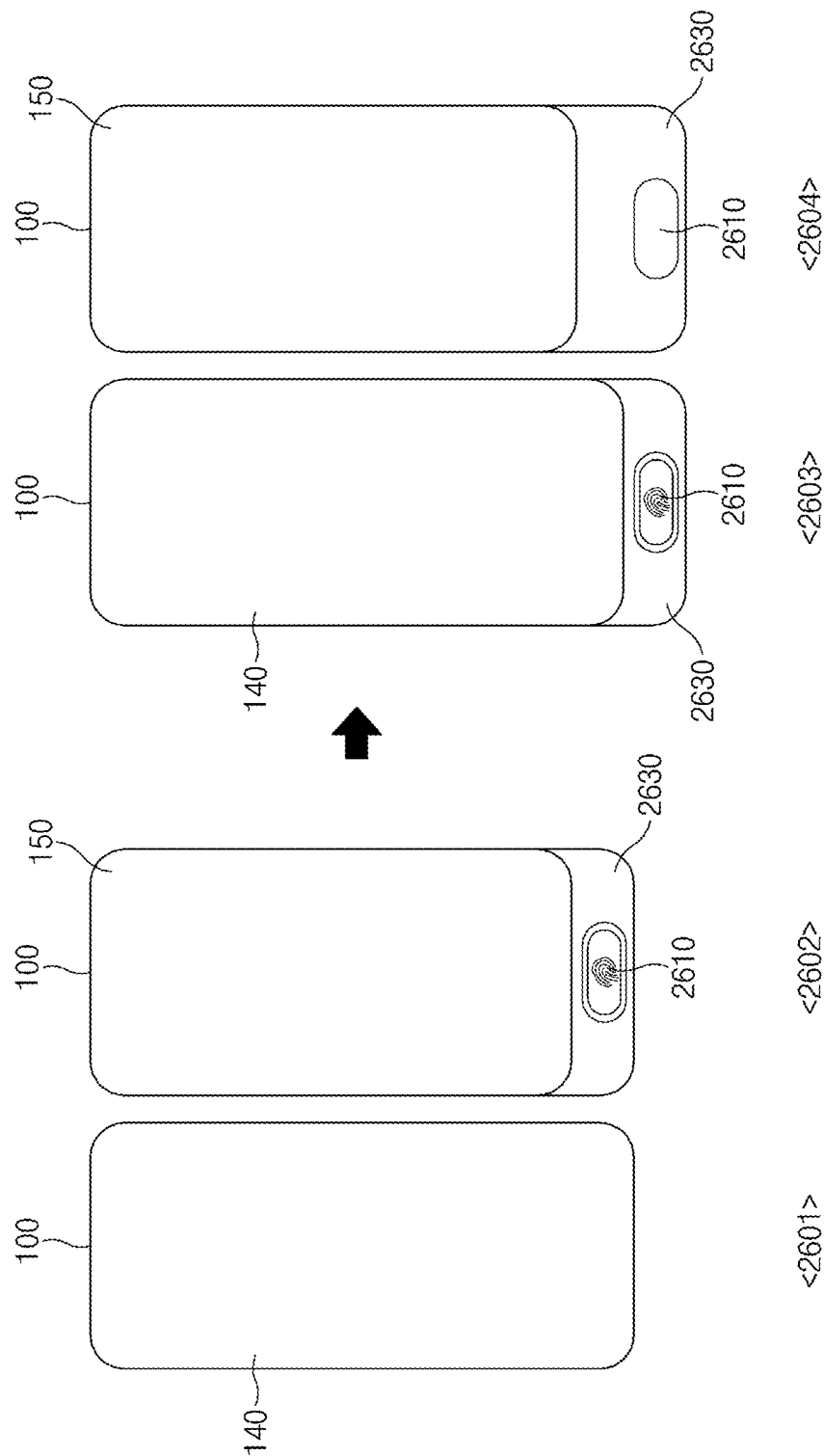
FIG. 26 illustrates a structure in which a biometric sensor of an electronic device is mounted, according to various embodiments of the disclosure.

FIG. 26 illustrates a structure in which a biometric sensor of an electronic device is mounted, according to various embodiments of the disclosure.

The structure in which the slide portion 130 slides in the upward direction of the electronic device 100 is described with reference to FIGS. 2 to 25. Similarly, the electronic device 100 may include a slide portion 2630 configured to slide in the downward direction of the electronic device 100.

Referring to FIG. 26, reference numeral 2601 illustrates the front surface of the electronic device 100 in a state where the electronic device 100 is not extended (e.g., a retracted state); reference numeral 2602 illustrates the rear surface of the electronic device 100 in a state where the electronic device 100 is not extended. In this case, the display unit 140 may be positioned on the front surface of the electronic device 100. The rear cover 150 and a slide portion 2630 not covered by the rear cover 150 may be exposed on the rear surface of the electronic device 100.

According to an embodiment, the slide portion 2630 may include a sensor unit 2610. For example, the sensor unit 2610 may rotate depending on the movement of the slide portion 2630. For example, the rotation of the sensor unit 2610 may be performed in a manner similar to the rotation of the camera module unit 110. According to an embodiment, the sensor unit 2610 may be a sensor for obtaining biometric information (e.g., a fingerprint, a heart rate, and/or blood pressure). In reference numeral 2602, the sensor unit 2610 is positioned in the exposed slide portion 2630 and the sensor unit 2610 may face the rear surface of the electronic device 100.

Reference numeral 2603 illustrates the front surface of the electronic device 100 in a state where the electronic device 100 is extended; reference numeral 2604 illustrates the rear surface of the electronic device 100 in a state where the electronic device 100 is extended. In this case, depending on the extension of the slide portion 2630, the sensor unit 2610 may rotate to face the front surface.

According to an embodiment, the electronic device 100 may extend the slide portion 2630 in the specified authentication mode such that the sensor unit 2610 faces the front surface. For example, the user may perform authentication by inputting biometric information (e.g., a fingerprint) to the sensor unit 2610 facing the front surface.

According to various embodiments, the slide portion 2630 of FIG. 26 may be included in the electronic device 100 together with the slide portion 130 of FIGS. 2 to 25. For example, the slide portion 2630 and the slide portion 130 are independent configurations, and the electronic device 100 may independently control the slide portion 2630 and the slide portion 130. For another example, the slide portion 2630 and the slide portion 130 may be configurations that are physically connected to each other. In this case, the slide portion 2630 may be retracted when the slide portion 130 extends upwardly; the slide portion 130 may be retracted when the slide portion 2630 extends downwardly.

According to various embodiments of the disclosure, an electronic device may include a housing, a display (e.g., display unit 140), at least part of which is accommodated in the housing, a slide portion (e.g., the slide portion 130) including an opening (e.g., the opening 131) exposed to an outside and sliding with respect to the housing, and a camera module unit (e.g., the camera module unit 110) disposed at the opening and rotating with respect to the slide portion. The slide portion may be configured to be positioned to overlap with the display, in a first state, to extend from the display by a first stroke, in a second state, and to extend more than the first stroke by a second stroke, in a third state, and the camera module unit may be configured to face a first direction in the first state and the second state and to rotate toward a second direction different from the first direction, by the second stroke when switching to the third state.

According to various embodiments, when receiving a camera app execution input, the slide portion may be configured to maintain the first state, the camera module unit may be configured to maintain the first direction, and a camera included in the camera module unit may be configured to be activated.

According to various embodiments, when receiving a camera switching input, the slide portion may be configured to be switched from the first state to the third state, the camera module unit may be configured to rotate toward the second direction, and the camera included in the camera module unit may be configured to be activated.

According to various embodiments, the slide portion may be configured to be switched from the third state to the second state, the camera module unit may be configured to rotate toward the first direction, and the camera included in the camera module unit may be configured to be activated.

According to various embodiments, when repeatedly receiving the camera switching input, the slide portion may be configured to move back and forth between the second state and the third state, and the camera module unit may be configured to rotate back and forth between the first direction and the second direction.

According to various embodiments, when receiving a camera app execution input, the slide portion may be configured to be switched from the first state to the second state, the camera module unit may be configured to maintain the first direction, and a camera included in the camera module unit may be configured to be activated.

According to various embodiments, when receiving a camera switching input, the slide portion may be configured to be switched from the second state to the third state, the camera module unit may be configured to rotate toward the second direction, and the camera included in the camera module unit may be configured to be activated.

According to various embodiments, when repeatedly receiving the camera switching input, the slide portion may be configured to move back and forth between the second state and the third state, and the camera module unit may be configured to rotate back and forth between the first direction and the second direction.

According to various embodiments, in a progression of the first stroke or the second stroke, a camera included in the camera module unit may be configured to be deactivated, and, after the progression of the first stroke or the second stroke is completed, the camera included in the camera module unit may be configured to be activated.

According to various embodiments, during movement of the slide portion or the camera module unit, a camera included in the camera module unit may be configured to be deactivated. After the movement of the slide portion or the camera module unit is completed, the camera included in the camera module unit may be configured to be activated.

According to various embodiments, when a video call is received, the slide portion may be configured to be switched from the first state to the second state, the camera module unit may be configured to maintain the first direction, and a camera included in the camera module unit may be configured to be deactivated.

According to various embodiments, when acceptance of an incoming video call is input, the slide portion may be configured to be switched from the second state to the third state, the camera module unit may be configured to rotate toward the second direction, and the camera included in the camera module unit may be configured to be activated.

According to various embodiments, the electronic device may further include an illuminance sensor configured to sense external brightness. The slide portion may be configured to be switched from the first state to the second state when a measurement value by the illuminance sensor is greater than a reference value.

According to various embodiments, a camera included in the camera module unit may be configured to capture a plurality of images in response to the first stroke.

According to various embodiments, a camera included in the camera module unit may be configured to capture one image while the camera module unit rotates in response to the second stroke.

According to various embodiments, the slide portion may be configured to be switched to a fourth state, which is extended more than the third state, by a third stroke. The camera module unit may be configured to rotate toward a third direction, which is rotated more than the second direction, in the fourth state.

According to various embodiments of the disclosure, an operating method of an electronic device including housing, a display, at least part of which is accommodated in the housing, a slide portion including an opening exposed to an outside and sliding with respect to the housing, and a camera module unit disposed at the opening and rotating with respect to the slide portion may include an operation in which, when receiving a camera app execution input, the slide portion maintains the first state to overlap with the display, the camera module unit maintains the first direction opposite to the front surface of the display, and a camera included in the camera module unit is activated, an operation in which, when receiving a first camera switching input, the slide portion extends more than the second state that is partly extended from the display and then is switched to the third state to overlap with the display, the camera module unit rotates toward the second direction different from the first direction, and a camera included in the camera module unit is activated, and an operation in which when receiving a second camera switching input, the slide portion retracts from the third state to the second state, the camera module unit rotates in the first direction, and the camera included in the camera module unit is activated.

According to various embodiments, when receiving an additional camera switching input, the slide portion may be configured to move back and forth between the second state and the third state, and the camera module unit may be configured to rotate back and forth between the first direction and the second direction.

According to various embodiments, when receiving a camera app termination input, the slide portion may be configured to be switched from the second state or the third state to the first state.

According to various embodiments, during state conversion of the first to third states, the camera included in the camera module unit may be deactivated.

According to various embodiments of the disclosure, an electronic device may include housing, a display (e.g., the display 141) disposed inside the housing and exposed through the first surface, a camera structure (e.g., the camera module unit 110) capable of sliding in the fourth direction between a first location and a second location, a driving mechanism (e.g., the slide operation control unit 120) disposed inside the housing and moving the camera structure in the fourth direction, a processor (e.g., the processor 2720 of FIG. 27) operatively connected to the display, the image sensor, and the driving mechanism, and a memory (e.g., the memory 2730 of FIG. 27) operatively connected to the processor. The housing may include a first surface (e.g., the display unit 140) facing a first direction (e.g., the direction of the display 141) and a second surface facing a second direction (e.g., the direction of the rear cover 150) opposite to the first direction. The first surface substantially may have a first rectangular shape and may include a first side (e.g., the upper end of the display unit 140), which extends in a third direction (e.g., the side direction of the display unit 140) and has a first length, and a second side (e.g., the side surface of the display unit 140), which extends in a fourth direction (e.g., the upper end direction of the display unit 140) substantially perpendicular to the first side and has a second length, and the second surface (e.g., the rear cover 150) may have a second rectangular shape, the area of which is smaller than the first rectangular shape and may include a third side (e.g., the upper end of the rear cover 150), which is parallel to the first side and has the first length, and a fourth side, which is parallel to the second side and has a third length shorter than the second length. The camera structure may include, when viewed from above the second surface at the first location, a fifth side (e.g., the upper end of the slide portion 130), which is substantially aligned or adjacent to the first side, and a sixth side (e.g., a part of the slide portion 130), which is substantially in contact with or adjacent to the third side. The camera structure may include a third surface forming a surface substantially extending from the second surface and at least one image sensor (e.g., a camera device 112, 113, or 116) rotating so as to face the second direction at the first location and to face the first direction at the second location, and when viewed from above the second surface at the second location, the first side may be interposed between the third side and the fifth side, and the sixth side may have a first distance from the third side. The memory may store instructions that, when executed, cause the processor to display a user interface of a camera application program (e.g., all apps associated with the execution of a camera) on the display, to display a first image from the image sensor on the user interface at the second location, while the first image is displayed, to receive a user input to change a direction of the camera, and to display a second image from the image sensor, on the user interface in a state of moving the camera structure from the second location to the first location by a second distance less than the first distance such that the image sensor faces the second direction in response to the reception of the user input, by using the driving mechanism.

According to various embodiments, the instructions may cause the processor to display the first image on the user interface, while the camera structure is moved by the second distance.

According to various embodiments, the instructions may cause the processor to display a third image different from the first image and the second image, on the user interface, while the camera structure is moved by the second distance.

According to various embodiments, the second length may be greater than the first length.

Figure 27:
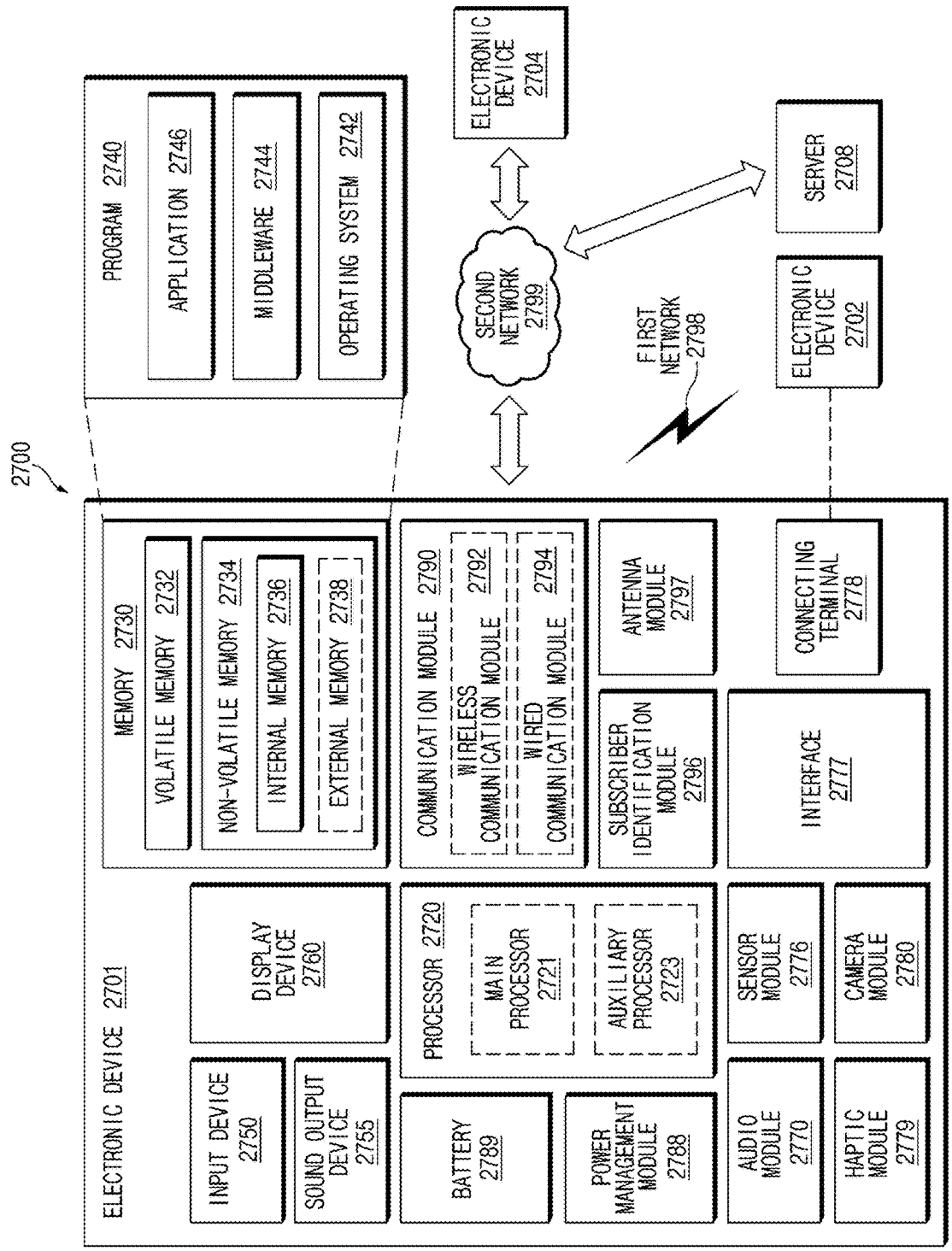
FIG. 27 illustrates a block diagram of an electronic device in a network environment according to various embodiments.

FIG. 27 illustrates a block diagram illustrating an electronic device 2701 in a network environment 2700 according to various embodiments. Referring to FIG. 27, the electronic device 2701 in the network environment 2700 may communicate with an electronic device 2702 via a first network 2798 (e.g., a short-range wireless communication network), or an electronic device 2704 or a server 2708 via a second network 2799 (e.g., a long-range wireless communication network). According to an embodiment, the electronic device 2701 may communicate with the electronic device 2704 via the server 2708. According to an embodiment, the electronic device 2701 may include a processor 2720, memory 2730, an input device 2750, a sound output device 2755, a display device 2760, an audio module 2770, a sensor module 2776, an interface 2777, a haptic module 2779, a camera module 2780, a power management module 2788, a battery 2789, a communication module 2790, a subscriber identification module (SIM) 2796, or an antenna module 2797. In some embodiments, at least one (e.g., the display device 2760 or the camera module 2780) of the components may be omitted from the electronic device 2701, or one or more other components may be added in the electronic device 2701. In some embodiments, some of the components may be implemented as single integrated circuitry. For example, the sensor module 2776 (e.g., a fingerprint sensor, an iris sensor, or an illuminance sensor) may be implemented as embedded in the display device 2760 (e.g., a display).

The processor 2720 may execute, for example, software (e.g., a program 2740) to control at least one other component (e.g., a hardware or software component) of the electronic device 2701 coupled with the processor 2720, and may perform various data processing or computation. According to one embodiment, as at least part of the data processing or computation, the processor 2720 may load a command or data received from another component (e.g., the sensor module 2776 or the communication module 2790) in volatile memory 2732, process the command or the data stored in the volatile memory 2732, and store resulting data in non-volatile memory 2734. According to an embodiment, the processor 2720 may include a main processor 2721 (e.g., a central processing unit (CPU) or an application processor (AP)), and an auxiliary processor 2723 (e.g., a graphics processing unit (GPU), an image signal processor (ISP), a sensor hub processor, or a communication processor (CP)) that is operable independently from, or in conjunction with, the main processor 2721. Additionally or alternatively, the auxiliary processor 2723 may be adapted to consume less power than the main processor 2721, or to be specific to a specified function. The auxiliary processor 2723 may be implemented as separate from, or as part of the main processor 2721.

The auxiliary processor 2723 may control at least some of functions or states related to at least one component (e.g., the display device 2760, the sensor module 2776, or the communication module 2790) among the components of the electronic device 2701, instead of the main processor 2721 while the main processor 2721 is in an inactive (e.g., sleep) state, or together with the main processor 2721 while the main processor 2721 is in an active state (e.g., executing an application). According to an embodiment, the auxiliary processor 2723 (e.g., an image signal processor or a communication processor) may be implemented as part of another component (e.g., the camera module 2780 or the communication module 2790) functionally related to the auxiliary processor 2723.

The memory 2730 may store various data used by at least one component (e.g., the processor 2720 or the sensor module 2776) of the electronic device 2701. The various data may include, for example, software (e.g., the program 2740) and input data or output data for a command related thereto. The memory 2730 may include the volatile memory 2732 or the non-volatile memory 2734.

The program 2740 may be stored in the memory 2730 as software, and may include, for example, an operating system (OS) 2742, middleware 2744, or an application 2746.

The input device 2750 may receive a command or data to be used by other component (e.g., the processor 2720) of the electronic device 2701, from the outside (e.g., a user) of the electronic device 2701. The input device 2750 may include, for example, a microphone, a mouse, a keyboard, or a digital pen (e.g., a stylus pen).

The sound output device 2755 may output sound signals to the outside of the electronic device 2701. The sound output device 2755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 2760 may visually provide information to the outside (e.g., a user) of the electronic device 2701. The display device 2760 may include, for example, a display, a hologram device, or a projector and control circuitry to control a corresponding one of the display, hologram device, and projector. According to an embodiment, the display device 2760 may include touch circuitry adapted to detect a touch, or sensor circuitry (e.g., a pressure sensor) adapted to measure the intensity of force incurred by the touch.

The audio module 2770 may convert a sound into an electrical signal and vice versa. According to an embodiment, the audio module 2770 may obtain the sound via the input device 2750, or output the sound via the sound output device 2755 or a headphone of an external electronic device (e.g., an electronic device 2702) directly (e.g., wiredly) or wirelessly coupled with the electronic device 2701.

The sensor module 2776 may detect an operational state (e.g., power or temperature) of the electronic device 2701 or an environmental state (e.g., a state of a user) external to the electronic device 2701, and then generate an electrical signal or data value corresponding to the detected state. According to an embodiment, the sensor module 2776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2777 may support one or more specified protocols to be used for the electronic device 2701 to be coupled with the external electronic device (e.g., the electronic device 2702) directly (e.g., wiredly) or wirelessly. According to an embodiment, the interface 2777 may include, for example, a high definition multimedia interface (HDMI), a universal serial bus (USB) interface, a secure digital (SD) card interface, or an audio interface.

A connecting terminal 2778 may include a connector via which the electronic device 2701 may be physically connected with the external electronic device (e.g., the electronic device 2702). According to an embodiment, the connecting terminal 2778 may include, for example, a HDMI connector, a USB connector, a SD card connector, or an audio connector (e.g., a headphone connector).

The haptic module 2779 may convert an electrical signal into a mechanical stimulus (e.g., a vibration or a movement) or electrical stimulus which may be recognized by a user via his tactile sensation or kinesthetic sensation. According to an embodiment, the haptic module 2779 may include, for example, a motor, a piezoelectric element, or an electric stimulator.

The camera module 2780 may capture a still image or moving images. According to an embodiment, the camera module 2780 may include one or more lenses, image sensors, image signal processors, or flashes.

The power management module 2788 may manage power supplied to the electronic device 2701. According to one embodiment, the power management module 2788 may be implemented as at least part of, for example, a power management integrated circuit (PMIC).

The battery 2789 may supply power to at least one component of the electronic device 2701. According to an embodiment, the battery 2789 may include, for example, a primary cell which is not rechargeable, a secondary cell which is rechargeable, or a fuel cell.

The communication module 2790 may support establishing a direct (e.g., wired) communication channel or a wireless communication channel between the electronic device 2701 and the external electronic device (e.g., the electronic device 2702, the electronic device 2704, or the server 2708) and performing communication via the established communication channel. The communication module 2790 may include one or more communication processors that are operable independently from the processor 2720 (e.g., the application processor (AP)) and supports a direct (e.g., wired) communication or a wireless communication. According to an embodiment, the communication module 2790 may include a wireless communication module 2792 (e.g., a cellular communication module, a short-range wireless communication module, or a global navigation satellite system (GNSS) communication module) or a wired communication module 2794 (e.g., a local area network (LAN) communication module or a power line communication (PLC) module). A corresponding one of these communication modules may communicate with the external electronic device via the first network 2798 (e.g., a short-range communication network, such as BLUETOOTH, wireless-fidelity (Wi-Fi) direct, or infrared data association (IrDA)) or the second network 2799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2792 may identify and authenticate the electronic device 2701 in a communication network, such as the first network 2798 or the second network 2799, using subscriber information (e.g., international mobile subscriber identity (IMSI)) stored in the subscriber identification module 2796.

The antenna module 2797 may transmit or receive a signal or power to or from the outside (e.g., the external electronic device) of the electronic device 2701. According to an embodiment, the antenna module 2797 may include an antenna including a radiating element composed of a conductive material or a conductive pattern formed in or on a substrate (e.g., PCB). According to an embodiment, the antenna module 2797 may include a plurality of antennas. In such a case, at least one antenna appropriate for a communication scheme used in the communication network, such as the first network 2798 or the second network 2799, may be selected, for example, by the communication module 2790 (e.g., the wireless communication module 2792) from the plurality of antennas. The signal or the power may then be transmitted or received between the communication module 2790 and the external electronic device via the selected at least one antenna. According to an embodiment, another component (e.g., a radio frequency integrated circuit (RFIC)) other than the radiating element may be additionally formed as part of the antenna module 2797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2701 and the external electronic device 2704 via the server 2708 coupled with the second network 2799. Each of the electronic devices 2702 and 2704 may be a device of a same type as, or a different type, from the electronic device 2701. According to an embodiment, all or some of operations to be executed at the electronic device 2701 may be executed at one or more of the external electronic devices 2702, 2704, or 2708. For example, if the electronic device 2701 should perform a function or a service automatically, or in response to a request from a user or another device, the electronic device 2701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2701. The electronic device 2701 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2740) including one or more instructions that are stored in a storage medium (e.g., internal memory 2736 or external memory 2738) that is readable by a machine (e.g., the electronic device 2701). For example, a processor (e.g., the processor 2720) of the machine (e.g., the electronic device 2701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a housing;
a display, at least part of the display is accommodated in the housing;
a slide portion including an opening exposed to an outside and sliding with respect to the housing; and
a camera module unit disposed at the opening and configured to rotate with respect to the slide portion,
wherein the slide portion is configured to:
overlap the display, in a first state;
extend from the display by a first stroke, in a second state; and
extend more than the first stroke by a second stroke in a same linear direction as the first stroke, in a third state, and
wherein the camera module unit is configured to:
face a first direction in the first state and the second state; and
rotate toward a second direction different from the first direction, by the second stroke, when switching to the third state.

2. The electronic device of claim 1, wherein, when a camera app execution input is received:
the slide portion is further configured to maintain the first state,
the camera module unit is further configured to maintain the first direction, and
a camera included in the camera module unit is configured to activate.

3. The electronic device of claim 2, wherein, when a first camera switching input is received:
the slide portion is further configured to switch from the first state to the third state, the camera module unit is further configured to rotate toward the second direction, and
the camera included in the camera module unit is further configured to activate.

4. The electronic device of claim 3, wherein, when a second camera switching input is received:
the slide portion is further configured to switch from the third state to the second state,
the camera module unit is further configured to rotate toward the first direction, and
the camera included in the camera module unit is further configured to activate.

5. The electronic device of claim 4, wherein, when a third camera switching input is received:
the slide portion is further configured to switch from the second state to the third state,
the camera module unit is further configured to rotate toward the second direction, and
the camera included in the camera module unit is further configured to activate,
wherein, when the second camera switching input and the third camera switching input is repeatedly received:
the slide portion is further configured to move back and forth between the second state and the third state, and
the camera module unit is further configured to rotate back and forth between the first direction and the second direction.

6. The electronic device of claim 1, wherein, when a camera app execution input is received:
the slide portion is further configured to switch from the first state to the second state,
the camera module unit is further configured to maintain the first direction, and
a camera included in the camera module unit is configured to activate.

7. The electronic device of claim 6, wherein, when a first camera switching input is received:
the slide portion is further configured to switch from the second state to the third state,
the camera module unit is further configured to rotate toward the second direction, and
the camera included in the camera module unit is further configured to activate.

8. The electronic device of claim 7, wherein, when a second camera switching input is repeatedly received:
the slide portion is further configured to move back and forth between the second state and the third state, and
the camera module unit is further configured to rotate back and forth between the first direction and the second direction.

9. The electronic device of claim 1, wherein, in a progression of the first stroke or the second stroke, a camera included in the camera module unit is configured to deactivate; and
wherein, after the progression of the first stroke or the second stroke is completed, the camera included in the camera module unit is further configured to activate.

10. The electronic device of claim 1, wherein, during movement of the slide portion or the camera module unit, a camera included in the camera module unit is configured to deactivate; and
wherein, after the movement of the slide portion or the camera module unit is completed, the camera included in the camera module unit is further configured to activate.

11. The electronic device of claim 1, wherein, when a video call is received:

the slide portion is further configured to switch from the first state to the second state,
the camera module unit is further configured to maintain the first direction, and
a camera included in the camera module unit is configured to deactivate.

12. The electronic device of claim 11, wherein, when acceptance of the video call is input:
the slide portion is further configured to switch from the second state to the third state,
the camera module unit is further configured to rotate toward the second direction, and
the camera included in the camera module unit is further configured to activate.

13. The electronic device of claim 11, further comprising:
an illuminance sensor configured to sense external brightness,
wherein the slide portion is further configured to switch from the first state to the second state when a measurement value by the illuminance sensor is greater than a reference value.

14. The electronic device of claim 1, wherein a camera included in the camera module unit is configured to capture a plurality of images in response to the first stroke.

15. The electronic device of claim 1, wherein a camera included in the camera module unit is configured to capture one image while the camera module unit rotates in response to the second stroke.

16. The electronic device of claim 1, wherein the slide portion is further configured to switch to a fourth state in response to a third stroke, the fourth state extending more than the third state; and
wherein in the fourth state the camera module unit is further configured to rotate toward a third direction, wherein to rotate towards the third direction the camera module unit is rotated more than the second direction.

17. An electronic device comprising:
a housing, including a first surface facing a first direction and a second surface facing a second direction opposite to the first direction,
wherein:
the first surface is a first rectangular shape and includes a first side and a second side, the first side extends in a third direction and is a first length, and the second side extends in a fourth direction perpendicular to the first side and is a second length, and
the second surface is a second rectangular shape and includes a third side and a fourth side, the second rectangular shape is smaller than the first rectangular shape, the third side is parallel to the first side and is the first length, and the fourth side is parallel to the second side and is a third length, the third length is shorter than the second length;
a display disposed inside the housing and exposed through the first surface;
a camera structure capable of sliding in the fourth direction between a first location and a second location, wherein the camera structure includes:
a third surface extending from the second surface; and
at least one image sensor configured to rotate to face the second direction at the first location and to face the first direction at the second location,
wherein the third surface includes:
a fifth side, that is aligned or adjacent to the first side when the third surface is at the first location; and a sixth side, that is in contact with or adjacent to the third side when the third surface is at the first location, wherein, when the third surface is at the second location, the first side is interposed between the third side and the fifth side, and the sixth side is a first distance from the third side;

a driving mechanism disposed inside the housing and configured to move the camera structure in the fourth direction;

a memory; and a processor operatively connected to the memory, the display, the image sensor, and the driving mechanism, and configured to:

display a user interface of a camera application program on the display;

display a first image from the image sensor on the user interface at the second location;

while the first image is displayed, receive a user input to change a direction of the camera structure; and in response to receiving the user input, display a second image from the image sensor, on the user interface while the camera structure is moved, by using the driving mechanism, from the second location to the first location by a second distance less than the first distance wherein moving the camera structure the image sensor faces the second direction.

18. The electronic device of claim 17, wherein while the camera structure is moved by the second distance, the processor is further configured to display the first image on the user interface.

19. The electronic device of claim 17, wherein while the camera structure is moved by the second distance, the processor is further configured to display a third image different from the first image and the second image, on the user interface.

20. The electronic device of claim 17, wherein the second length is greater than the first length.

* * * * *